(12) United States Patent
Makabe et al.

(10) Patent No.: US 12,682,682 B2
(45) Date of Patent: Jul. 14, 2026

(54) INTEREST DEGREE MEASUREMENT SYSTEM AND SIMULATION SYSTEM

(71) Applicant: Mitsubishi Electric Corporation, Tokyo (JP)

(72) Inventors: Ryu Makabe, Tokyo (JP); Masami Aikawa, Tokyo (JP); Kei Gomita, Tokyo (JP); Atsushi Hori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 164 days.

(21) Appl. No.: 18/692,336

(22) PCT Filed: Nov. 2, 2021

(86) PCT No.: PCT/JP2021/040434
§ 371 (c)(1),
(2) Date: Mar. 15, 2024

(87) PCT Pub. No.: WO2023/079600
PCT Pub. Date: May 11, 2023

(65) Prior Publication Data
US 2024/0378923 A1 Nov. 14, 2024

(51) Int. Cl.
*G06V 40/20* (2022.01)
*G06Q 30/0283* (2023.01)
(Continued)

(52) U.S. Cl.
CPC .............. *G06V 40/20* (2022.01); *G06V 10/70* (2022.01); *G06Q 30/0283* (2013.01); *G06Q 50/16* (2013.01)

(58) Field of Classification Search
CPC ...... B66B 5/0012; G06V 20/52; G06V 20/53; G06V 40/20; G06V 10/70; G06V 10/255;
(Continued)

(56) References Cited

U.S. PATENT DOCUMENTS 9,706,345 B2 7/2017 Davis et al.
10,170,084 B2 * 1/2019 Blumenberg ........ G01C 21/367
(Continued)

FOREIGN PATENT DOCUMENTS

JP 2006-133915 A 5/2006
JP 2010-009444 A 1/2010
(Continued)

OTHER PUBLICATIONS

Google patents translation of WO2019030816A1 (Year: 2019).*
(Continued)

*Primary Examiner* — Courtney Joan Nelson
(74) *Attorney, Agent, or Firm* — XSENSUS LLP

(57) ABSTRACT
In an interest degree measurement system included in a simulation system, a behavior information acquisition unit acquires behavior information on an arrival floor of a user on the basis of an image or images captured by a camera. An interest information acquisition unit acquires interest information representing degrees of interest of users for each attribute on a basis of arrangement and attributes of areas on the arrival floor and the behavior information. An interest information storage unit stores the interest information for each user, including information on a time point and a location. A visualization processing unit generates an interest degree map by visualizing distribution of degrees of interest of users of a building using the information stored in the interest information storage unit.

21 Claims, 49 Drawing Sheets

(51) Int. Cl.
    *G06Q 50/16*         (2024.01)
    *G06V 10/70*         (2022.01)

(58) Field of Classification Search
    CPC .... G06Q 30/0283; G06Q 50/16; G06Q 30/02;
             G06Q 10/10; G06Q 10/04; H04N 7/181
    See application file for complete search history.

(56)                 References Cited

U.S. PATENT DOCUMENTS

2012/0020518 A1 *   1/2012   Taguchi .................. G06T 7/292
                                 382/103
2019/0019207 A1 *   1/2019   Choi .................. G06Q 30/0205
2019/0392661 A1   12/2019   Oozono et al.

FOREIGN PATENT DOCUMENTS

JP          6583982  B1  *  10/2019
JP       2021-77245  A     5/2021
WO    WO-2019030816  A1  *   2/2019   ............. G06Q 10/04

OTHER PUBLICATIONS

Google patents translation of Jp 6583982B1 (Year: 2019).*
International Search Report mailed on Feb. 1, 2022, received for
International Patent Application No. PCT/JP2021/040434, filed on
Nov. 2, 2021, 05 pages including partial English Translation.
Office Action dated Nov. 19, 2025 in the corresponding IN patent
application No. 202447027819, 6pp.

* cited by examiner

USER
(FRONT-FACING)

CONCERN
DIRECTION
INFORMATION

AREA AND
ATTRIBUTE

USER
(OBLIQUE
FRONT-FACING)

CONCERN
DIRECTION
INFORMATION

AREA AND
ATTRIBUTE

AREA AND
ATTRIBUTE

USER
(BACK)

CONCERN
DIRECTION
INFORMATION

NOSE

USER
(SIDE)

AREA AND
ATTRIBUTE

CONCERN
DIRECTION
INFORMATION

Fig. 5E

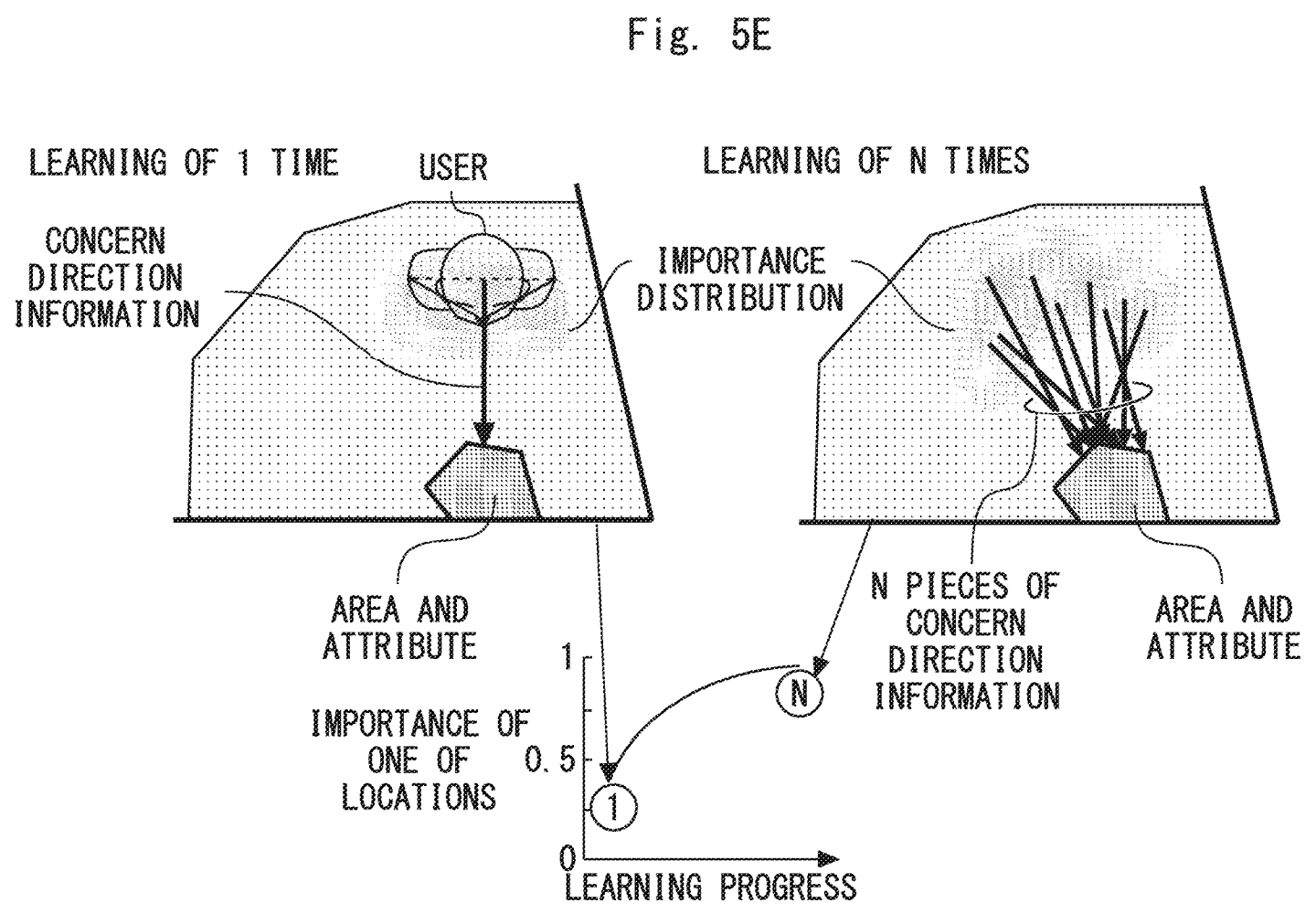

LEARNING OF 1 TIME

LEARNING OF N TIMES

USER

CONCERN DIRECTION INFORMATION

IMPORTANCE DISTRIBUTION

AREA AND ATTRIBUTE

AREA AND ATTRIBUTE

N PIECES OF CONCERN DIRECTION INFORMATION

IMPORTANCE OF ONE OF LOCATIONS

LEARNING PROGRESS

Fig. 6

| USER SPECIFIED AT EACH FLOOR DEPARTURE | | 1st FLOOR | 2nd FLOOR | 3rd FLOOR | 4th FLOOR | 5th FLOOR | 6th FLOOR |
|---|---|---|---|---|---|---|---|
| | USER | | | | | | |
| | A | A | ABC | ABCD | BD | D | |
| JUDGEMENT RESULT OF DEPARTURE FLOOR AND ARRIVAL FLOOR | A | DEPARTURE FLOOR | | | ARRIVAL FLOOR | | |
| | B | | DEPARTURE FLOOR | | | ARRIVAL FLOOR | |
| | C | | DEPARTURE FLOOR | | ARRIVAL FLOOR | | |
| | D | | | DEPARTURE FLOOR | | | ARRIVAL FLOOR |

USER A
USER B
USER C
IN USE

3F

4

12

2F

4

1F

USER A
USER B
USER C
USER D
IN USE

USER D
COMPLETED
FOR USE

Fig. 10A

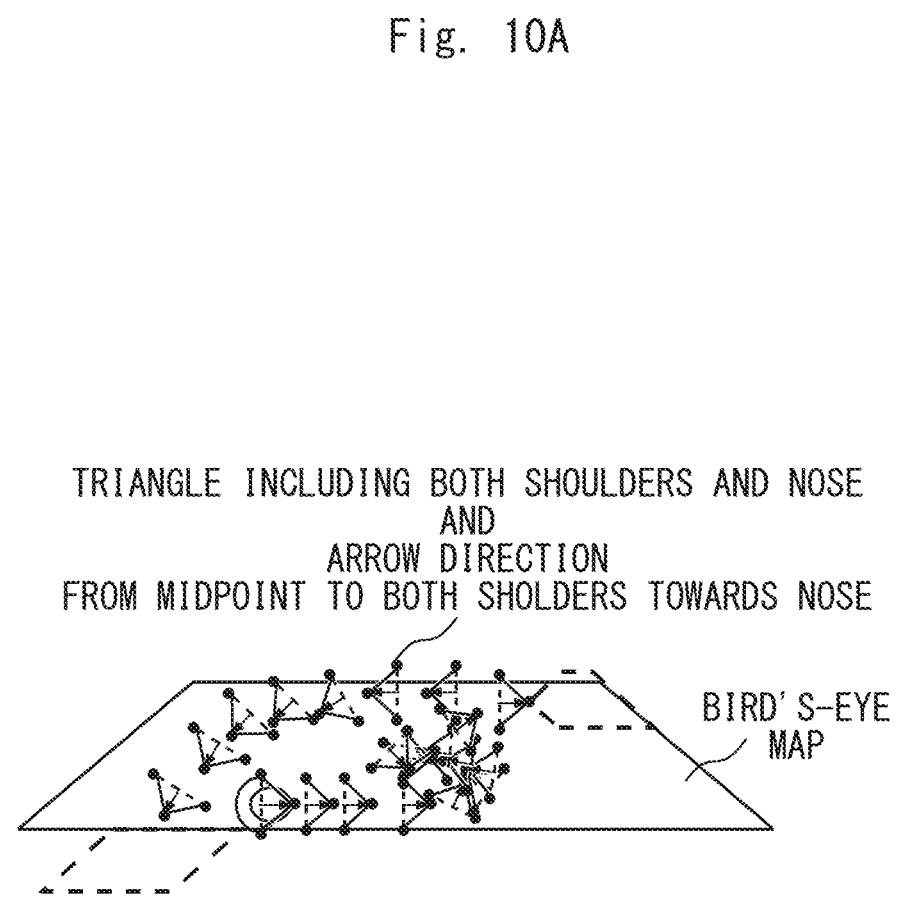

TRIANGLE INCLUDING BOTH SHOULDERS AND NOSE
AND
ARROW DIRECTION
FROM MIDPOINT TO BOTH SHOLDERS TOWARDS NOSE

BIRD'S-EYE
MAP

TRAJECTORY

BIRD'S-EYE MAP

AREA AND ATTRIBUTE WITH
HIGH DENSITY OF INTERSECTIONS
OF EXTENSIONS OF ARROW DIRECTIONS

TRAJECTORY

BIRD'S-EYE MAP

LONG STAY
AREA AND ATTRIBUTE

TRAJECTORIES OF RESPECTIVE USERS

Fig. 15D

INTEREST DEGREE MEASUREMENT SYSTEM AND SIMULATION SYSTEM

CROSS-REFERENCE TO RELATED APPLICATION

This application is a national stage application, pursuant to 35 U.S.C. § 371, of International Patent Application No. PCT/JP2021/040434, filed Nov. 2, 2021, the entire contents of which are incorporated herein by reference.

TECHNICAL FIELD

The present disclosure relates to an interest degree measurement system and a simulation system.

BACKGROUND ART

PTL 1 discloses an example of an interest degree analysis system. The interest degree analysis system analyzes a degree of interest of a user with respect to an object on the basis of a movement trajectory, movement speed, and the like, of the user located in an effective range of the object.

PRIOR ART

Patent Literature

[PTL 1] JP 2006-133915 A

SUMMARY OF THE INVENTION

Problems to be Solved by the Invention

However, in the interest degree analysis system of PTL 1, the movement trajectory of the user is acquired using mobile equipment such as an information terminal possessed by the user. Thus, information on a degree of interest cannot be acquired for a user who does not possess mobile equipment such as an information terminal registered in advance.

The present disclosure has been made to solve such a problem. The present disclosure provides an interest degree measurement system capable of obtaining information on interest of users in a building even for a user who does not possess mobile equipment registered in advance, and a simulation system capable of simulating change of the information.

Means to Solve the Problem

An interest degree measurement system according to the present disclosure includes: an attribute storage unit configured to store attributes for each area for each of a plurality of floors of a building; a user specification unit configured to specify a user in the building on a basis of an image or images captured by at least one of a plurality of cameras provided in the building; a floor judgement unit configured to, when the user specified by the user specification unit moves from a departure floor to an arrival floor among the plurality of floors by utilizing one of one or more ascending/descending facilities provided in the building, judge the arrival floor of the user on a basis of an image or images captured by at least one of the plurality of cameras; a behavior information acquisition unit configured to acquire behavior information representing behavior of the user on the arrival floor judged by the floor judgement unit on a basis of an image or images captured by at least one of the plurality of cameras for the user specified by the user specification unit; an interest information acquisition unit configured to acquire interest information representing a degree of interest of the user for each attribute on a basis of a relationship between layout and attributes of areas on the arrival floor judged by the floor judgement unit and the behavior information acquired by the behavior information acquisition unit for the user specified by the user specification unit, an interest information storage unit configured to store the interest information acquired by the interest information acquisition unit for each user, including information on a time point and a location; and a visualization processing unit configured to generate an interest degree map by visualizing distribution of degrees of interest of users of the building on at least one of the plurality of floors using the information stored in the interest information storage unit.

An interest degree measurement system according to the present disclosure includes: a first attribute storage unit configured to store attributes for each area for each of a plurality of floors of a first building; a first user specification unit configured to specify, a user in the first building on a basis of an image or images captured by at least one of a plurality of first cameras provided in the first building; a floor judgement unit configured to, when the user specified by the first user specification unit moves from a departure floor to an arrival floor among the plurality of floors of the first building by utilizing one of one or more ascending/descending facilities provided in the first building, judge the arrival floor of the user on a basis of the image or images captured by at least one of the plurality of first cameras; a behavior information acquisition unit configured to acquire behavior information representing behavior of the user on the arrival floor judged by the floor judgement unit on a basis of an image or images captured by at least one of the plurality of first cameras for the user specified by the first user specification unit; an interest information acquisition unit configured to acquire interest information representing a degree of interest of the user for each attribute on a basis of a relationship between arrangement and attributes of areas on the arrival floor judged by the floor judgement unit and the behavior information acquired by the behavior information acquisition unit for the user specified by the first user specification unit; an interest information storage unit configured to store the interest information acquired by the interest information acquisition unit for each user, including information on a time point and a location; a second attribute storage unit configured to store attributes for each area for each of a plurality of floors of a second building; and a visualization processing unit configured to generate an interest degree map by visualizing distribution of degrees of interest of users of the second building on at least one of the plurality of floors of the second building using information on the attributes stored in the second attribute storage unit and the information stored in the interest information storage unit.

An interest degree measurement system according to the present disclosure includes: an attribute storage unit configured to store attributes for each area for each of a plurality of floors of a first building; first user specification unit configured to specify a user in the first building on a basis of an image or images captured by at least one of a plurality of first cameras provided in the first building; a floor judgement unit configured to, when the user specified by the first user specification unit moves from a departure floor to an arrival floor among the plurality of floors of the first building by utilizing one of one or more ascending/descending facilities provided in the first building, judge the arrival floor of the user on a basis of an image or images captured by at least one of the plurality of cameras; a behavior information acquisition unit configured to acquire behavior information representing behavior of the user on the arrival floor judged by the floor judgement unit on a basis of an image or images captured by at least one of the plurality of first cameras for the user specified by the first user specification unit; an interest information acquisition unit configured to acquire interest information representing a degree of interest of the user for each attribute on a basis of a relationship between arrangement and attributes of areas on the arrival floor judged by the floor judgement unit and the behavior information acquired by the behavior information acquisition unit for the user specified by the first user specification unit; an interest information storage unit configured to store the interest information acquired by the interest information acquisition unit for each user, including information on a time point and a location; a reception unit configured to receive an image or images of users of a third building from an external system applied to the third building; a third user specification unit configured to specify a user on a basis of the image or images received by the reception unit; and a visualization processing unit configured to generate an interest degree map by visualizing distribution of degrees of interest of the users of the third building on a floor for which information on attributes is judged among a plurality of floors of the third building using the information stored in the interest information storage unit as interest information for the user specified by the third user specification unit, and information on attributes for each area of at least one of the plurality of floors of the third building judged on a basis of the image or images received by the reception unit.

An interest degree measurement system according to the present disclosure includes: an attribute storage unit configured to store attributes for each area for each of a plurality of floors of a first building; a first user specification unit configured to specify a user in the first building on a basis of an image or images captured by at least one of a plurality of cameras provided in the first building; a floor judgement unit configured to, when the user specified by the first user specification unit moves from a departure floor to an arrival floor among the plurality of floors of the first building by utilizing one or more ascending/descending facilities provided in the first building, judge the arrival floor of the user on a basis of an image or images captured by at least one of the plurality of first cameras; a behavior information acquisition unit configured to acquire behavior information representing behavior of the user on the arrival floor judged by the floor judgement unit on a basis of the image or images captured by at least one of the plurality of first cameras for the user specified by the first user specification unit; an interest information acquisition unit configured to acquire interest information representing a degree of interest of the user for each attribute on a basis of a relationship between arrangement and attributes of areas on the arrival floor judged by the floor judgement unit and the behavior information acquired by the behavior information acquisition unit; an interest information storage unit configured to store the interest information acquired by the interest information acquisition unit for each user, including information on a time point and a location; a reception unit configured to receive, from an external system, an image or images of a user who starts utilization of one or more ascending/descending facilities provided in a third building; a third user specification unit configured to specify a user on a basis of the image or images received by the reception unit; and a transmission unit configured to transmit, to the external system, information on candidates for a destination with a high degree of interest of the user stored in the interest information storage unit for the user specified by the third user specification unit.

A simulation system according to the present disclosure includes: the above-described interest degree measurement system; and a simulation processing unit configured to set simulation conditions on a basis of existing conditions stored in the interest information storage unit and simulate change of the interest information using new conditions obtained by changing the existing conditions acquired by the interest information acquisition unit.

Advantageous Effects of the Invention

According to an interest degree measurement system or a simulation system according to the present disclosure, it is possible to obtain information of interest of users in a building even for a user who does not possess mobile equipment registered in advance and simulate change of the information.

BRIEF DESCRIPTION OF DRAWINGS

FIG. 5E is a view illustrating an example of the behavior information acquired by the behavior information acquisition unit according to Embodiment 1.

FIG. 6 is a table indicating an example of judgement by the floor judgement unit according to Embodiment 1.

FIG. 7B is a view illustrating an example of judgement by the floor judgement unit according to Embodiment 1.

FIG. 10A is a view illustrating an example of acquisition of the interest information by the interest degree measurement system according to Embodiment 1.

FIG. 15D is a view illustrating an example of a result of simulation by the simulation system according to Embodiment 1.

DESCRIPTION OF EMBODIMENTS

Figure 1:
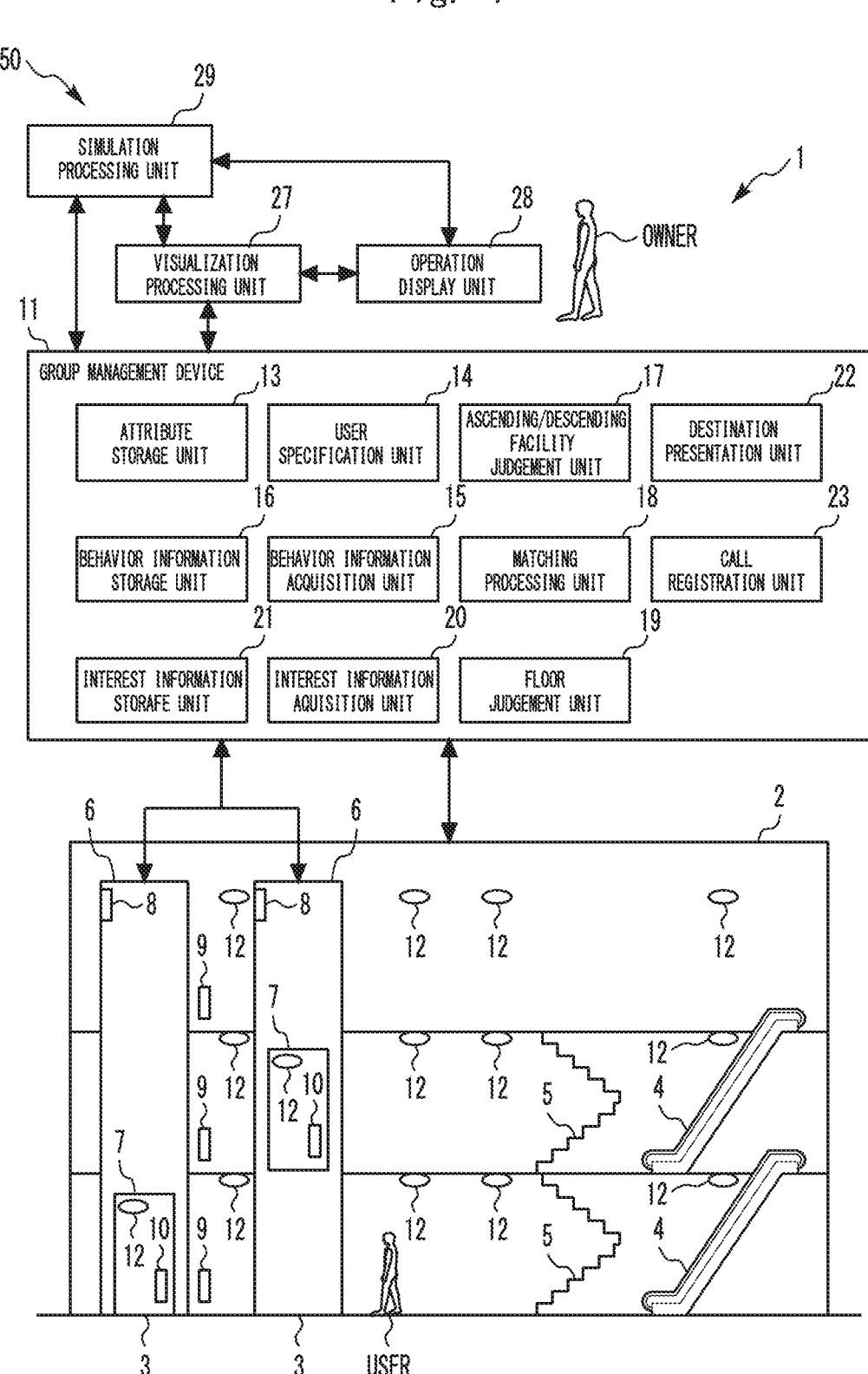
FIG. 1 is a configuration diagram of a simulation system according to Embodiment 1.

Embodiments for implementing the present disclosure will be described with reference to the accompanying drawings. In each drawing, the same reference numerals will be assigned to the same or corresponding portions, and overlapping description will be simplified or omitted as appropriate.

Embodiment 1

FIG. 1 is a configuration diagram of a simulation system 50 according to Embodiment 1.

The simulation system 50 includes an interest degree measurement system 1. The interest degree measurement system 1 is applied to a building 2 including a plurality of floors. The interest degree measurement system 1 is a system that visualizes areas with high degrees of interest of users of the building 2, for example, to an owner of the building 2. The users of the building 2 include, for example, a visitor who visits the building 2, a person who engages in operation in the building 2, and the like.

In the building 2, one or more ascending/descending facilities are provided. The ascending/descending facility is a facility to be utilized by the user of the building 2 to move between the plurality of floors. In the building 2 in this example, a plurality of ascending/descending facilities are provided. The ascending/descending facilities include, for example, an elevator 3, an escalator 4, stairs 5, and the like. On each floor of the building 2, a landing entrance of the stairs 5 is provided. A user who moves from a departure floor to an arrival floor by utilizing the stairs 5 starts utilization of the stairs 5 from the landing entrance on the departure floor. Then, the user completes utilization of the stairs 5 at the landing entrance on the arrival floor. Note that the stairs 5 may be a slope that is inclined between floors.

In this example, a plurality of elevators 3 are applied to the building 2 as the ascending/descending facilities. Each elevator 3 is a conveyance device that transports the user between the plurality of floors. In the building 2, a hoistway 6 of the elevator 3 is provided. The hoistway 6 is a space across the plurality of floors. On each floor of the building 2, a hall of the elevator 3 is provided. The hall of the elevator 3 is a space adjacent to the hoistway 6. Each elevator 3 includes a car 7, a control panel 8, and a hall operating panel 9. The car 7 is a device that transports the user who is inside the car 7 between the plurality of floors by traveling up and down through the hoistway 6. The car 7 includes a car operating panel 10. The car operating panel 10 is a device that accepts operation by the user who designates a destination floor of the car 7. The control panel 8 is, for example, a device that controls traveling, or the like, of the car 7 in accordance with call registered in the elevator 3. The hall operating panel 9 is a device that accepts operation by the user who registers call in the elevator 3. The hall operating panel 9 is, for example, provided at a hall on each floor. The hall operating panel 9 may be shared among the plurality of elevators 3. The user who moves from the departure floor to the arrival floor by utilizing the elevator 3 registers call, for example, by operating the hall operating panel 9 at the hall on the departure floor. The user starts utilization of the elevator 3 by getting on the car 7 from the hall on the departure floor. Then, the user completes utilization of the elevator 3 by getting off the car 7 at the hall on the arrival floor. In the building 2 in this example, a group management device 11 that manages operation such as assignment of call to the plurality of elevators 3 is provided. Here, in the building 2, equipment as an alternative to the group management device as independent equipment, equipment in which software having functions of the group management device is installed as independent equipment, or the like, may be provided. Some or all of functions of data processing regarding management of operation, and the like, may be installed on the control panel 8. Alternatively, some or all of functions of data processing regarding management of operation, and the like, may be installed on a server device, or the like, that can perform communication with each elevator 3. The server device may be provided either inside or outside of the building 2. Further, some or all of functions of data processing regarding management of operation, and the like, may be installed on virtual machine on a cloud service that can perform communication with each elevator 3. Some or all of functions of data processing regarding management of operation, and the like, may be implemented by dedicated hardware, or may be implemented by software or may be implemented using dedicated hardware and software in combination. Each means for performing data processing regarding management of operation, and the like, described above as examples will be hereinafter referred to as the group management device 11 regardless of its configuration.

The escalator 4 is built between an upper floor and a lower floor. The escalator 4 is a conveyance device that transports a user between the upper floor and the lower floor. On each floor of the building 2, a landing entrance of the escalator 4 is provided. A user who moves from a departure floor to an arrival floor by utilizing one or more escalators 4 starts utilization of the escalator 4 from an entrance on the departure floor. The user may transfer a plurality of escalators 4 between the departure floor and the arrival floor. Then, the user completes utilization of the escalator 4 at an exit on the arrival floor.

In the building 2, a plurality of cameras 12 are provided. Each camera 12 is a device that captures an image or images at a location where the camera is provided. An image or images to be captured by each camera 12 includes, for example, a still image and a moving image. A format of the image or images to be captured by each camera 12 may be, for example, a format of a compressed image such as Motion JPEG, AVC and HEVC. Alternatively, the format of the image or images to be captured by each camera 12 may be a format of a non-compressed image. Each camera 12 has a function of outputting the captured image to external equipment. In this example, the respective cameras 12 synchronize with each other so as to be able to acquire images captured at the same time as images at the same time point.

In this example, the plurality of cameras 12 include a camera 12 provided on each floor. The plurality of cameras 12 include a camera 12 provided inside the car 7 of the elevator 3. The plurality of cameras 12 include a camera 12 provided above the landing entrance of the escalator 4. The plurality of cameras 12 include a camera 12 provided above the landing entrance of the stairs 5. The plurality of cameras 12 may include a camera 12 provided outside such as an entrance, a periphery and a courtyard of the building 2 in a similar manner to the camera 12 provided on each floor. The plurality of cameras 12 may include a camera 12 provided at the hall of the elevator 3 in a similar manner to the camera 12 provided on each floor. The plurality of cameras 12 may include a camera 12 provided above a portion before the landing entrance of the escalator 4 in a similar manner to the camera 12 provided above the landing entrance of the escalator 4. The plurality of cameras 12 may include a camera 12 provided above a portion before the landing entrance of the stairs 5 in a similar manner to the camera 12 provided above the landing entrance of the stairs 5.

The interest degree measurement system 1 may include part or all of the plurality of cameras 12. Alternatively, part or all of the plurality of cameras 12 may be an external device of the interest degree measurement system 1. The interest degree measurement system 1 performs guidance through information processing based on an image or images acquired from each of the cameras 12. The interest degree measurement system 1 includes an attribute storage unit 13, a user specification unit 14, a behavior information acquisition unit 15, a behavior information storage unit 16, an ascending/descending facility judgement unit 17, a matching processing unit 18, a floor judgement unit 19, an interest information acquisition unit 20, an interest information storage unit 21, a destination presentation unit 22, a call registration unit 23, and a visualization processing unit 27 as portions that perform information processing. In this example, the attribute storage unit 13, the user specification unit 14, the behavior information acquisition unit 15, the behavior information storage unit 16, the ascending/descending facility judgement unit 17, the matching processing unit 18, the floor judgement unit 19, the interest information acquisition unit 20, the interest information storage unit 21, the destination presentation unit 22, and the call registration unit 23 of the interest degree measurement system 1 are mounted on a group management device 11. Here, part or all of the portions that perform information processing in the interest degree measurement system 1 may be mounted on an external server device, or the like, that can perform communication, different from the group management device 11. Further, part or all of the portions that perform information processing in the interest degree measurement system 1 may be mounted on an external server device that can perform communication, different from the server device provided in the building 2. Still further, part or all of the portions that perform information processing in the interest degree measurement system 1 may be implemented by storage or processing resources on a cloud service.

The attribute storage unit 13 is a portion that stores information. In the attribute storage unit 13, an attribute for each area of each floor of the building 2 is stored. The area of each floor is a portion which is part or all of the floor. The area of each floor is, for example, a portion, or the like, to be occupied by a tenant of the floor. The area of each floor may be, for example, a portion of a store, or the like, that is open on the floor. The attribute storage unit 13 stores information for specifying an area, for example, as a range of coordinates or the like on each floor. The area is not limited to a two-dimensional plane and may be, for example, a high-dimensional space such as a three-dimensional space. Further, an attribute of an area represents one or more objects, matters, persons, and the like. For example, in a case where the area is a store, the attribute of the area is a type of the store, a type of an article or a service dealt with at the store, or the like. For example, in a case where the area is a store, the attribute of the area may be name of the store, name of an article or a service dealt with at the store, or the like. For example, in a case where the area is an office, the attribute of the area may be a person, and the like, in the office. In other words, the attribute of the area is a goal of the user. Each area may have a plurality of attributes. One or more attributes of each area may be provided by a person or may be provided using artificial intelligence (AI).

The user specification unit 14 has a function of specifying a user of the building 2 on the basis of an image or images captured by at least one camera 12. The user specification unit 14 specifies a user, for example, by checking face information of the user extracted from the image or images against, if any, existing information through two-dimensional face authentication and settles specification of the user. In a case where the user is a new user, or the like, for whom there is no existing information, the user specification unit 14 may newly register face information of the user extracted from the image or images. Here, for example, characteristics of the nose, ears, eyes, mouth, cheek, jaw, neck, and the like, in the face are utilized as the face information. Further, to prevent abuse of the face information, the user specification unit 14 may acquire, for example, information on the iris, pupils, or the like, of the eyes. In a case where the pupils of the eyes do not have a shape of a circle, ellipse, or the like, and have concavities and convexities, in a case where it is judged that iris information is abnormal, or the like, the user specification unit 14 may detect a risk that false face information created through AI, or the like, has been acquired, or a risk that face information in a state where black sunglasses, or the like, that shield the iris are worn has been acquired and may issue an alert, or the like.

The behavior information acquisition unit 15 has a function of acquiring behavior information of the user specified by the user specification unit 14. The behavior information of the user is, for example, time-series data of information representing layout of the user position. The behavior information is not limited to three-dimensional information combining a two-dimensional plane and a time axis and may be, for example, higher-dimensional information combining a high-dimensional space such as a three-dimensional space and a time axis. The layout of the user position includes, for example, information on a floor on which the user is located, a coordinate of the user on the floor, orientation of the user, and the like. The layout of the user position may include information for specifying the ascending/descending facility in a case where the user utilizes one of the ascending/descending facilities. The behavior information as time-series data includes, for example, information on layout of the user position acquired for each time interval set in advance. The behavior information acquisition unit 15 acquires the behavior information of the user on the basis of the image or images captured by at least one camera 12. The behavior information acquisition unit 15 continuously updates the behavior information of the user, for example, for each time interval set in advance.

The behavior information storage unit 16 is a part that stores information. The behavior information storage unit 16 stores the behavior information acquired by the behavior information acquisition unit 15 for each user specified by the user specification unit 14. In this example, the behavior information storage unit 16 stores identification information unique to the user necessary for specification by the user specification unit 14, the behavior information of the user, and information on a time point and a location at which the behavior information is acquired in association with one another.

The ascending/descending facility judgement unit 17 has a function of judging an ascending/descending facility to be utilized by the user specified by the user specification unit 14. The ascending/descending facility judgment unit 17 judges the ascending/descending facility that is to be utilized on the basis of the image or images captured by at least one camera 12. For example, when the user starts utilization of one of the ascending/descending facilities on the departure floor, the ascending/descending facility judgment unit 17 judges the ascending/descending facility as the ascending/descending facility to be utilized by the user.

The matching processing unit 18 has a function of achieving matching between specification of the user by the user specification unit 14 and judgement of the ascending/descending facility to be utilized by the user by the ascending/descending facility judgement unit 17. Processing of achieving matching is performed, for example, as follows. There is a possibility that the user specification unit 14 may erroneously specify different users as the same user. In this case, there is a possibility that the ascending/descending facility judgement unit 17 may judge two or more ascending/descending facilities as the ascending/descending facility to be utilized by the user at the same time for the users specified as the same user by the user specification unit 14. The same person cannot redundantly utilize two or more ascending/descending facilities at the same time, and thus, the matching processing unit 18 requests modification of specification of the user to the user specification unit 14. In this event, the user specification unit 14 specifies the users erroneously specified as the same user, as users different from each other. When the user specification unit 14 specifies the users as users different from each other, the user specification unit 14 extracts a difference in a feature amount or feature amounts of the users from the acquired image or images, improves accuracy of specification of the user and resettles specification of the users different from each other. The user specification unit 14 may perform adjustment by, for example, narrowing down a range of the feature amount or feature amounts judged as the same user in accordance with the extracted difference in the feature amount or feature amounts. The user specification unit 14 may improve accuracy of specification of the user on the basis of the extracted difference in the feature amount or feature amounts using other methods.

The floor judgement unit 19 has a function of judging an arrival floor of the user specified by the user specification unit 14. The arrival floor of the user is a floor on which the user who utilizes the ascending/descending facility completes utilization of the ascending/descending facility. For example, in a case where the user utilizes the elevator 3, the arrival floor of the user is a floor on which the user gets off the elevator 3. The floor judgment unit 19 judges the arrival floor on the basis of the image or images captured by at least one camera 12. For example, when the user completes utilization of the ascending/descending facility on one of the floors, the floor judgement unit 19 judges the floor as the arrival floor of the user.

The interest information acquisition unit 20 has a function of acquiring interest information of the user specified by the user specification unit 14. The interest information of the user is information representing a degree of interest of the user for each attribute assigned to the area. The interest information acquisition unit 20 acquires interest information on the basis of behavior of the user on the arrival floor. Here, the behavior of the user includes information such as, for example, a period during which the user stays on the arrival floor of the area and a concern direction which is a direction in which the user shows interest of the area on the arrival floor. In this example, the interest information acquisition unit 20 acquires interest information on the basis of the behavior of the user analyzed by the information stored in the attribute storage unit 13, and the behavior information acquired by the behavior information acquisition unit 15 or the behavior information stored in the behavior information storage unit 16. The interest information represents whether or not the user has interest as one element and represents a level of interest as the other element. The level of interest is analyzed using one or both of a period during which the user shows concern in an attribute assigned to the area located in the concern direction and a period during which the user stays, as elements. The interest information acquisition unit 20 adds information every time information from each floor is added to each user. The interest information acquisition unit 20 accordingly sorts levels of interest obtained as a result of analysis based on the updated information in order of priority.

The interest information storage unit 21 is a part that stores information. In the interest information storage unit 21, the interest information is stored for each user. In this example, the interest information storage unit 21 stores identification information unique to the user, the interest information of the user, and information on a time point and a location at which the interest information is acquired in association with one another.

The destination presentation unit 22 has a function of presenting a destination to the user on the basis of the interest information stored in the interest information storage unit 21. The destination presentation unit 22, for example, presents an area having an attribute with a high degree of interest of the user to the user as the destination. Information on the destination to be presented by the destination presentation unit 22 includes, for example, an attribute of the destination, a destination floor which is a floor including the destination, a route to the destination from a current position of the user, and the like. The destination presentation unit 22 performs presentation to the user, for example, using a video. The video to be displayed by the destination presentation unit 22 includes, for example, characters, a still image, an image, and the like. The video may be, for example, a two-dimensional video displayed by display equipment such as a display, projection equipment such as a projector, or the like. Alternatively, the video may be a spatial video displayed in a three-dimensional manner. The video is displayed, for example, inside the car 7 of the elevator 3, at the hall of the elevator 3, at the landing entrance of the escalator 4, at the landing entrance of the stairs 5, or the like. Further, the display equipment may be, for example, a light indicating a destination, a liquid crystal display, an organic electro-luminescence (organic EL) display, a light-emitting film, a light emitting diode (LED) display, a projector, a stereoscopic (3D) display, or the like. Alternatively, the destination presentation unit 22 may perform presentation to the user using, for example, a speech. Equipment that emits a speech such as a speaker is provided, for example, inside the car 7 of the elevator 3, at the hall of the elevator 3, at the landing entrance of the escalator 4, at the landing entrance of the stairs 5, or the like.

The call registration unit 23 has a function of registering call to the destination floor presented by the destination presentation unit 22 in the elevator 3 for which the user starts utilization. Here, the call registration unit 23 may judge whether or not to register call to the destination floor presented to the user in accordance with order of priority analyzed using behavior of the user in response to the presentation, that is, using part or all of the period during which the user stays an area, whether or not the user has interest in an area, and a level of interest in an area as elements. The call registration unit 23, for example, registers the call in the elevator 3 on which the user gets on the car 7. In a case where the call registration unit 23 is an external device of the group management device 11, the call registration unit 23 may input control information for registering the call to the group management device 11.

The visualization processing unit 27 is a portion having a function of generating an interest degree map. The interest degree map is, for example, information that visualizes distribution of degrees of interest of the users in the building 2. The visualization processing unit 27 generates the interest degree map using the information stored in the interest information storage unit 21. The visualization processing unit 27, for example, visualizes distribution of degrees of interest on one of the floors of the building 2 as the interest degree map. In the interest degree map, the distribution of the degrees of interest is visualized by information of, for example, a table, a graph or a drawing. The visualization processing unit 27 may generate the interest degree map including the information stored in the behavior information storage unit 16. The visualization processing unit 27 may generate the interest degree map including information on the destination actually presented to the user by the destination presentation unit 22. In a case where the behavior information is visualized, evaluation from a viewpoint of the user may be performed as to, for example, whether guidance by the destination presentation unit 22 is appropriate or whether congestion that irritates the user does not occur, by tracing behavior within the building for each user by moving a time point. The visualization processing unit 27 may generate the interest degree map including classification information such as gender or age of the user, both of them, or other information. Further, the interest degree map to be generated is not limited to a three-dimensional map including an axis indicating a degree of interest in a two-dimensional bird's-eye map and may be higher-dimension information such as, for example, a moving image of a solid so as to be able to visualize more detailed behavior and a degree of interest in an easy-to-understand manner.

The interest degree measurement system 1 includes an operation display unit 28. The operation display unit 28 has a function of displaying information to be processed in the interest degree measurement system 1 to, for example, an owner, or the like, of the building 2. The function of display is implemented by, for example, a monitor, a projector, an LED display, a smartphone, smart glasses, a VR display, an AR display, an MR display, a stereo (3D) display, or the like. Further, the operation display unit 28 has a function of emitting sound as necessary as an aid for display or as an alternative to display. The operation display unit 28 has, for example, a function of accepting operation by the owner, or the like, of the building 2. The function of the operation is implemented by, for example, a button, a keyboard, a touch panel, eye tracking, a sensor, speech recognition, or the like. The operation display unit 28 may be an external device of the interest degree measurement system 1. The operation display unit 28 may be a device separate from portions such as the visualization processing unit 27 of the interest degree measurement system 1. Alternatively, the operation display unit 28 may be a device integrated with portions such as the visualization processing unit 27 of the interest degree measurement system 1. The operation display unit 28, for example, displays information on the interest degree map, or the like, generated in the interest degree measurement system 1. The operation display unit 28, for example, accepts operation, or the like, for generating the interest degree map in the interest degree measurement system 1. The operation display unit 28 may perform display using a display method employing any mechanism if the mechanism can perform display that can be recognized by the owner (a corporation or a person) of the building 2, an administrator (a corporation or a person) of a tenant of the building 2, or an agent (a corporation or a person) thereof, a manufacturer (a corporation or a person) of the interest degree measurement system 1, a person (a corporation or a person) who performs maintenance, or AI, a robot, or the like, that is substituted for these corporations or persons. Further, the operation display unit 28 may provide sound or voice as an alternative to display or as an aid for display. The operation display unit 28 may accept operation in any mechanism if the mechanism allows operation by the owner (a corporation or a person) of the building 2, an administrator (a corporation or a person) of a tenant of the building 2, or an agent (a corporation or a person) thereof, a manufacturer (a corporation or a person) of the interest degree measurement system 1, a person (a corporation or a person) who performs maintenance, or AI, software, hardware, or the like, that is substituted for these corporations or persons. Hereinafter, a subject of these kinds of operation will be referred to as an "owner, or the like". Operation for generating the interest degree map is performed by, for example, the owner, or the like, of the building 2. In this event, the operation display unit 28 may also accept operation, or the like, of input of generation conditions of the interest degree map together.

The owner, or the like, of the building 2 causes the interest degree measurement system 1 to, for example, automatically calculate a tenant fee of the building 2 in accordance with market price from the information on the interest degree map, or the like, displayed by the operation display unit 28. Here, the market price of the tenant fee is, for example, correspondence between levels of interest and tenant fees, set in accordance with a site location of the building. The owner, or the like, of the building 2 may, for example, use the calculated tenant fee to help judgement regarding management, or the like, of the building 2. Further, the owner, or the like, of the building 2 utilizes information on the interest degree map, or the like, as, for example, a judgement material for improving value of the building 2. Still further, there is a case where there is a user who exhibits suspicious behavior that deviates from the main tendencies of users in the building 2. The owner, or the like, of the building 2 may utilize information on the interest degree map, or the like, displayed by the operation display unit 28 to avoid a risk such as theft and an accident by, for example, directing attention to the user who exhibits suspicious behavior. This can improve safety, or the like, of the building 2.

The simulation system 50 includes a simulation processing unit 29 as a portion that performs information processing. The simulation processing unit 29 has a function of setting simulation conditions and simulating change of the interest information acquired by the interest information acquisition unit 20 in the building 2. In this example, the simulation processing unit 29 is mounted at a server device, or the like, that can perform communication with devices in the interest degree measurement system 1 such as the group management device 11. Note that part or all of portions that perform information processing in the simulation system 50 may be mounted on devices in the interest degree measurement system 1 such as the group management device 11. Further, part or all of the portions that perform information processing in the simulation system 50 may be a device different from the operation display unit 28, or the like, of the interest degree measurement system 1. Still further, part or all of the portions that perform information processing in the simulation system 50 may be a device integrated with the operation display unit 28, or the like, of the interest degree measurement system 1. Further, part or all of the portions that perform information processing in the simulation system 50 may be mounted on an external server device, or the like that can perform communication, different from the server device provided in the building 2. Further, part or all of the portions that perform information processing in the simulation system 50 may be implemented by processing or storage resources on a cloud service.

The operation display unit 28, for example, displays a result of simulation in the simulation system 50. The result of simulation represents, for example, change of the interest degree map, or the like. Further, the result of simulation may include, for example, information on the tenant fee calculated in accordance with the market price from the information on the changed interest degree map. The operation display unit 28, for example, accepts operation, or the like, for setting simulation conditions and starting simulation in the simulation system 50. The operation is performed by, for example, the owner, or the like, of the building 2. This enables the result of simulation in the simulation system 50 to be utilized as a judgement material with higher accuracy for further improving value of the building 2.

Figure 2:
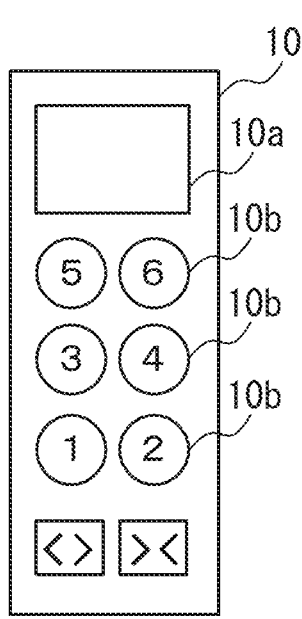
FIG. 2 is a view illustrating an example of the car operating panel according to Embodiment 1.

FIG. 2 is a view illustrating an example of the car operating panel 10 according to Embodiment 1.

The car operating panel 10 includes a display panel 10*a* and a plurality of destination buttons 10*b*. The display panel 10*a* is display equipment that displays information to the user who is inside the car 7. The display panel 10*a* displays, for example, a traveling direction and a current floor of the car 7. Each destination button 10*b* corresponds to one of the floors. Each destination button 10*b* is a button that accepts operation of designating a corresponding floor as the destination floor. Each destination button 10*b* includes light emission equipment (not illustrated) that is lighted, for example, when the destination button 10*b* is operated by the user. In this example, the light emission equipment is equipment for which brightness of light emission, color tone, whether or not the light blinks, blinking speed, and the like, are variable.

Figure 3:
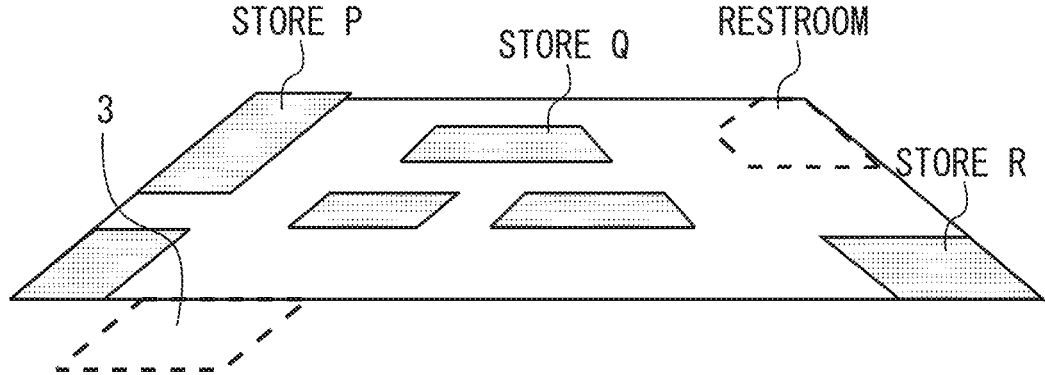
FIG. 3 is a view illustrating an example of areas on the floor according to Embodiment 1.

FIG. 3 is a view illustrating an example of areas on the floor according to Embodiment 1.

FIG. 3 illustrates a floor map of one of the floors.

The floor illustrated in FIG. 3 includes a plurality of areas each of which is a store. One of the areas is a store P which deals with an article P1 and an article P2. One of the areas is a store Q which deals with an article Q1 and an article Q2. One of the areas is a store R which provides a service R1 and a service R2.

In this event, the attribute storage unit 13 stores, for example, name of the store "store P" and name of articles "P1" and "P2", and the like, as an attribute of the area of the store P. In a case where the article P1 and the article P2 are groceries, and the store P is a grocery store, the attribute storage unit 13 may store, for example, a type of the store "grocery store" and a type of articles "groceries" as the attribute of the area.

Figure 4A:
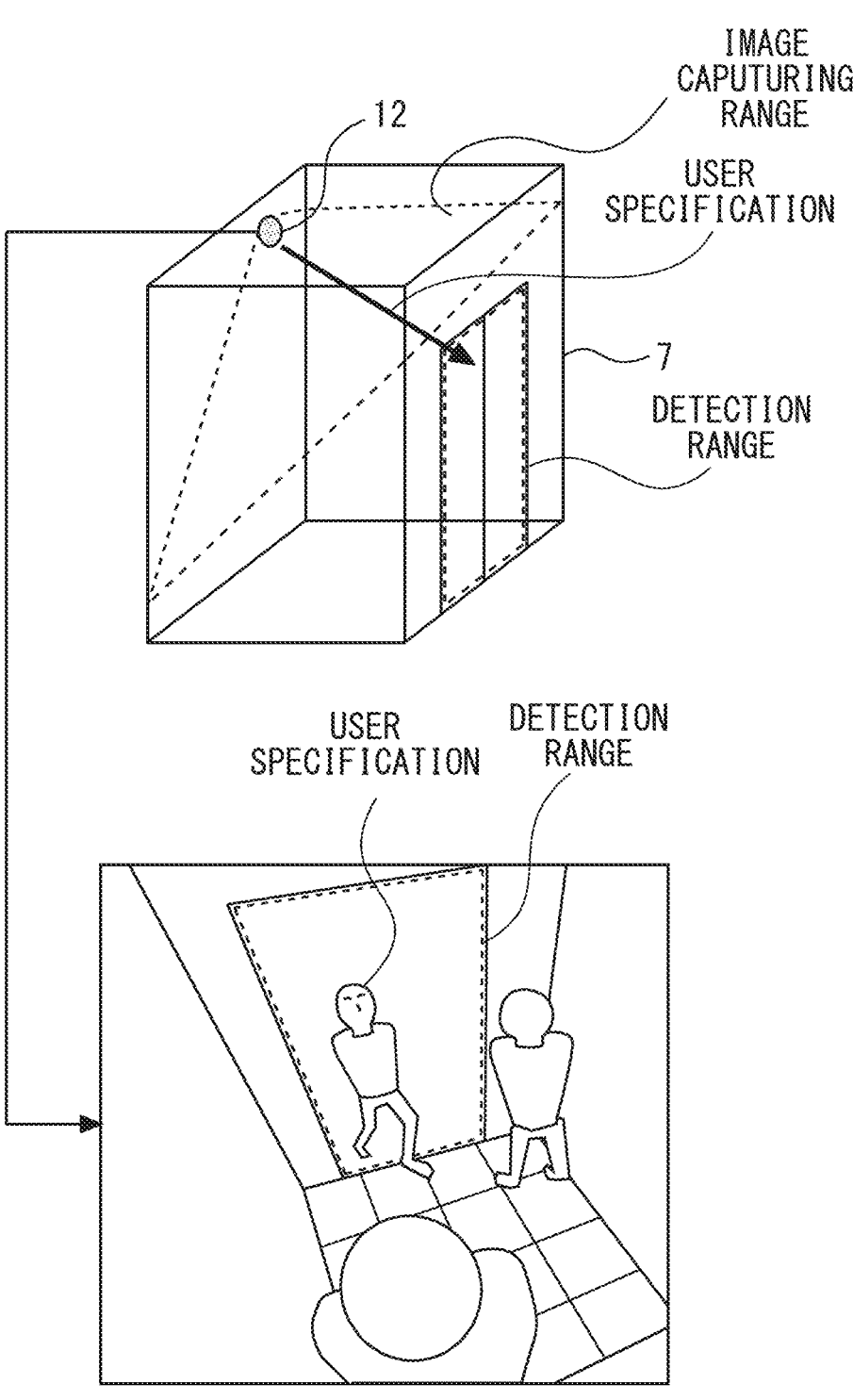
FIG. 4A is a view illustrating an example of layout of the cameras according to Embodiment 1.
Figure 4B:
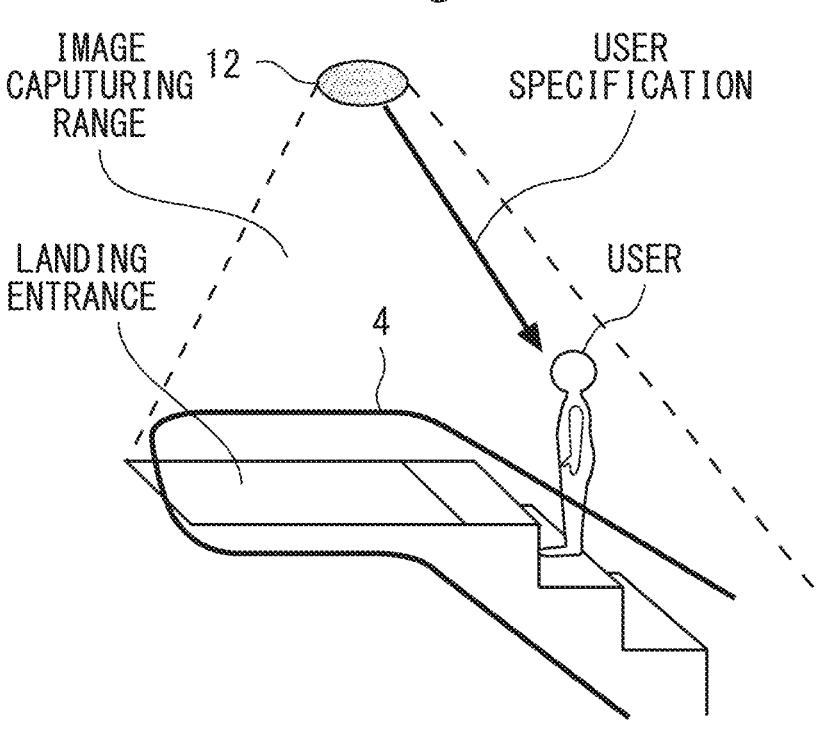
FIG. 4B is a view illustrating an example of layout of the cameras according to Embodiment 1.
Figure 4C:
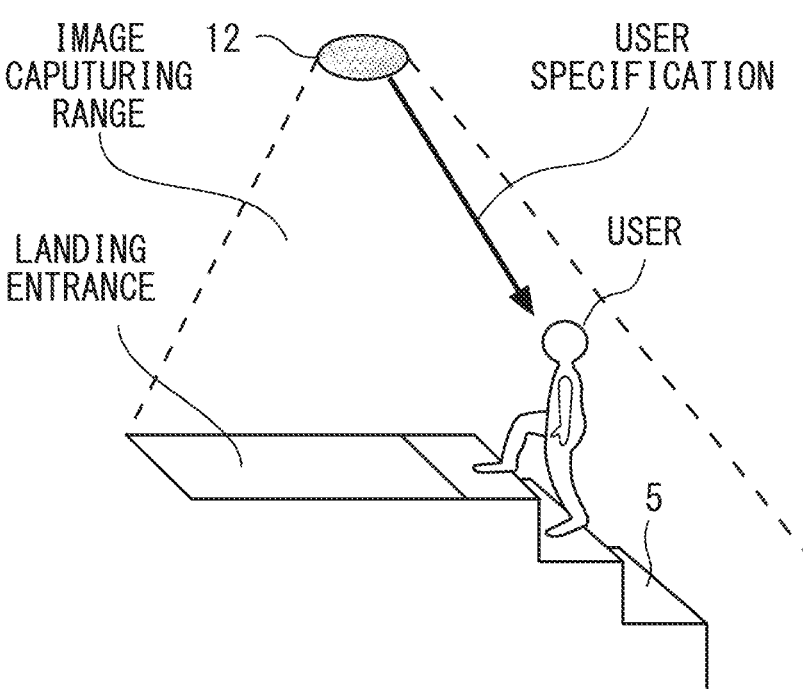
FIG. 4C is a view illustrating an example of layout of the cameras according to Embodiment 1.

FIG. 4A to FIG. 4C are views illustrating an example of layout of the cameras 12 according to Embodiment 1.

As illustrated in FIG. 4A, one of the cameras 12 is provided inside the car 7 of the elevator 3. The camera 12 is attached to, for example, an upper portion of a wall, a ceiling, or the like. The camera 12 is provided, for example, at a position at which the camera 12 can capture an image or images of the face of a user who gets on the car 7. Further, one of the cameras 12 is provided at the hall of the elevator 3. The camera 12 is attached to, for example, an upper portion of a wall, a ceiling, or the like.

As illustrated in FIG. 4B, one of the cameras 12 is provided at the landing entrance of the escalator 4. Alternatively, one of the cameras 12 may be provided on a wall surface of an inclined portion before the landing entrance of the escalator 4. The camera 12 is attached to, for example, an upper portion of a wall, a ceiling, or the like. The camera 12 may be attached to a pole, or the like, provided at the landing entrance.

As illustrated in FIG. 4C, one of the cameras 12 is provided at the landing entrance of the stairs 5. Alternatively, one of the cameras 12 may be provided on a wall surface of an inclined portion before the landing entrance of the stairs 5. The camera 12 is attached to, for example, an upper portion of a wall, a ceiling, or the like. The camera 12 may be attached to a pole, or the like, provided at the landing entrance.

Subsequently, an example of the behavior information will be described using FIG. 5.

FIG. 5A to FIG. 5E are views illustrating an example of the behavior information acquired by the behavior information acquisition unit 15 according to Embodiment 1.

The behavior information acquisition unit 15, for example, extracts feature amounts of the user from the image or images used by the user specification unit 14 to specify the user. The behavior information acquisition unit 15 may utilize the feature amounts extracted by the user specification unit 14. The feature amounts of the user include, for example, information on positions of feature points such as the nose, ears, eyes, mouth, cheek, jaw and neck of the face and both shoulders. The behavior information acquisition unit 15 acquires the behavior information of the user on the basis of the extracted feature amounts. In this example, the behavior information acquisition unit 15 acquires information including concern direction information as information of layout of the user position included in the behavior information of the user. Here, the behavior information acquisition unit 15 continuously acquires the behavior information of the user by tracking the user specified by the user specification unit 14. The behavior information acquisition unit 15 may track the position of the specified user using, for example, a method such as dynamic body tracking. The behavior information acquisition unit 15 may continuously acquire the behavior information of the user who is no longer in the image or images as a result of moving, by tracking the user.

The concern direction information is an example of information on a direction indicating interest of the user. The concern direction information is information represented using at least three feature amounts of both shoulders and the nose of the user. The concern direction information may be represented using other feature amounts as necessary. In the concern direction information, the concern direction of the user is represented as a direction from a midpoint of a line segment connecting positions of both shoulders toward a position of the nose. Here, it is only necessary to capture feature amounts of the nose as the feature amounts to be used as the concern direction information regardless of whether or not the nose of the user is covered with a face mask, or the like, that is, whether or not the naked nose itself of the user is in the image or images. Further, it is only necessary to capture feature amounts of the shoulders as the feature amounts to be used as the concern direction information regardless of whether or not the shoulders are covered with cloths, or the like, that is, the naked shoulders themselves of the user are in the image or images. In a similar manner, it is only necessary to capture other feature amounts of organs such as the ears, eyes, mouth, cheek, jaw and neck regardless of whether or not the naked organs themselves of the user are in the image or images. Further, the concern direction information may be represented using, for example, feature amounts of both shoulders and nose obtained using skeleton information of the user. Still further, the concern direction information may be represented using other feature amounts obtained using the skeleton information.

Figure 5A:
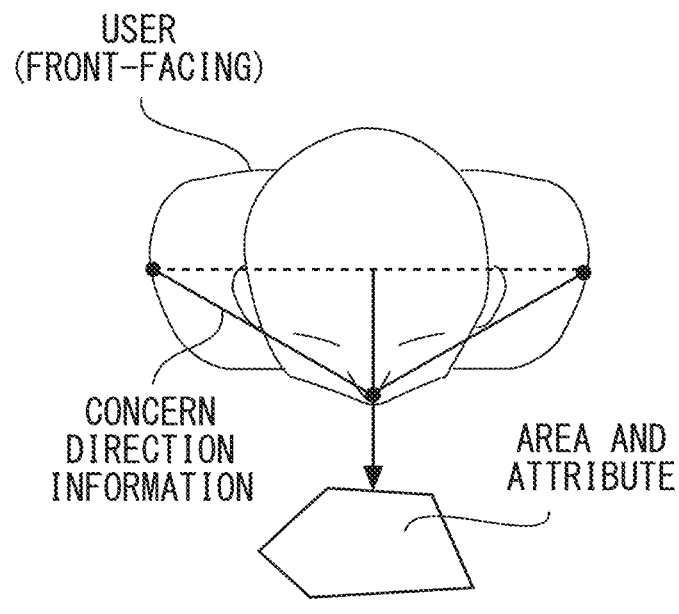
FIG. 5A is a view illustrating an example of the behavior information acquired by the behavior information acquisition unit according to Embodiment 1.
Figure 5B:
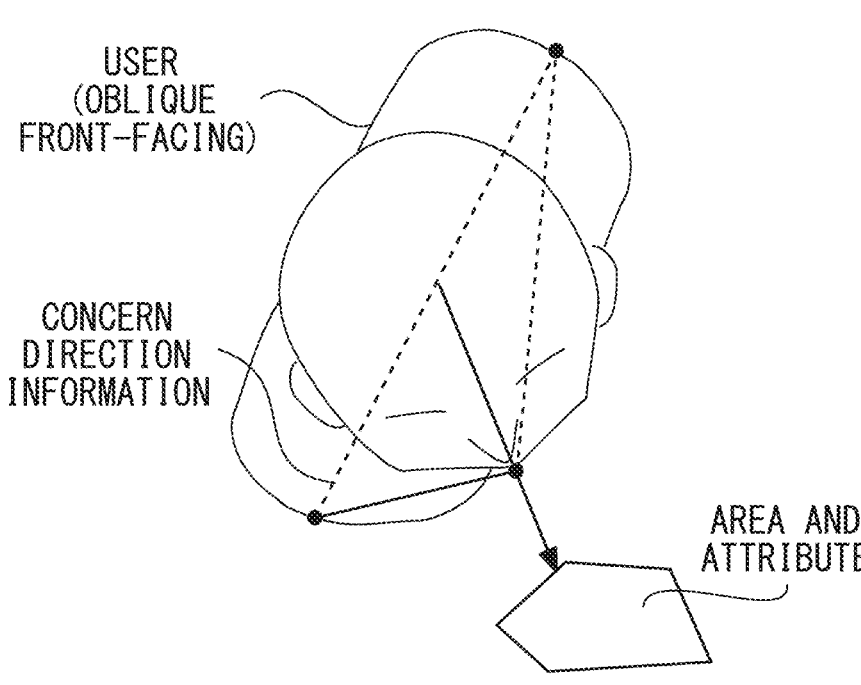
FIG. 5B is a view illustrating an example of the behavior information acquired by the behavior information acquisition unit according to Embodiment 1.
Figure 5C:
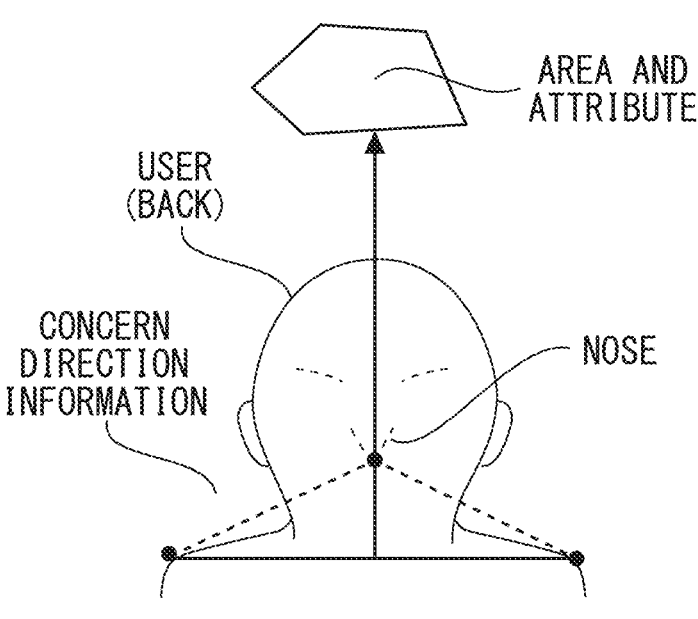
FIG. 5C is a view illustrating an example of the behavior information acquired by the behavior information acquisition unit according to Embodiment 1.
Figure 5D:
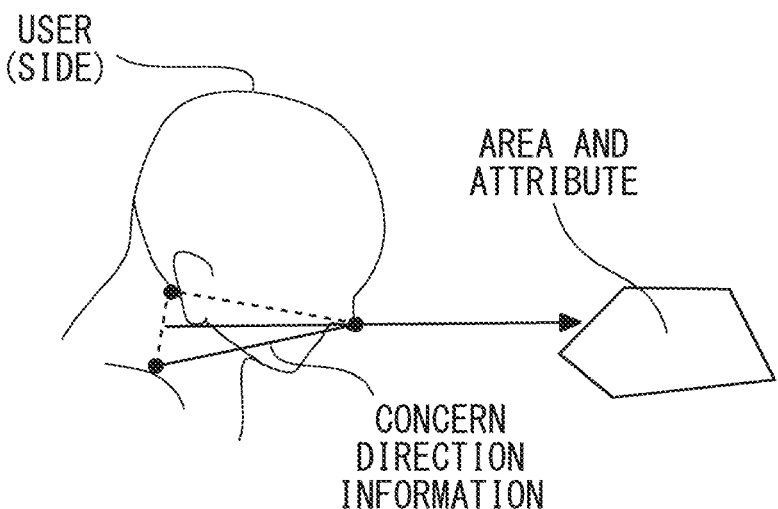
FIG. 5D is a view illustrating an example of the behavior information acquired by the behavior information acquisition unit according to Embodiment 1.

FIG. 5A illustrates an example of the user seen from above. In this manner, the direction indicating interest of the user is represented using the concern direction information acquired on the basis of the image of the user. FIG. 5B illustrates an example of the image in a case where a direction of the face does not match a direction of the body. In this manner, the direction indicating interest of the user is an extension in a direction from a midpoint of a line segment connecting positions of both shoulders of the user toward the nose. FIG. 5C illustrates an example of the image of the user seen from behind. In a case where the nose of the user is not in the image, the behavior information acquisition unit 15 may complement the nose by complementing the image from the acquired image information. Alternatively, the behavior information acquisition unit 15 may estimate the position of the nose on the basis of other feature points, and the like. Alternatively, the behavior information acquisition unit 15 may specify the position of the nose by synthesizing images captured by the plurality of cameras 12. The behavior information acquisition unit 15 specifies the position of the nose using one of these plurality of methods or a combination of these plurality of methods. In this manner, the direction indicating the interest of the user is represented as an extension of the direction from the midpoint of the line segment connecting the positions of both shoulders toward the position of the nose. FIG. 5D illustrates an example of the image of the user seen from side. In a case where one of the shoulders of the user is not in the image, the behavior information acquisition unit 15 may complement the other shoulder by complementing the image from the acquired image information. Alternatively, the behavior information acquisition unit 15 may estimate the position of the shoulder that is not in the image on the basis of other feature points, and the like. Alternatively, the behavior information acquisition unit 15 may specify positions of both shoulders by synthesizing images captured by the plurality of cameras 12. The behavior information acquisition unit 15 specifies the positions of both shoulders using one of these plurality of methods or a combination of these plurality of methods. In this manner, the direction indicating interest of the user is represented as an extension in a direction from the midpoint of the line segment connecting the positions of both shoulders toward the position of the nose.

As illustrated in FIG. 5E, information on the direction indicating interest of the user may be extracted through, for example, image processing or the like by AI installed on the behavior information acquisition unit 15. The image processing by the AI is, for example, processing, or the like, using a machine learning method that uses an image or images as an input. A model that derives behavior information from the image or images of a user or users is learned using the machine learning method. The behavior information acquisition unit 15 acquires behavior information of a user from an image or images of the user on the basis of the learned model. The behavior information acquisition unit 15 may, for example, perform supervised learning using a set of the image or images of the user or users and concern direction information obtained from the image or images as training data. Here, the concern direction information obtained from the image or images is, for example, concern direction information obtained from the positions of both shoulders and the nose. In this event, the behavior information acquisition unit 15 receives an input of the image or images of the user and outputs the concern direction information on the basis of the result of learning. The behavior information acquisition unit 15 may extract feature amounts of the image or images through deep learning. In FIG. 5E, an example of degrees of importance of the feature amounts of the image or images are indicated using color density. Alternatively, the behavior information acquisition unit 15 may extract information on the direction indicating interest of the user from the image or images using other machine learning methods such as unsupervised learning and reinforcement learning.

Subsequently, an example of judgement of the arrival floor will be described using FIG. 6.

FIG. 6 is a table indicating an example of judgement by the floor judgement unit 19 according to Embodiment 1.

FIG. 6 indicates an example of judgement of the arrival floor of the user who utilizes the elevator 3 that performs upward operation from the first floor. In this example, the elevator 3 performs descending operation to the first floor and then starts upward operation from the first floor. Note that the arrival floor is judged in a similar manner also in a case where the elevator 3 performs upward operation from other floors and in a case where the elevator 3 performs descending operation.

A user A who moves from the first floor to the fourth floor registers call in the elevator 3 through operation of the hall operating panel 9 on the first floor. Then, the user A gets on the car 7 of the elevator 3 that arrives on the first floor. The user A who gets on the car 7 designates the fourth floor as the destination floor through operation of the car operating panel 10.

When the car 7 of the elevator 3 departs from the first floor, the user specification unit 14 specifies the user who is inside the car 7 on the basis of the image or images captured by the camera 12 inside the car 7. In this example, only the user A is in the car 7. In this event, the user specification unit 14 specifies the user A as the user who is inside the car 7. The ascending/descending facility judgement unit 17 judges that the ascending/descending facility to be utilized by the user A is the elevator 3. The floor judgement unit 19 judges the departure floor and the arrival floor of the user by comparing users who are in the car 7 when the car 7 departs from the floor on which the car 7 stops at the last minute and users who are in the car 7 when the car 7 departs from the first floor. In this event, the floor on which the car 7 stops at the last minute is one of the floors, which is higher than the first floor and on which the car 7 stops during descending operation. The floor judgement unit 19 judges the departure floor of the user A who is not in the car 7 when the car 7 departs from the floor on which the car 7 stops at the last minute and who is in the car 7 when the car 7 departs from the first floor, as the first floor.

When the ascending/descending facility judgement unit 17 judges the ascending/descending facility to be utilized by the user A, the matching processing unit 18 performs matching processing to achieve matching for the user A. For example, in a case where the ascending/descending facility judgement unit 17 judges that the user A has already redundantly utilized other ascending/descending facilities at the same time point, the matching processing unit 18 causes the user specification unit 14 to specify a plurality of users erroneously specified as the same user as different users. When the user specification unit 14 specifies the users as users different from each other, the user specification unit 14 extracts a difference in a feature amount or feature amounts of the users from the acquired images, improves accuracy of specification of the users and resettles specification of the users different from each other. The matching processing unit 18 performs matching processing on other users in a similar manner.

A user B who moves from the second floor to the fifth floor registers call in the elevator 3 through operation of the hall operating panel 9 on the second floor. Then, the user B gets on the car 7 of the elevator 3 that arrives on the second floor. The user B who gets on the car 7 designates the fifth floor as the destination floor through operation of the car operating panel 10. A user C who moves from the second floor to the fourth floor arrives at the hall on the second floor of the elevator 3. The call has already been registered from the hall operating panel 9 on the second floor by the user B.

and thus, the user C who arrives at the hall does not perform operation of registering the destination floor on the hall operating panel 9. Further, the user C does not have to have a mobile terminal such as a smartphone, a card and a tag that accepts operation of registering the destination floor. Then, the user C gets on the car 7 of the elevator 3 that arrives on the second floor. The fourth floor has already been designated as the destination floor by the user A, the user C who gets on the car 7 does not perform operation of registering the destination floor on the car operating panel 10.

When the car 7 of the elevator 3 departs from the second floor, the user specification unit 14 specifies users who are inside the car 7 on the basis of the image or images captured by the camera 12 inside the car 7. In this example, the user A, the user B and the user C are in the car 7. In this event, the user specification unit 14 specifies the user A, the user B and the user C as users who are inside the car 7. The ascending/descending facility judgement unit 17 judges that the ascending/descending facility to be utilized by the user B is the elevator 3. The floor judgement unit 19 judges the departure floor and the arrival floor of the user by comparing users who are inside the car 7 when the car 7 departs from the first floor that is a floor on which the car 7 stops at the last minute and users who are inside the car 7 when the car 7 departs from the second floor. The floor judgement unit 19 judges the departure floor of the user B and the user C who are not in the car 7 when the car 7 departs from the first floor and who are in the car 7 when the car 7 departs from the second floor, as the second floor.

A user D who moves from the third floor to the sixth floor registers call in the elevator 3 through operation on the hall operating panel 9 on the third floor. Then, the user A gets on the car 7 of the elevator 3 that arrives on the third floor. The user D who gets on the car 7 designates the sixth floor as the destination floor through operation on the car operating panel 10.

When the car 7 of the elevator 3 departs from the third floor, the user specification unit 14 specifies users who are inside the car 7 on the basis of the image or images captured by the camera 12 inside the car 7. In this example, the user A, the user B, the user C and the user D are in the car 7. In this event, the user specification unit 14 specifies the user A, the user B, the user C and the user D as the users who are inside the car 7. The ascending/descending facility judgement unit 17 judges that the ascending/descending facility to be utilized by the user D is the elevator 3. The floor judgement unit 19 judges the departure floor and the arrival floor of the user by comparing users who are inside the car 7 when the car 7 departs from the second floor that is the floor on which the car 7 stops at the last minute and users who are inside the car 7 when the car 7 departs from the third floor. The floor judgement unit 19 judges the departure floor of the user D who is not in the car 7 when the car 7 departs from the second floor and who is in the car 7 when the car 7 departs from the third floor, as the third floor.

The user A and the user C get off the car 7 of the elevator 3 on the fourth floor.

When the car 7 of the elevator 3 departs from the fourth floor, the user specification unit 14 specifies users who are inside the car 7 on the basis of the image or images captured by the camera 12 inside the car 7. In this example, the user B and the user D are in the car 7. In this event, the user specification unit 14 specifies the user B and the user D as the users who are inside the car 7. The floor judgement unit 19 judges the departure floor and the arrival floor of the user by comparing users who are inside the car 7 when the car 7 departs from the third floor that is a floor on which the car 7 stops at the last minute and users who are inside the car 7 when the car 7 departs from the fourth floor. The floor judgement unit 19 judges the arrival floor of the user A and the user C who are in the car 7 when the car 7 departs from the third floor and who are not in the car 7 when the car 7 departs from the fourth floor, as the fourth floor. In this manner, also for the user C who does not perform operation of registering the destination floor on the hall operating panel 9 and the car operating panel 10, and a mobile terminal such as a smartphone, a card and a tag, the interest degree measurement system 1 can acquire information on the departure floor and the arrival floor on the basis of the image or images captured by the camera 12 inside the car 7.

The user B gets off the car 7 of the elevator 3 on the fifth floor.

When the car 7 of the elevator 3 departs from the fifth floor, the user specification unit 14 specifies users who are inside the car 7 on the basis of the image or images captured by the camera 12 inside the car 7. In this example, only the user D is in the car 7. In this event, the user specification unit 14 specifies only the user D as the user who is inside the car 7. The floor judgement unit 19 judges the departure floor and the arrival floor of the user by comparing users who are inside the car 7 when the car 7 departs from the fourth floor on which the car 7 stops at the last minute and users who are inside the car 7 when the car 7 departs from the fifth floor. The floor judgement unit 19 judges the arrival floor of the user B who is in the car 7 when the car 7 departs from the fourth floor and who is not in the car 7 when the car 7 departs from the fifth floor, as the fifth floor.

The user D gets off the car 7 of the elevator 3 on the sixth floor.

When the car 7 of the elevator 3 departs from the sixth floor, the user specification unit 14 specifies users who are inside the car 7 on the basis of the image or images captured by the camera 12 inside the car 7. In this example, there is no user in the car 7. In this event, the user specification unit 14 specifies no user as the users who are inside the car 7. The floor judgement unit 19 specifies the departure floor and the arrival floor of the user by comparing users who are inside the car 7 when the car 7 departs from the fifth floor which is a floor on which the car 7 stops at the last minute and users who are inside the car 7 when the car 7 departs from the sixth floor. The floor judgement unit 19 judges the arrival floor of the user D who is in the car 7 when the car 7 departs from the fifth floor and who is not in the car 7 when the car 7 departs from the sixth floor, as the sixth floor.

Subsequently, another example of judgement of the arrival floor will be described using FIG. 7.

FIG. 7A to FIG. 7F are views illustrating an example of judgement by the floor judgement unit 19 according to Embodiment 1.

FIG. 7 illustrate an example of judgement of the arrival floor of the user who transfers and utilizes a plurality of escalators 4 that perform upward operation. Note that also in a case where one escalator 4 that performs upward operation is utilized, and in a case where one or more escalators 4 that perform descending operation are utilized, the arrival floor is judged in a similar manner. Further, also in a case where the stairs 5 are utilized, the arrival floor is judged in a similar manner.

Figure 7A:
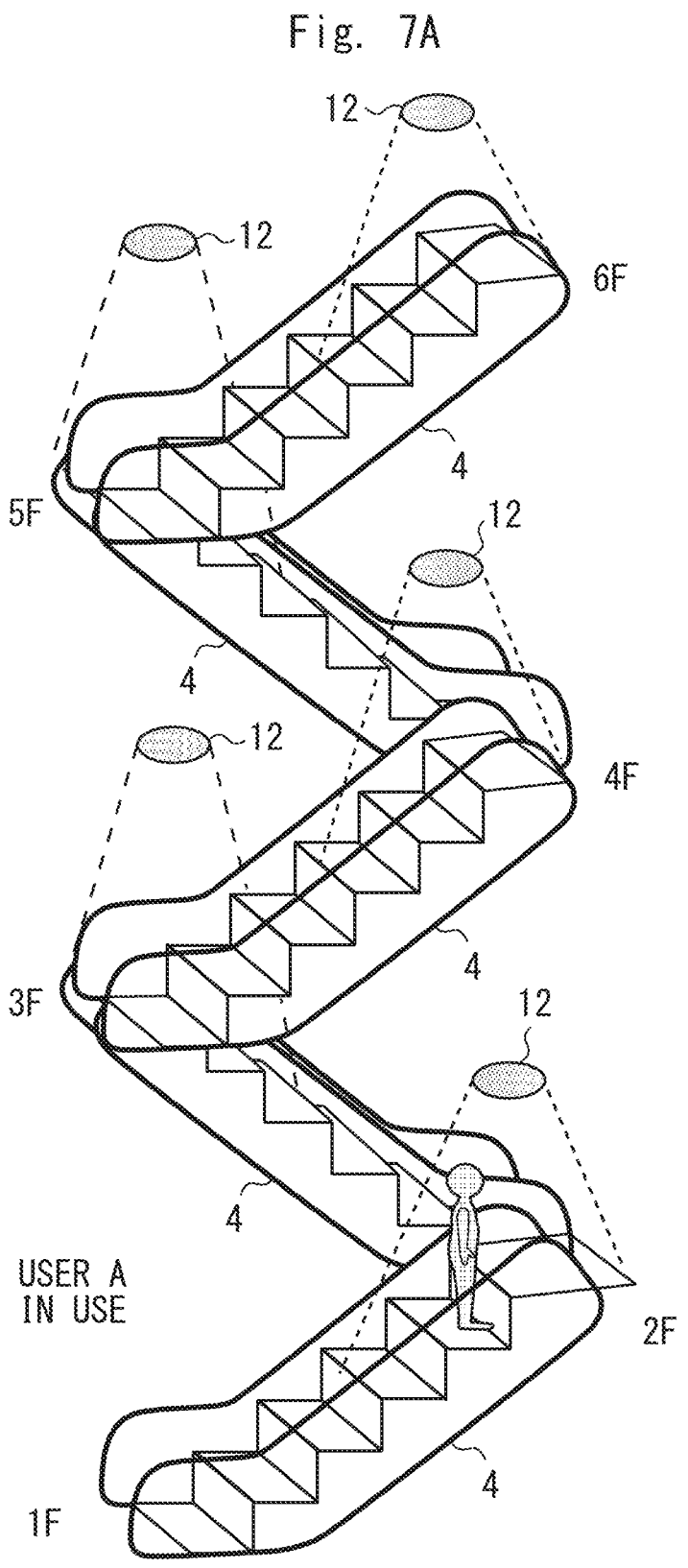
FIG. 7A is a view illustrating an example of judgement by the floor judgement unit according to Embodiment 1.

As illustrated in FIG. 7A, the user A who moves from the first floor to the fourth floor moves by getting on the escalator 4 that performs upward operation between the first floor and the second floor, from the first floor.

When the user A who is on the escalator 4 falls within an image or images capturing range of the camera 12 provided at the exit on the second floor, that is, when the user A comes into a frame of the camera 12, the user specification unit 14 specifies the user A on the basis of the image or images captured by the camera 12. The ascending/descending facility judgement unit 17 judges that the ascending/descending facility utilized by the user A is the escalator 4. The floor judgement unit 19 judges that the departure floor of the user A is the first floor on which the entrance of the escalator 4 is provided.

Figure 7B:
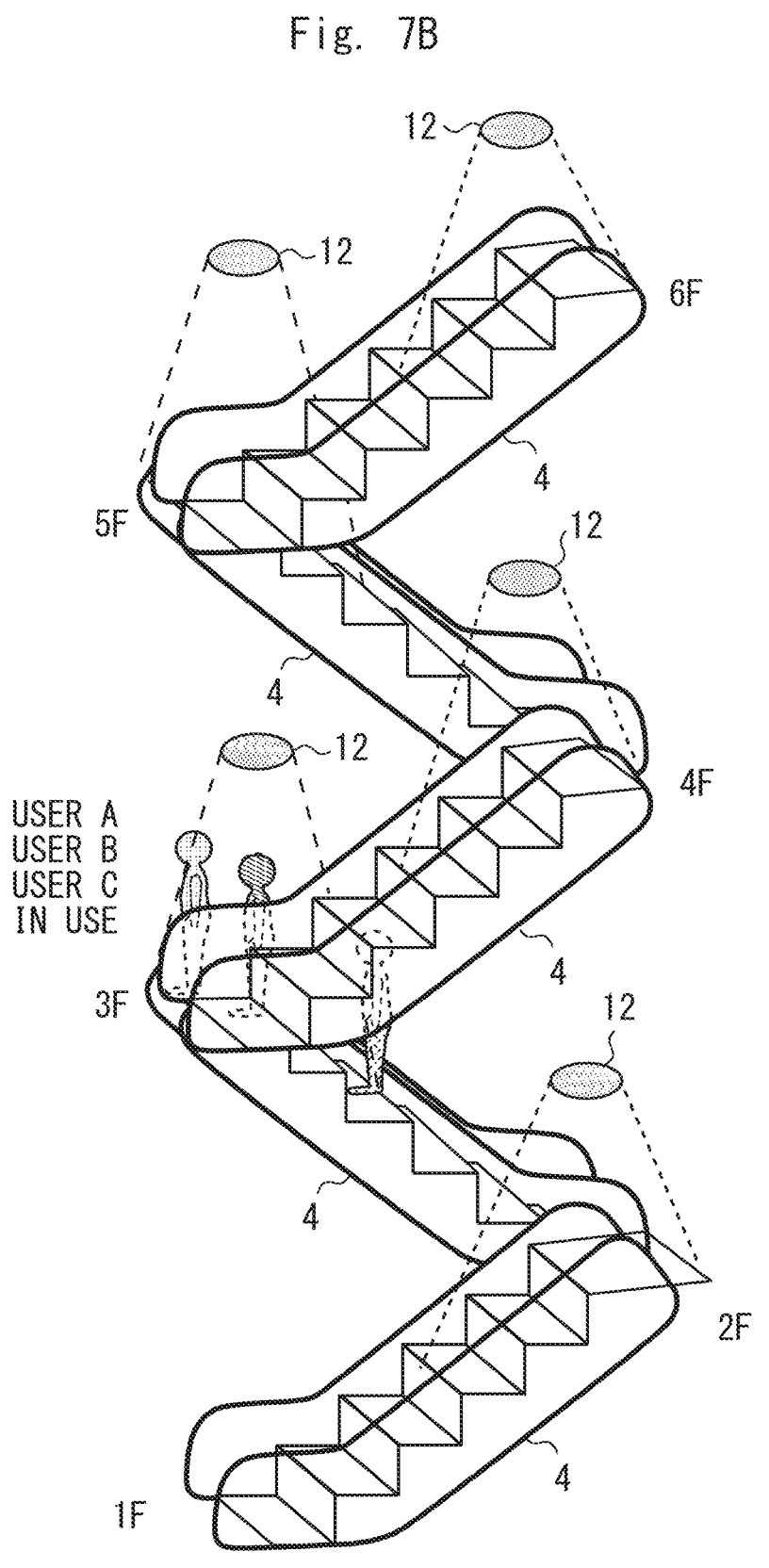

As illustrated in FIG. 7B, the user A moves while transferring the escalator 4 to the escalator 4 that performs upward operation between the second floor and the third floor, on the second floor. The user B who moves from the second floor to the fifth floor moves by getting on the escalator 4 that performs upward operation between the second floor and the third floor, from the second floor. The user C who moves from the second floor to the fourth floor moves by getting on the escalator 4 that performs upward operation between the second floor and the third floor, from the second floor.

When the user A comes into a frame of the camera 12 provided at the exit on the third floor, the user specification unit 14 specifies the user A on the basis of the image or images captured by the camera 12. When the user A is specified by the camera 12 provided at the exit on the third floor before a preset period has elapsed since the user A had been specified by the camera 12 provided at the exit on the second floor, the floor judgement unit 19 judges that the user A has transferred the escalator 4 on the second floor.

When the user B comes into a frame of the camera 12 provided at the exit on the third floor, the user specification unit 14 specifies the user B on the basis of the image or images captured by the camera 12. The ascending/descending facility judgement unit 17 judges that the ascending/descending facility utilized by the user B is the escalator 4. The floor judgement unit 19 judges that the departure floor of the user B is the second floor on which the entrance of the escalator 4 is provided.

When the user C comes into a frame of the camera 12 provided at the exit on the third floor, the user specification unit 14 specifies the user C on the basis of the image or images captured by the camera 12. The ascending/descending facility judgement unit 17 judges that the ascending/descending facility utilized by the user C is the escalator 4. The floor judgement unit 19 judges that the departure floor of the user C is the second floor on which the entrance of the escalator 4 is provided.

Figure 7C:
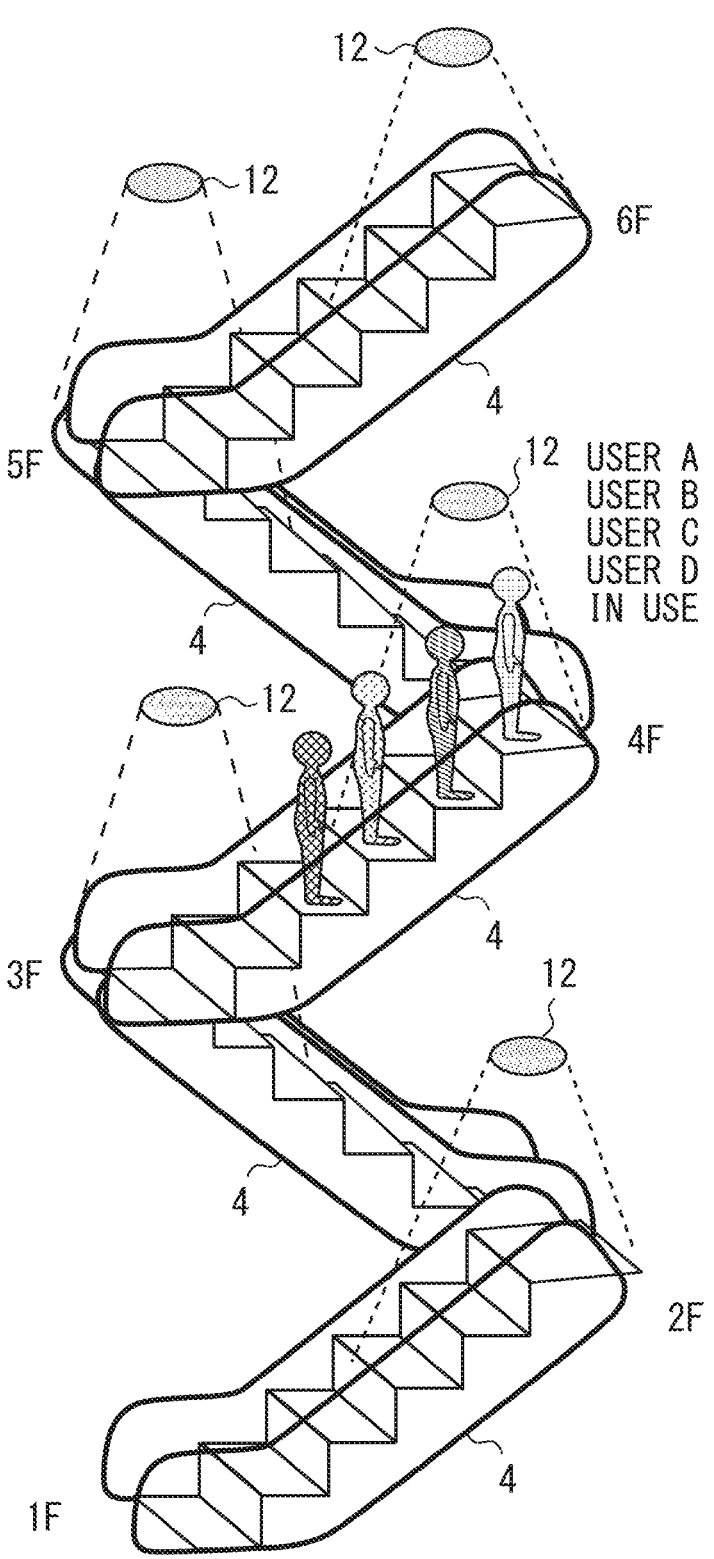
FIG. 7C is a view illustrating an example of judgement by the floor judgement unit according to Embodiment 1.

As illustrated in FIG. 7C, the user A moves while transferring the escalator 4 to the escalator 4 that performs upward operation between the third floor and the fourth floor, on the third floor. The user B moves while transferring the escalator 4 to the escalator 4 that performs upward operation between the third floor and the fourth floor, on the third floor. The user C moves while transferring the escalator 4 to the escalator 4 that performs upward operation between the third floor and the fourth floor, on the third floor. The user D who moves from the third floor to the sixth floor moves by getting on the escalator 4 that performs upward operation between the third floor and the fourth floor, from the third floor.

When the user A comes into a frame of the camera 12 provided at the exit on the fourth floor, the user specification unit 14 specifies the user A on the basis of the image or images captured by the camera 12. When the user A is specified by the camera 12 provided at the exit on the fourth floor before a preset period has elapsed since the user A had been specified by the camera 12 provided at the exit on the third floor, the floor judgement unit 19 judges that the user A has transferred the escalator 4 on the third floor.

When the user B comes into a frame of the camera 12 provided at the exit on the fourth floor, the user specification unit 14 specifies the user B on the basis of the image or images captured by the camera 12. When the user B is specified by the camera 12 provided at the exit on the fourth floor before a preset period has elapsed since the user B had been specified by the camera 12 provided at the exit on the third floor, the floor judgement unit 19 judges that the user B has transferred the escalator 4 on the third floor.

When the user C comes into a frame of the camera 12 provided at the exit on the fourth floor, the user specification unit 14 specifies the user C on the basis of the image or images captured by the camera 12. When the user C is specified by the camera 12 provided at the exit on the fourth floor before a preset period has elapsed since the user C had been specified by the camera 12 provided at the exit on the third floor, the floor judgement unit 19 judges that the user C has transferred the escalator 4 on the third floor.

When the user D comes into a frame of the camera 12 provided at the exit on the fourth floor, the user specification unit 14 specifies the user D on the basis of the image or images captured by the camera 12. The ascending/descending facility judgement unit 17 judges that the ascending/descending facility utilized by the user D is the escalator 4. The floor judgement unit 19 judges that the departure floor of the user D is the third floor on which the entrance of the escalator 4 is provided.

Figure 7D:
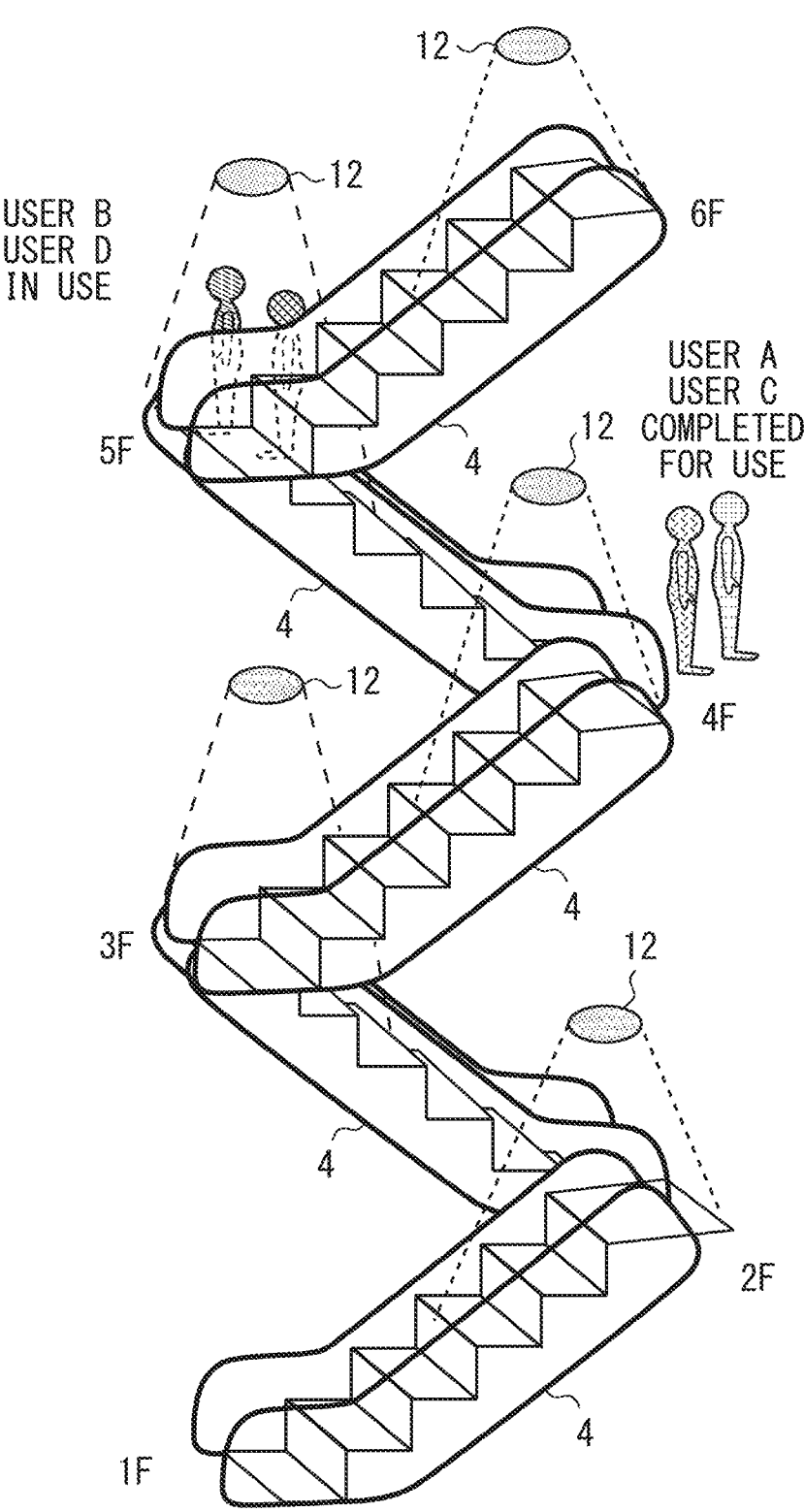
FIG. 7D is a view illustrating an example of judgement by the floor judgement unit according to Embodiment 1.

As illustrated in FIG. 7D, the user A gets off the escalator 4 from the exit on the fourth floor. The user B moves while transferring the escalator 4 to the escalator 4 that performs upward operation between the fourth floor and the fifth floor, on the fourth floor. The user C gets off the escalator 4 from the exit on the fourth floor. The user D moves while transferring the escalator 4 to the escalator 4 that performs upward operation between the fourth floor and the fifth floor, on the fourth floor.

When the user A is not specified by the camera 12 provided at the exit on the fifth floor even after the preset period has elapsed since the user A had been specified by the camera 12 provided at the exit on the fourth floor, the floor judgement unit 19 judges that the arrival floor of the user A is the fourth floor.

When the user B comes into a frame of the camera 12 provided at the exit on the fifth floor, the user specification unit 14 specifies the user B on the basis of the image or images captured by the camera 12. When the user B is specified by the camera 12 provided at the exit on the fifth floor before a preset period has elapsed since the user B had been specified by the camera 12 provided at the exit on the fourth floor, the floor judgement unit 19 judges that the user A has transferred the escalator 4 on the fourth floor.

When the user C is not specified by the camera 12 provided at the exit on the fifth floor even after the preset period has elapsed since the user C had been specified by the camera 12 provided at the exit on the fourth floor, the floor judgement unit 19 judges that the arrival floor of the user C is the fourth floor.

When the user D comes into a frame of the camera 12 provided at the exit on the fifth floor, the user specification unit 14 specifies the user D on the basis of the image or images captured by the camera 12. When the user D is specified by the camera 12 provided at the exit on the fifth floor before a preset period has elapsed since the user D had been specified by the camera 12 provided at the exit on the fourth floor, the floor judgement unit 19 judges that the user D has transferred the escalator 4 on the fourth floor.

Figure 7E:
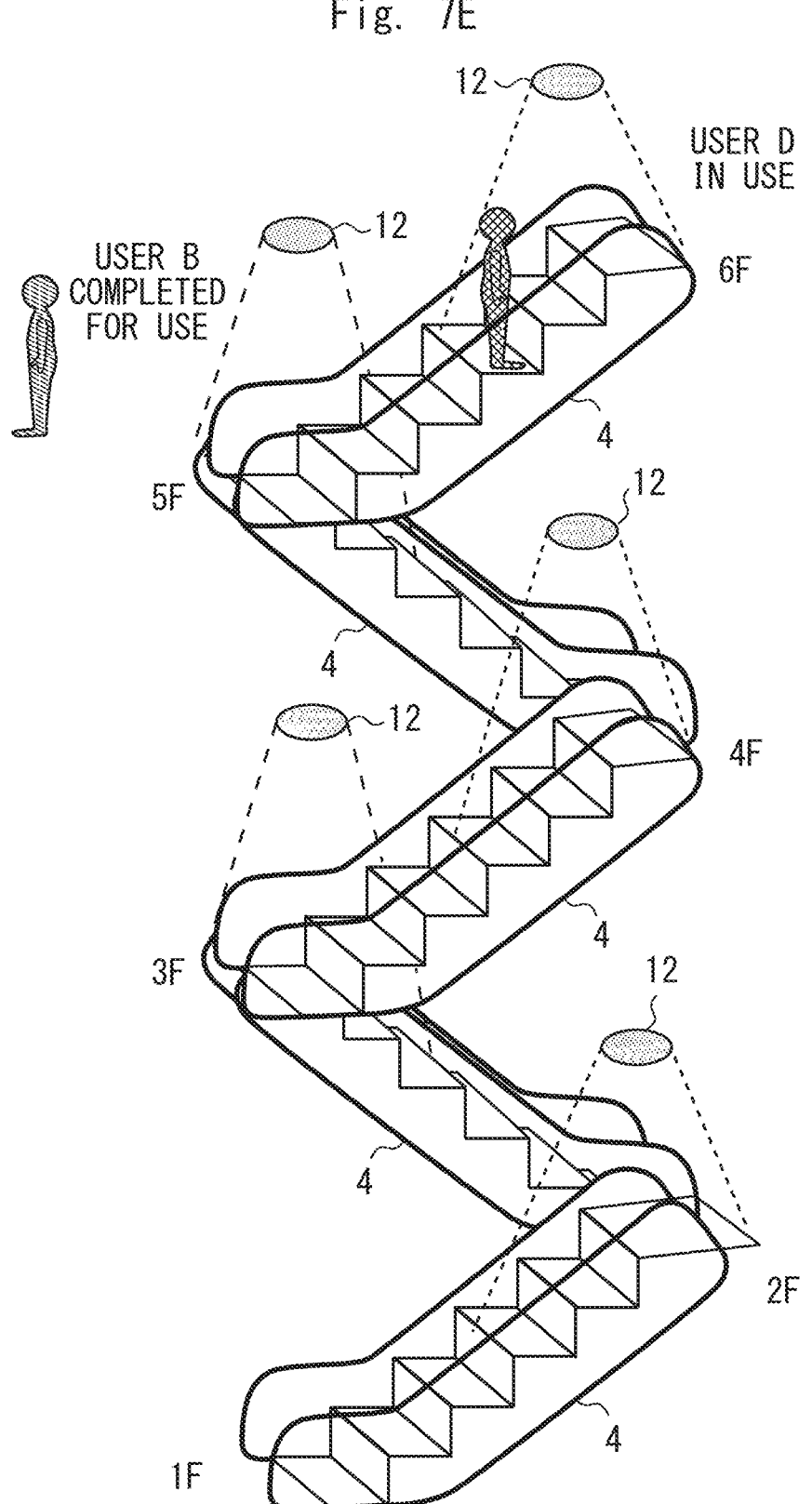
FIG. 7E is a view illustrating an example of judgement by the floor judgement unit according to Embodiment 1.

As illustrated in FIG. 7E, the user B gets off the escalator 4 at the exit on the fifth floor. The user D moves while transferring the escalator 4 to the escalator 4 that performs upward operation between the fifth floor and the sixth floor, on the fifth floor.

When the user B is not specified by the camera 12 provided at the exit on the sixth floor even after the preset period has elapsed since the user B had been specified by the camera 12 provided at the exit on the fifth floor, the floor judgement unit 19 judges that the arrival floor of the user B is the sixth floor.

When the user D comes into a frame of the camera 12 provided at the exit on the sixth floor, the user specification unit 14 specifies the user D on the basis of the image or images captured by the camera 12. When the user D is specified by the camera 12 provided at the exit on the sixth floor before a preset period has elapsed since the user D had been specified by the camera 12 provided at the exit on the fifth floor, the floor judgement unit 19 judges that the user D has transferred the escalator 4 on the fifth floor.

Figure 7F:
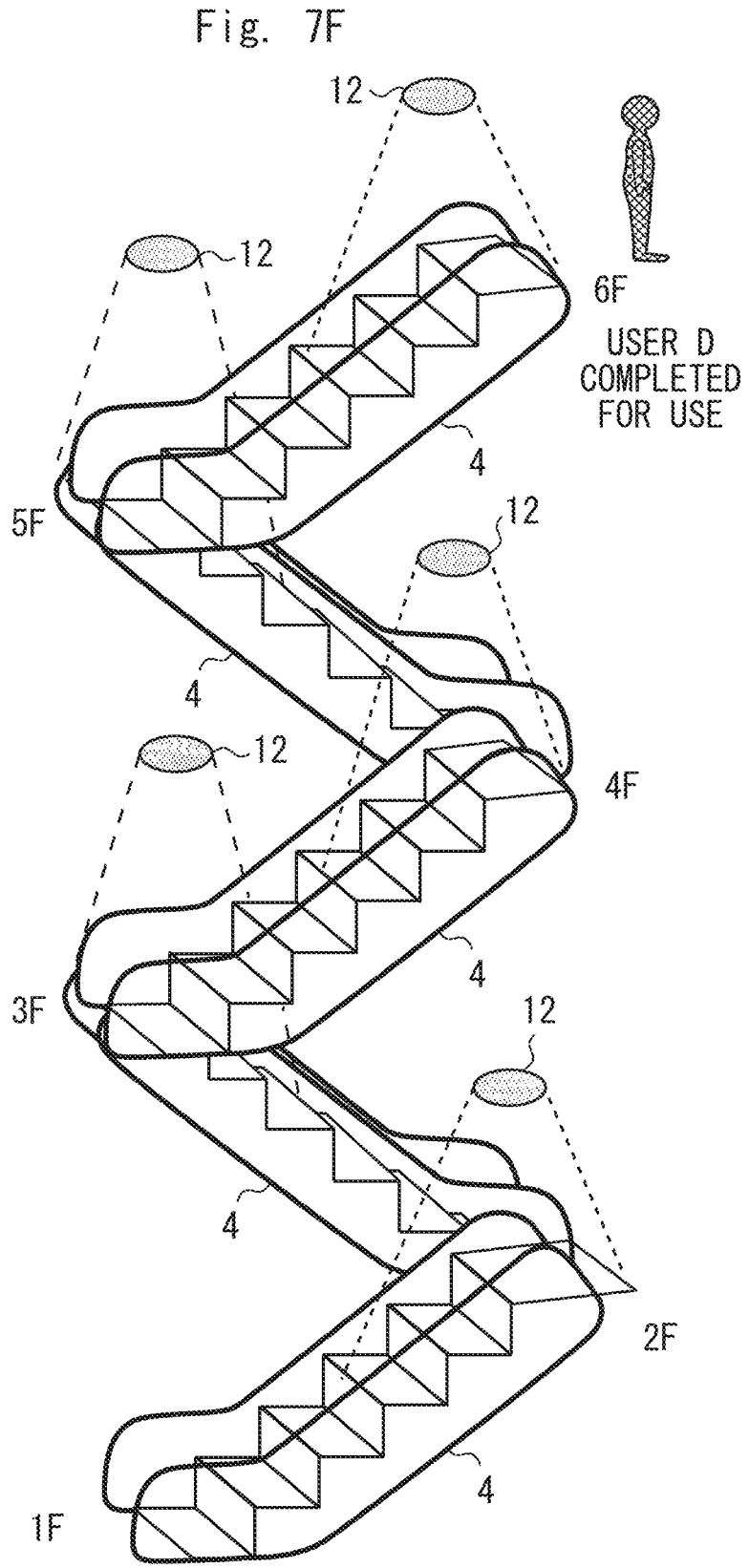
FIG. 7F is a view illustrating an example of judgement by the floor judgement unit according to Embodiment 1.

As illustrated in FIG. 7F, the user D gets off the escalator 4 from the exit on the sixth floor.

When the user D is not specified by the camera 12 provided at the exit of the escalator 4 even after the preset period has elapsed since the user B had been specified by the camera 12 provided at the exit on the sixth floor, the floor judgement unit 19 judges that the arrival floor of the user B is the sixth floor.

Note that the users get on and get off the escalator 4 at timings for each user, and thus, the floor judgement unit 19 manages information on states where the users get on and get off the escalator 4 for each user.

Further, while an example of judgement of the arrival floor of the user of the escalator 4 has been described using FIGS. 7, the arrival floor of the user of the stairs 5 is judged in a similar manner. The stairs 5 are different from the escalator 4 in that while the user of the escalator 4 can move between the floors without walking, the user of the stairs 5 moves between the floors by walking. For the user of the escalator 4 and the user of the stairs 5, specification of the user by the user specification unit 14, exclusion processing of the user by the matching processing unit 18, judgement of a utilization start floor and a utilization end floor of the ascending/descending facility by the camera 12, and the like, are similarly performed through similar processing flow.

Subsequently, an example of acquisition of the behavior information on the arrival floor will be described using FIG. 8 and FIG. 9. Further, an example of acquisition of interest information on the arrival floor will be described using FIG. 10.

Figure 8:
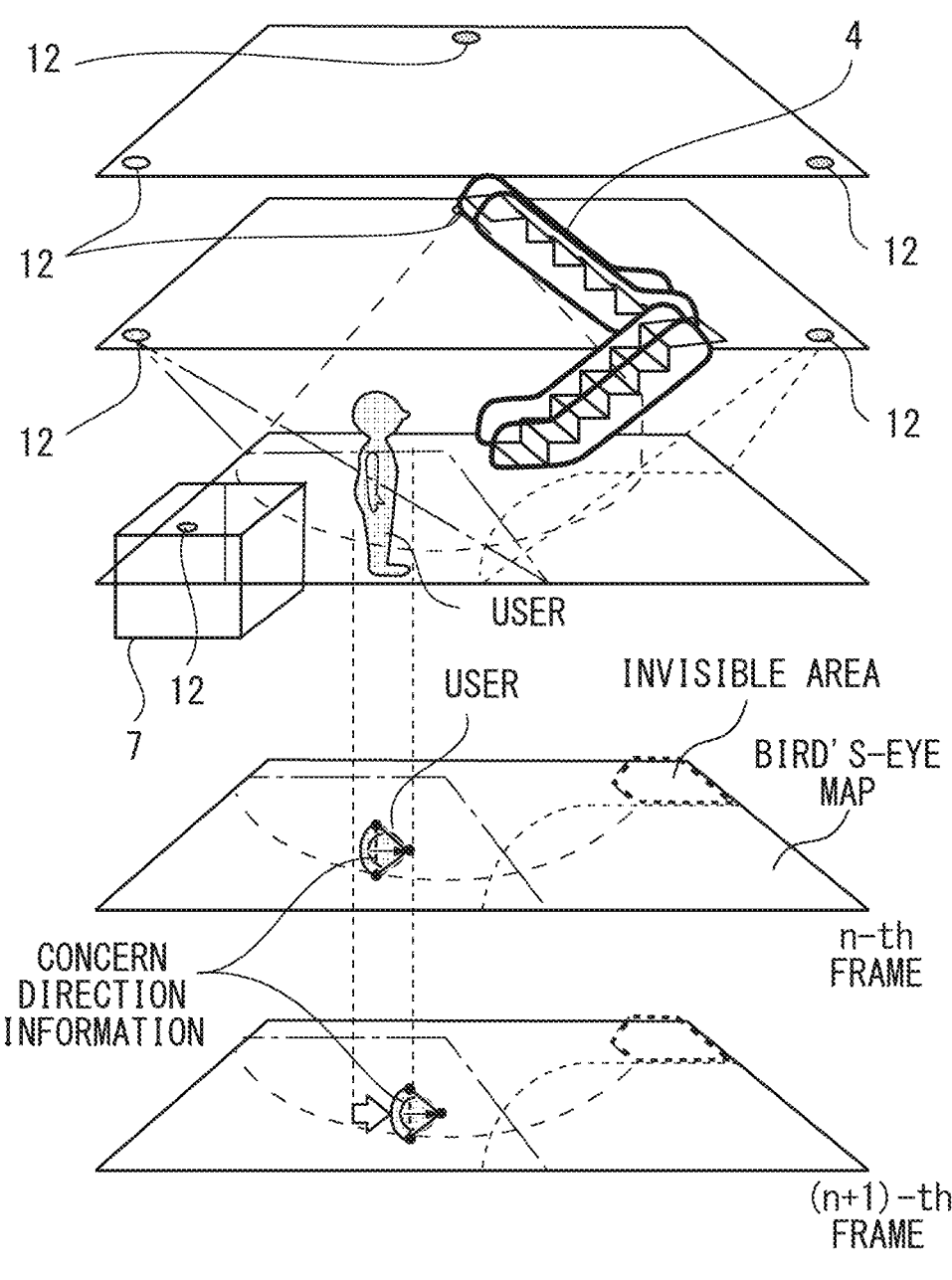
FIG. 8 is a view illustrating an example of acquisition of the behavior information by the interest degree measurement system according to Embodiment 1.
Figure 9A:
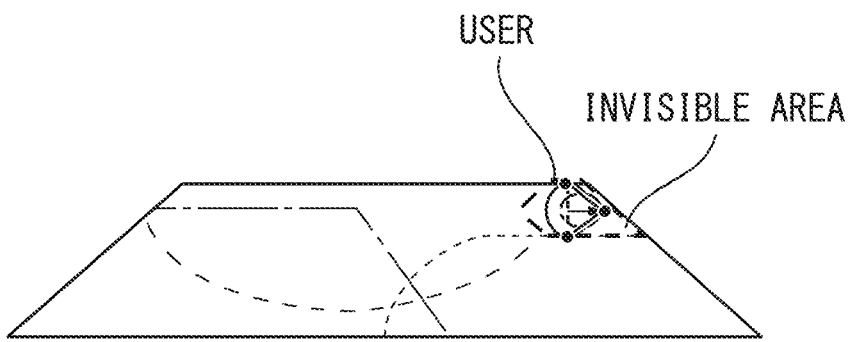
FIG. 9A is a view illustrating an example of acquisition of the behavior information by the interest degree measurement system according to Embodiment 1.
Figure 9B:
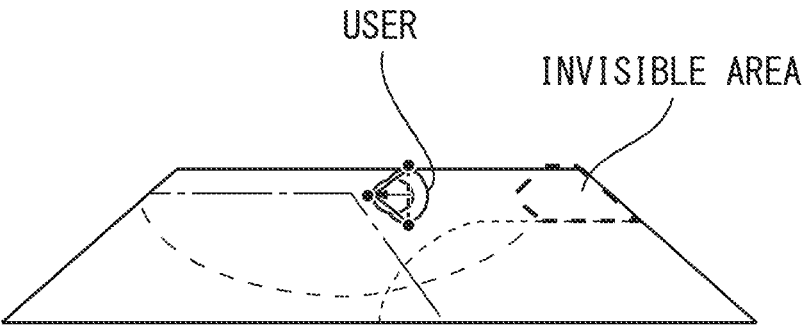
FIG. 9B is a view illustrating an example of acquisition of the behavior information by the interest degree measurement system according to Embodiment 1.

FIG. 8, FIG. 9A and FIG. 9B are views illustrating an example of acquisition of the behavior information by the interest degree measurement system 1 according to Embodiment 1.

Figure 10B:
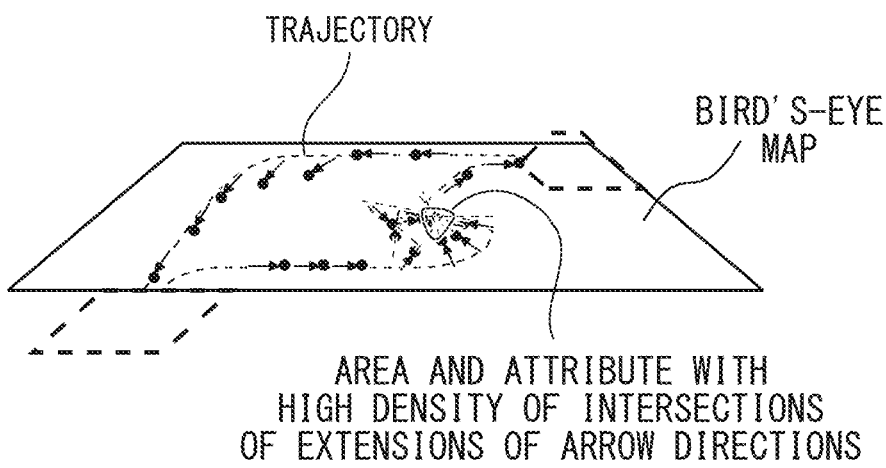
FIG. 10B is a view illustrating an example of acquisition of the interest information by the interest degree measurement system according to Embodiment 1.
Figure 10C:
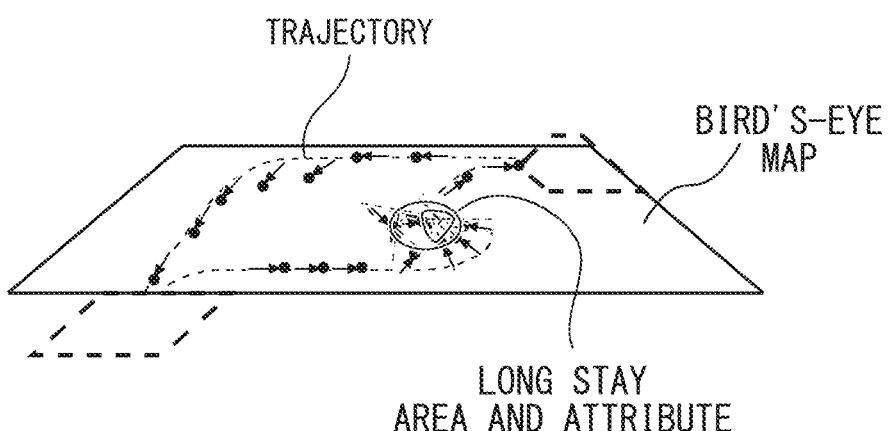
FIG. 10C is a view illustrating an example of acquisition of the interest information by the interest degree measurement system according to Embodiment 1.

FIG. 10A to FIG. 10C are views illustrating an example of acquisition of the interest information by the interest degree measurement system 1 according to Embodiment 1.

Bird's-eye maps of the arrival floors illustrated in FIG. 8, FIG. 9 and FIG. 10 are, for example, generated on the basis of images captured by a plurality of cameras 12 provided on the arrival floors. The bird's-eye maps are, for example, images obtained by pasting on a plane, a plurality of images of the arrival floors captured at the same time point and synthesizing the images while avoiding inconsistency at peripheral portions of the overlapped images. In this event, the bird's-eye map may include an invisible area. The invisible area is an area for which no camera 12 can capture an image or images. The invisible area may be, for example, inside a hoistway after the car 7 of the elevator 3 moves from the arrival floor, a restroom provided on the arrival floor, a range for which it is known that the user does not utilize, or the like. The bird's-eye map is generated in advance on the basis of the images acquired during a period while there is no user, such as, for example, night-time and early morning. The bird's-eye map may be updated, for example, once a day or may be updated as appropriate. While the images to be used for generation of the bird's-eye map are preferably captured at the same time point by the plurality of cameras 12 on the arrival floors because there is a possibility that users are in the images, the bird's-eye map does not necessarily have to be generated from the images all at the same time point. The bird's-eye map may be generated from a plurality of images which do not include users and which are captured at different time points.

FIG. 8 illustrates an example of the user who arrives on the arrival floor by utilizing the elevator 3.

The behavior information acquisition unit 15 starts acquisition of the behavior information, for example, when the user arrives on the arrival floor. For example, when the floor judgement unit 19 judges the arrival floor of one of the users, the behavior information acquisition unit 15 judges that the user has arrived on the arrival floor. When the user arrives on the arrival floor, the behavior information acquisition unit 15 acquires the bird's-eye map of the arrival floor.

In this example, the behavior information acquisition unit 15 lays out information of the user that is represented using at least three feature amounts of both shoulders and the nose of the user acquired on the basis of the images on the bird's-eye map. As a result of this, a coordinate of the user on the arrival floor, on the bird's-eye map is acquired. The behavior information acquisition unit 15 adds the information acquired in this manner to the behavior information which is time-series data as information representing layout of the user position.

Then, after a preset time interval has elapsed, the behavior information acquisition unit 15 newly acquires information representing layout of the user position. The behavior information acquisition unit 15 adds the newly acquired information to the behavior information which is time-series data. In this manner, the behavior information acquisition unit 15 continuously updates the behavior information of the user.

As illustrated in FIG. 9A, when the user goes out of a frame to an invisible area such as a restroom, the behavior information acquisition unit 15 starts counting of an elapsed period since the user has gone out of the frame. During this period, the behavior information acquisition unit 15 pauses acquisition of the behavior information of the user. Thereafter, as illustrated in FIG. 9B, when the user comes into the frame from the invisible area before a preset period has elapsed since the user had gone out of the frame, the behavior information acquisition unit 15 continues to acquire the behavior information of the user.

When the user moves from the arrival floor to other floors, the behavior information acquisition unit 15 specifies movement of the user in coordination with the camera 12 inside the car 7 of the elevator 3, the camera 12 of the escalator 4, the camera 12 of the stairs 5 and a plurality of cameras 12 on the other floors. In a case where the preset period has elapsed since the user had gone out of the frame during movement on a certain floor and coordination of the plurality of cameras 12 is released, the behavior information acquisition unit 15 records, for example, a time point and a location at which the user has gone out of the frame last. In this event, the behavior information acquisition unit 15 may display the location on the bird's-eye map and be alerted by a warning, and the like, as necessary.

The behavior information storage unit 16 stores the behavior information acquired by the behavior information acquisition unit 15 for each user. The behavior information storage unit 16 accumulates and stores a plurality of pieces of behavior information for the same user.

The interest information acquisition unit 20 acquires interest information of the user every time the behavior information acquisition unit 15 completes acquisition of the behavior information of the user on the arrival floor.

As illustrated in FIG. 10A, the interest information acquisition unit 20 superimposes the information representing layout of the user position included in the behavior information on the arrival floor, on the bird's-eye map of the arrival floor. In this example, the interest information acquisition unit 20 superimposes a triangle including three points of coordinates of three feature amounts of at least both shoulders and the nose and a direction from a midpoint of a line segment connecting the two points of both shoulders toward the nose, included in the behavior information which is time-series data, on the bird's-eye map of the arrival floor.

As illustrated in FIG. 10B, the interest information acquisition unit 20 specifies and acquires an area and an attribute located on an extension in a direction from the midpoint of the line segment connecting the two points of both shoulders toward the nose, included in the behavior information which is time-series data. The interest information acquisition unit 20 extends the direction of the user represented in each piece of concern direction information, ahead of the user. The interest information acquisition unit 20 detects intersections of a plurality of half lines extending ahead of the user. The interest information acquisition unit 20 specifies an area and an attribute in which intersections are concentrated as a range for which a degree of interest of the user is high. In this event, the interest information acquisition unit 20 may, for example, include information on the degree of interest of the user into the interest information of the user in accordance with density of the intersections. The interest information acquisition unit 20 reads the attribute of the area specified as the range for which the degree of interest of the user is high from the attribute storage unit 13. The interest information acquisition unit 20 includes the read attribute in the interest information as an attribute for which the degree of interest of the user is high. In this event, the interest information acquisition unit 20 acquires the read attribute and information on the degree of interest of the user in association with each other.

As illustrated in FIG. 10C, the interest information acquisition unit 20 generates a trajectory of the user by connecting base points of the concern direction information on the bird's-eye map. The interest information acquisition unit superimposes a time point at which the user is located at the position on each point on the trajectory of the user on the bird's-eye map. There is a case where a location where points of the time points are concentrated can be found by tracking the trajectory generated in this manner. Such a location corresponds to a location where the user stays for a long period. The interest information acquisition unit 20 may include the location where the user stays for a long period as an element of the interest information of the user.

The interest information storage unit 21 stores the interest information acquired by the interest information acquisition unit 20 for each user. The interest information storage unit

21 may update the stored interest information in a case where the interest information acquisition unit 20 acquires interest information of the user for whom the interest information has already been stored. For example, the interest information storage unit 21 may add to information on the degree of interest for each attribute calculated by the interest information acquisition unit 20 to the stored information on the level of interest for each attribute. As a result of the interest information of each user being sequentially updated, accuracy of the interest information stored in the interest information storage unit 21 is further improved.

Further, another example of acquisition of the interest information on the arrival floor will be described using FIG. 11.

Figure 11:
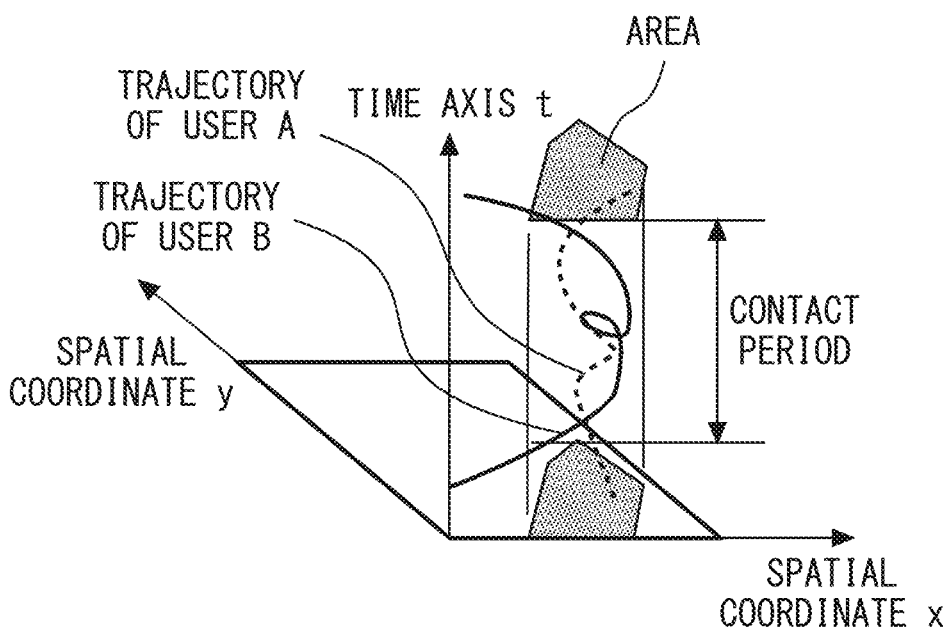
FIG. 11 is a view illustrating an example of acquisition of the interest information by the interest degree measurement system according to Embodiment 1.

FIG. 11 is a view illustrating an example of acquisition of the interest information by the interest degree measurement system 1 according to Embodiment 1.

The interest information acquisition unit 20 may acquire interest of one user with respect to another user as the interest information. The interest information between the users is acquired, for example, in a case where the user is a person who engages in operation in the building 2. The interest information between the users corresponds to, for example, an amount such as a frequency or a period of communication between the users. In this example, the interest information acquisition unit 20 calculates the interest information between the users on the basis of a contact period between the users Contact information is a period during which the users continuously stay in the same area.

FIG. 11 illustrates trajectories of a user A and a user B. In FIG. 11, a trajectory of each user is displayed on a three-dimensional space and time indicated by two-dimensional space coordinates representing positions on the bird's-eye map and a time axis in a direction perpendicular to the bird's-eye map. In this example, the user A stays in a certain area in the building 2. While the user A stays in the area, the user B enters the area. The user B exits the area after having a dialogue with the user A in the area. In this event, the interest information acquisition unit 20 calculates a contact period between the user A and the user B as a period from a time point at which the user B enters the area to a time point at which the user B exits the area. The interest information acquisition unit 20 acquires interest information so that degrees of interest of the user A and the user B with respect to each other become higher as the contact period is longer.

Subsequently, an example of presentation of a destination to the user will be described using FIG. 12 and FIG. 13.

FIG. 12A and FIG. 12B, and FIG. 13A and FIG. 13B are views illustrating an example of presentation of a destination by the interest degree measurement system 1 according to Embodiment 1.

FIG. 12 illustrate an example of the building 2 to which the interest degree measurement system 1 is applied.

Figure 12A:
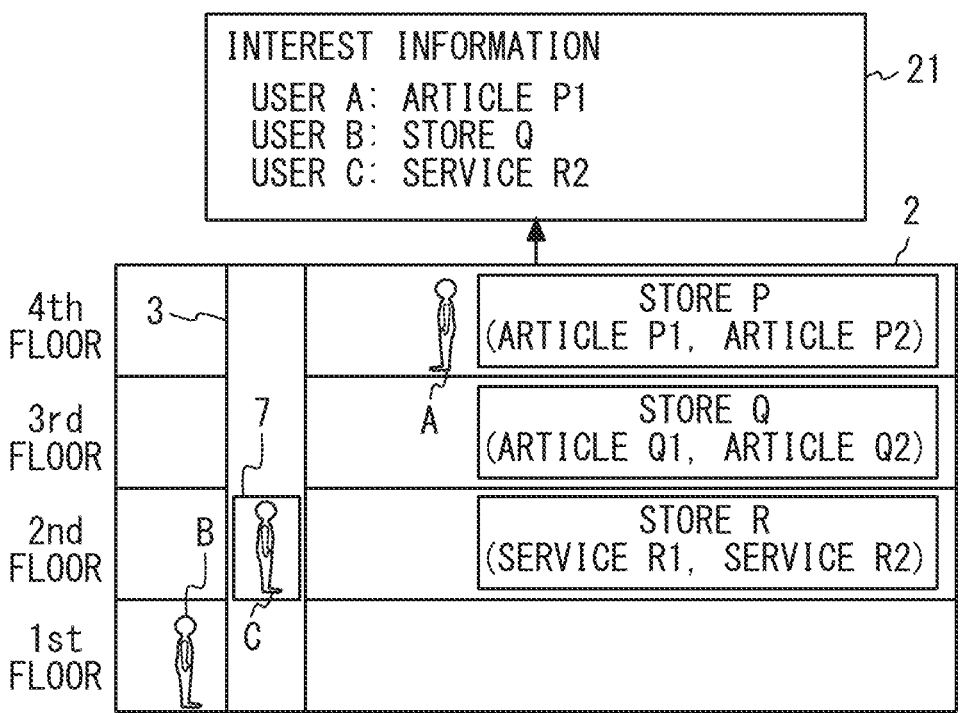
FIG. 12A is a view illustrating an example of presentation of a destination by the interest degree measurement system according to Embodiment 1.

FIG. 12A illustrates the building 2 at a certain date. In this building 2, the store P which deals with the article P1 and the article P2 is open in the area on the fourth floor. Further, the store Q which deals with the article Q1 and the article Q2 is open in the area on the third floor. Still further, the store R which provides the service R1 and the service R2 is open in the area on the second floor.

Until this date, the interest degree measurement system 1 acquires interest information of the user A, the user B and the user C. The interest information storage unit 21 stores the article P1 as the attribute with the highest degree of interest for the user A. The interest information storage unit 21 stores the store Q as the attribute with the highest degree of interest for the user B. The interest information storage unit 21 stores the service R2 as attribute with the highest degree of interest for the user C.

Figure 12B:
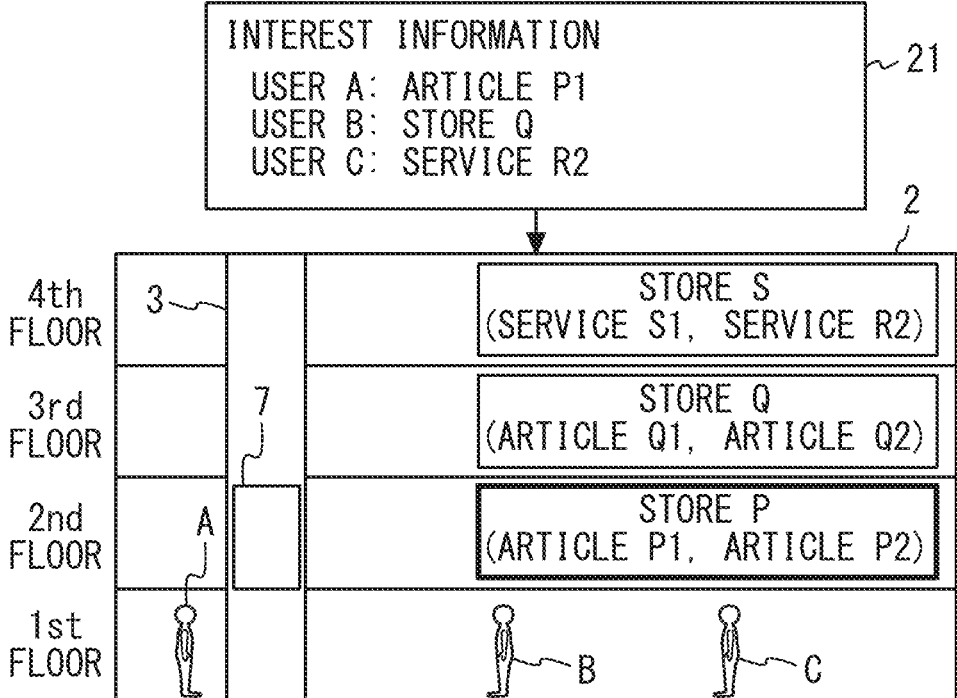
FIG. 12B is a view illustrating an example of presentation of a destination by the interest degree measurement system according to Embodiment 1.

FIG. 12B illustrates the same building 2 at a later date. By this date, the store P that deals with the article P1 has moved to an area on the second floor. Further, the store R has been closed. Still further, a store S that provides a service S1 and the service R2 has been open in an area on the fourth floor.

The user A who utilizes the building 2 again at this date is specified by the user specification unit 14 by the images captured by a plurality of cameras 12 provided on the first floor or the camera 12 inside the car 7 of the elevator 3 on which the user gets. In this event, the destination presentation unit 22 reads the interest information for the user A from the interest information storage unit 21. The destination presentation unit 22 in this example presents an area with an attribute with the highest degree of interest to the user as the destination. In other words, the area with the attribute with the highest degree of interest is preferentially presented. Thus, the destination presentation unit 22 acquires the article P1 as the attribute with the highest degree of interest of the user A. The destination presentation unit 22 extracts an area having the article P1 as the attribute from the attribute storage unit 13. In this example, the destination presentation unit 22 extracts the area on the second floor in which the moved store P is open. The destination presentation unit 22 presents the extracted area to the user A as the destination.

Further, the user B who utilizes the building 2 again at this date is specified by the user specification unit 14 by the images captured by the plurality of cameras 12 provided on the first floor or the camera 12 at the exit of the escalator 4 that captures images after the user gets on the escalator 4 and before the user gets off the escalator 4. In this event, in a similar manner to presentation to the user A, the destination presentation unit 22 presents the area on the third floor in which the store Q is open as the destination on the basis of the interest information. Further, the user C who utilizes the building 2 again at this date is specified by the user specification unit 14 by the images captured by the plurality of cameras 12 provided on the first floor or the camera 12 of the stairs 5 that captures images after the user starts utilization of the stairs 5 and before the user arrives on the arrival floor. In this event, in a similar manner to presentation to the user A, the destination presentation unit 22 presents the area on the fourth floor in which the store S that provides the service R2 is open as the destination on the basis of the interest information.

Note that the destination presentation unit 22 presents a route to the destination floor including the area of the destination and the area of the destination to the user who utilizes the escalator 4 or the stairs 5 using, for example, a video or a speech. In this event, the destination presentation unit 22 may present the attribute with the highest degree of interest of the user used for extracting the destination of the user together, to the user. The destination presentation unit 22 may, for example, present information such as "the store Q is on a left side of the exit on the third floor" to the user B. Further, the destination presentation unit 22 may, for example, present information such as "the store S that provides the service R2 is in front of the exit on the fourth floor" to the user C. By this means, it is possible to present the destination to the user without using personal information such as name of the user.

FIG. 12 illustrate an example of presentation of the destination using the car operating panel 10. In this example, the second floor is presented to the user A who gets on the car 7 as the destination floor. Note that while FIG. 12 illustrate an example in a case where the car operating panel 10 is utilized, in a case where a mobile terminal such as a smartphone carried by the user can directly or indirectly perform communication with the elevator 3, calling for attention to the user, registration of call, guidance, and the like, may be performed through the mobile terminal in a similar manner to a case where the car operating panel 10 is utilized.

Figure 13A:
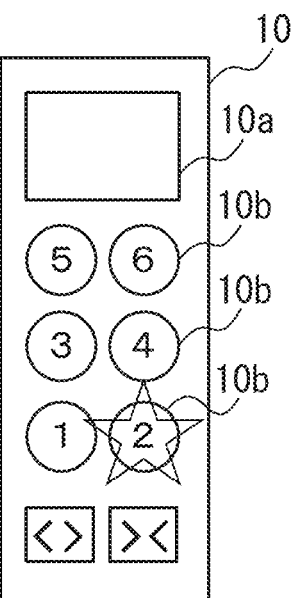
FIG. 13A is a view illustrating an example of presentation of a destination by the interest degree measurement system according to Embodiment 1.

As illustrated in FIG. 13A, the destination presentation unit 22 calls for attention to guidance before the second floor is registered as the destination floor, to the user A by causing light emission equipment of the destination button 10*b* corresponding to the second floor to blink. In this event, the destination presentation unit 22 may display a video such as "the store P that deals with the article P1 is on the second floor" together on display equipment such as a display panel 10*a*. Further, the destination presentation unit 22 may cause a built-in speaker of the display equipment such as the display panel 10*a* to present guidance using a speech together. Here, for example, when a preset period has elapsed since presentation by blinking of the light emission equipment had been started, the call registration unit 23 automatically registers call in which the presented floor is set as the destination floor in the elevator 3 on which the user A gets. In this event, no destination button 10*b* needs to be operated. Immediately after the call is automatically registered, the destination presentation unit 22 ends presentation of guidance of the destination floor by blinking of the light emission equipment of the destination button 10*b* corresponding to the second floor. Further, for example, immediately after call is registered by the destination button 10*b* being operated, the destination presentation unit 22 ends presentation of guidance of the destination floor by blinking of the light emission equipment of the destination button 10*b* corresponding to the second floor.

Figure 13B:
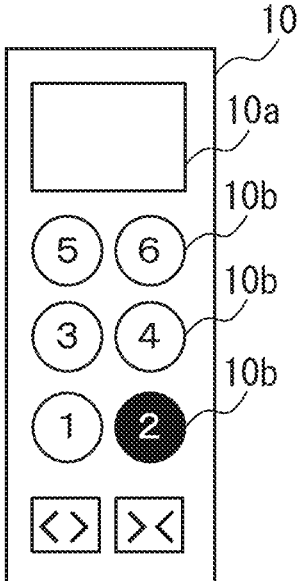
FIG. 13B is a view illustrating an example of presentation of a destination by the interest degree measurement system according to Embodiment 1.

Thereafter, as illustrated in FIG. 13B, the light emission equipment of the destination button 10*b* corresponding to the floor designated as the destination floor is lighted. In this event, registration of call is settled. For example, in a case where the destination button 10*b* corresponding to the destination floor presented by the destination presentation unit 22 is operated, when the car 7 stops on the destination floor, the destination presentation unit 22 may present guidance such as a video and a speech indicating information such as "the store P is on a right side after getting off the elevator 3 on this floor".

Note that the destination presentation unit 22 may continue presentation of the destination when the destination button 10*b* corresponding to another floor which is not the presented destination floor is operated. Alternatively, for example, in a case where there is one user who is in the car 7, the destination presentation unit 22 may end presentation of the destination when the destination button 10*b* corresponding to another floor which is not the presented destination floor is operated.

Further, the destination presentation unit 22 may present the destination floor without using blinking of the light emission equipment of the destination button 10*b*. The destination presentation unit 22 may present the destination floor to the user, for example, through change of brightness of the light emission equipment of the destination button 10*b* corresponding to the destination floor, change of color tone of the light emission equipment, or the like.

In this example, information on the destination actually presented to the user by the destination presentation unit 22 is stored in the behavior information storage unit 16, the interest information storage unit 21, or the like, in association with the behavior information or the interest information of the user or information on a location, a time point, or the like, at which the destination is presented.

Subsequently, an example of visualization of distribution of degrees of interest will be described using FIG. 14.

FIG. 14A to FIG. 14E are views illustrating examples of the interest degree map by the interest degree measurement system 1 according to Embodiment 1.

Figure 14A:
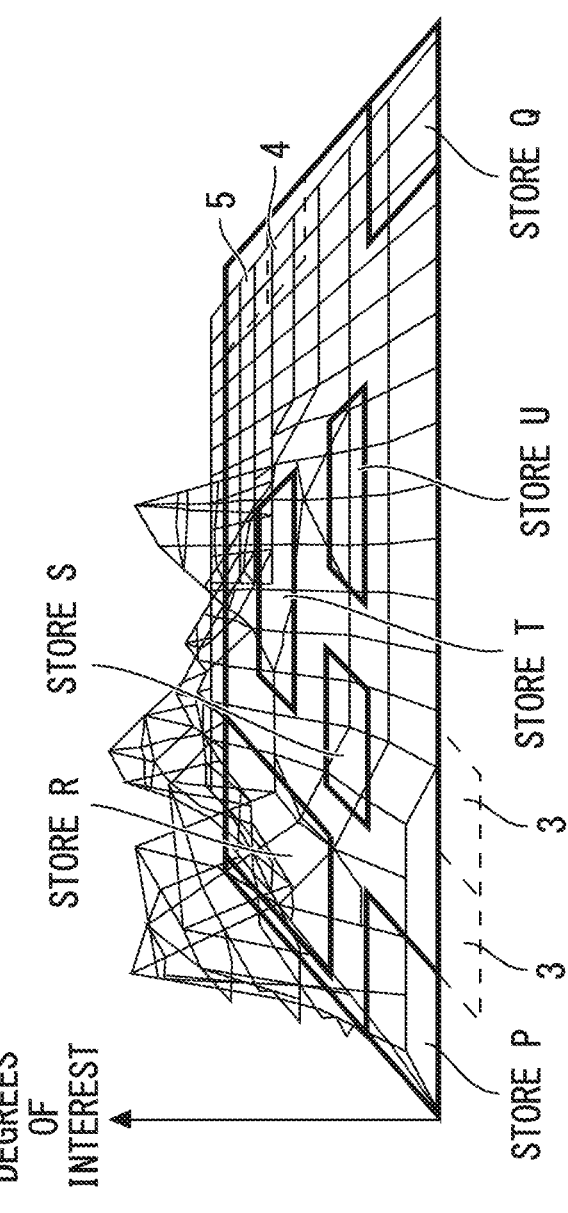
FIG. 14A is a view illustrating examples of the interest degree map by the interest degree measurement system according to Embodiment 1.

For example, as illustrated in FIG. 14A, the visualization processing unit 27 integrates the interest information for each user of the building 2 to generate the interest degree map. In this event, the owner, or the like, of the building 2 designates generation of the interest degree map for all the users from a first time point to a second time point on one of the floors of the building 2 from generation conditions of the interest degree map determined through operation at the operation display unit 28. Here, the first time point and the second time point are time points designated in the generation conditions. The first time point and the second time point may be different time points on the same date or may be time points on different dates.

The visualization processing unit 27 reads the interest information including the information on the time point and the location stored in the interest information storage unit 21 for all the users on the floor of the building 2 between the first time point and the second time point designated in the generation conditions. The visualization processing unit 27, for example, integrates the interest information by tallying up the degrees of interest for the respective users in the read interest information for each location of the floor, that is, for each attribute of the area. For example, in a case where the degrees of interest are acquired for each attribute, the visualization processing unit 27 may tally up sums of the degrees of interest for each attribute for each area of the floor. By this means, the interest degree map is generated as, for example, a drawing in which three-dimensional graphs indicating the degrees of interest are superimposed on the bird's-eye map of the floor. The generated interest degree map is displayed to the owner, or the like, of the building 2 at the operation display unit 28.

Figure 14B:
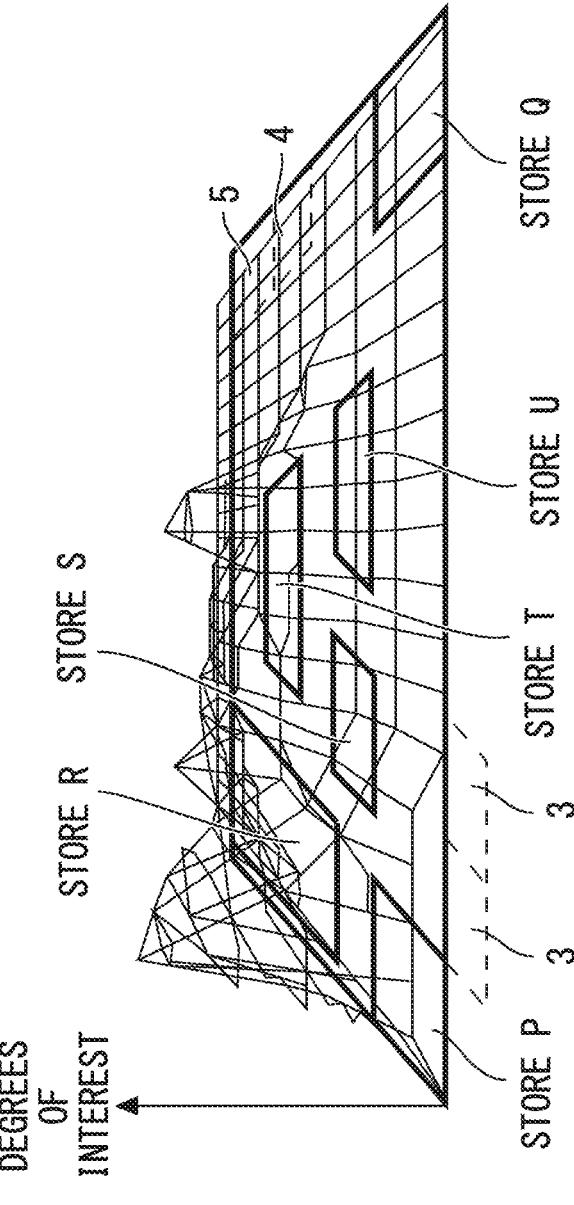
FIG. 14B is a view illustrating examples of the interest degree map by the interest degree measurement system according to Embodiment 1.

Alternatively, for example, as illustrated in FIG. 14B, the visualization processing unit 27 generates the interest degree map for each user of the building 2. In this event, the owner, or the like, of the building 2 designates generation of the interest degree map for a specific user from the first time point to the second time point on one of the floors of the building 2 from generation conditions of the interest degree map determined through operation at the operation display unit 28. In the generation conditions, for example, a specific user A is designated.

The visualization processing unit 27 reads the interest information of the user A including information on the time point and the location stored in the interest information storage unit 21 between the first time point and the second time point designated in the generation conditions. The visualization processing unit 27 generates the interest degree map as, for example, a drawing in which three-dimensional graphs indicating the degrees of interest of the user A are superimposed on the bird's-eye map of the floor. The generated interest degree map is displayed to the owner, or the like, of the building 2 at the operation display unit 28.

Figure 14C:
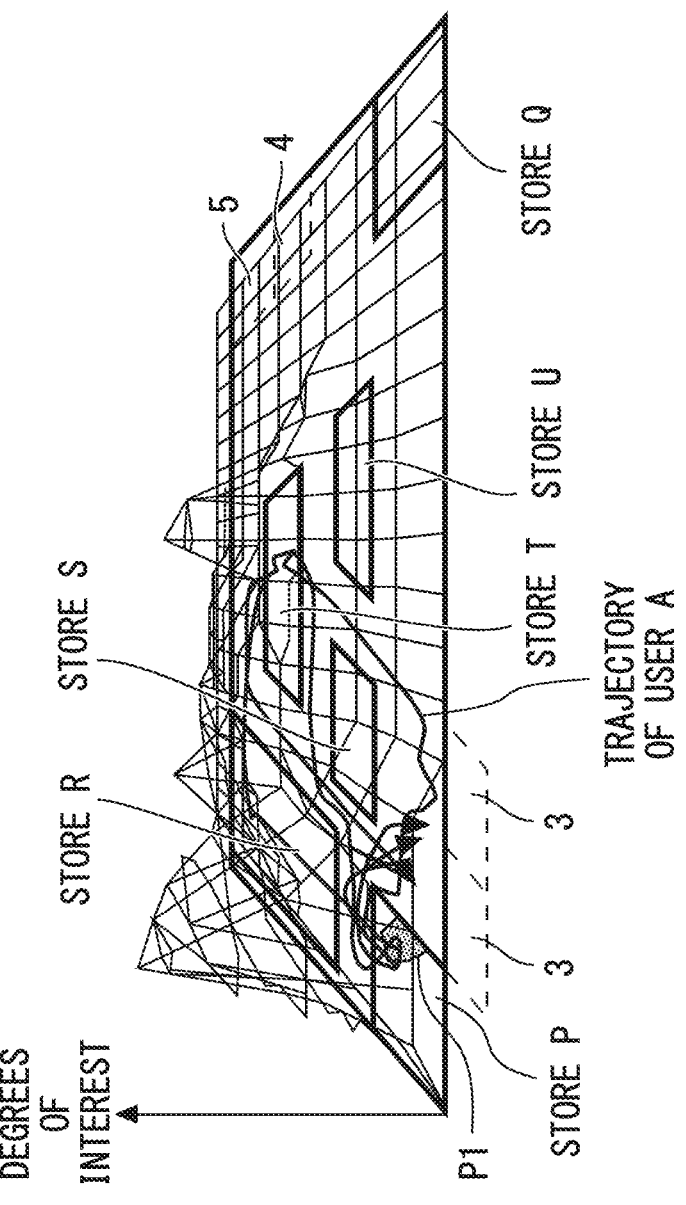
FIG. 14C is a view illustrating examples of the interest degree map by the interest degree measurement system according to Embodiment 1.

Alternatively, for example, as illustrated in FIG. 14C, the owner, or the like, of the building 2 designates to the visualization processing unit 27, generation of the interest degree map including the behavior information of the user A from the first time point to the second time point on one of the floors of the building 2 from the generation conditions of the interest degree map determined through operation at the operation display unit 28. The visualization processing unit 27 may generate the interest degree map including the behavior information of the user.

Alternatively, the owner, or the like, of the building 2 designates to the visualization processing unit 27, generation of the interest degree map including the behavior information of users who are applicable to certain classification information from the first time point to the second time point on one of the floors of the building 2 from the generation conditions of the interest degree map determined through operation at the operation display unit 28. The visualization processing unit 27 may generate the interest degree map including the behavior information of a plurality of users.

The visualization processing unit 27 reads the interest information of the user A including the information on the time point and the location stored in the interest information storage unit 21 between the first time point and the second time point designated in the generation conditions. Further, the visualization processing unit 27 reads the behavior information including the information on the time point and the location stored in the behavior information storage unit 16 between the first time point and the second time point designated in the generation conditions. The visualization processing unit 27, for example, generates the interest degree map as a drawing in which the three-dimensional graphs indicating the degrees of interest of the user A and the trajectory of the user A are superimposed on the bird's-eye map of the floor. In a case where the user A utilizes the floor a plurality of times, the interest degree map may include a plurality of trajectories of the user A. In this example, the visualization processing unit 27 generates the interest degree map including an area in which the degree of interest of the user A is high. The area in which the degree of interest of the user A is high is, for example, a store P dealing with an article P1. The generated interest degree map is displayed to the owner, or the like, of the building 2 at the operation display unit 28.

Note that the interest degree map may provide display along with classification information of the user A. The classification information of the user A includes, for example, a utilization frequency of the building 2 by the user A, gender, an age group, utilization hours, utilization day, weather upon utilization, and the like. The interest degree map may provide display of only one of the trajectory or the classification information of the user A.

Figure 14D:
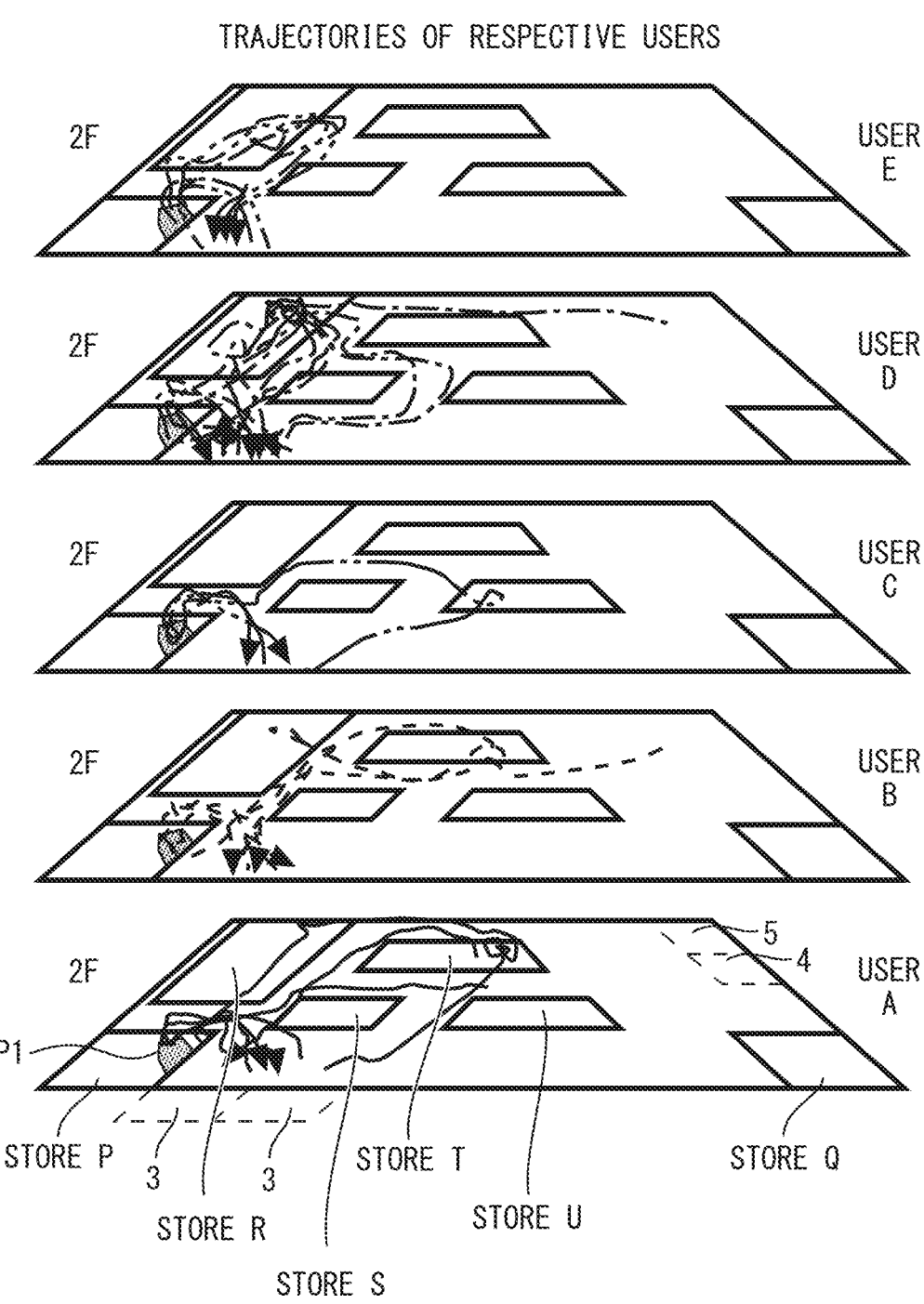
FIG. 14D is a view illustrating examples of the interest degree map by the interest degree measurement system according to Embodiment 1.

Alternatively, for example, as illustrated in FIG. 14D, the visualization processing unit 27 may generate the interest degree map including behavior information or interest information of a plurality of users. The plurality of users may be part or all of the users who satisfy certain conditions, designated in the generation conditions of the interest degree map among the users of the building 2. For example, the owner, or the like, of the building 2 designates generation of the interest degree map for users who express interest in a specific attribute among the users from the first time point to the second time point on one of the floors of the building 2 from the generation conditions of the interest degree map determined through operation at the operation display unit 28. In the generation conditions, for example, the article P1 is designated as the specific attribute.

The visualization processing unit 27 reads the interest information and the behavior information including the information on the time point and the location stored in the interest information storage unit 21 and the behavior information storage unit 16 for all the users on the floor of the building 2 between the first time point and the second time point designated in the generation conditions. The visualization processing unit 27 extracts users for whom the degrees of interest with respect to the article P1 are higher than a certain threshold determined through operation at the operation display unit 28 on the basis of the read interest information. In this example, five users of the user A, the user B, the user C, the user D and the user E are extracted. The visualization processing unit 27, for example, generates the interest degree map as a drawing, or the like, in which a trajectory for each of the extracted users is superimposed on the bird's-eye map of the floor on the basis of the read behavior information. In this example, the interest degree map is generated as a drawing in which the trajectories of the respective users are superimposed on a plurality of bird's-eye maps of the same floor.

Figure 14E:
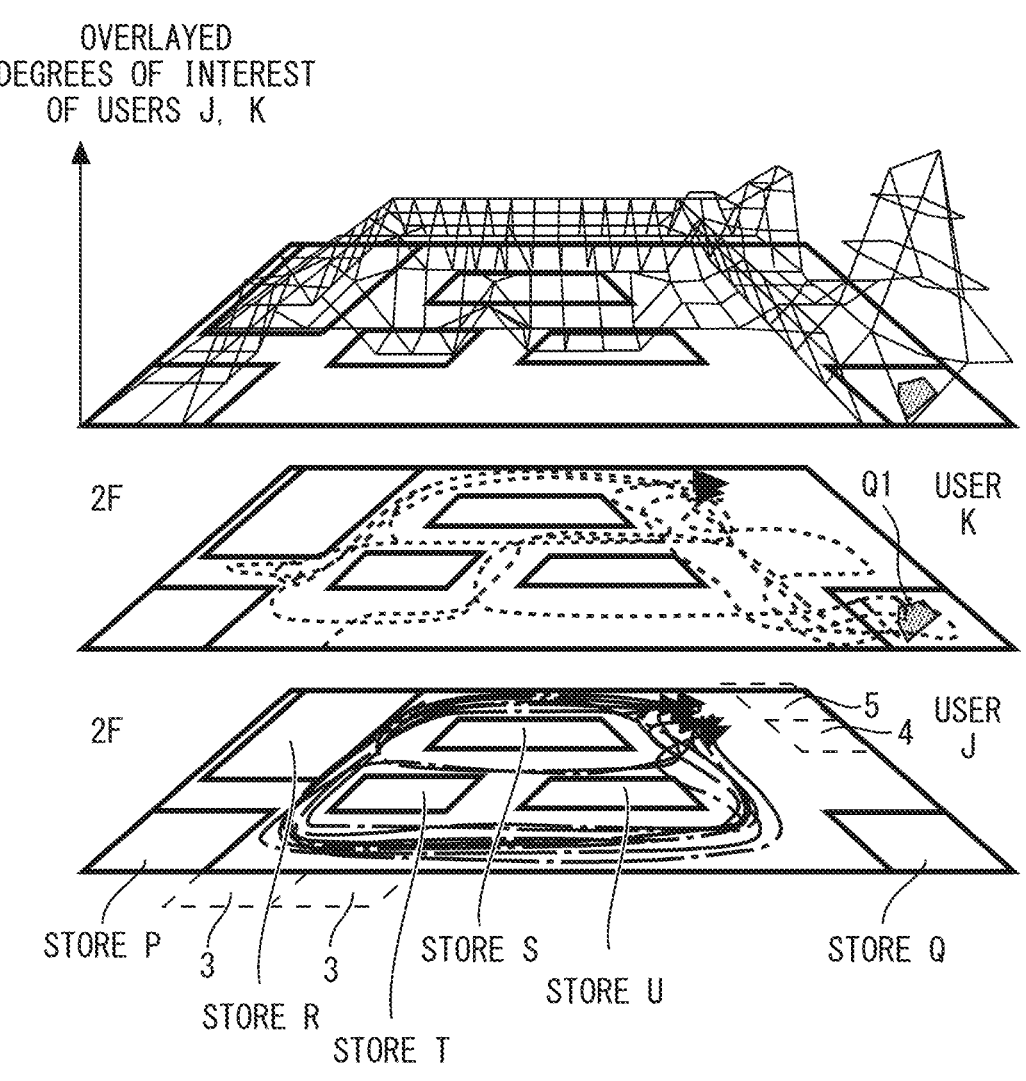
FIG. 14E is a view illustrating examples of the interest degree map by the interest degree measurement system according to Embodiment 1.

Alternatively, for example, as illustrated in FIG. 14E, the visualization processing unit 27 may extract users who exhibit behavior deviating from the main tendencies of users among the plurality of users to generate the interest degree map. For example, the owner, or the like, of the building 2 designates generation of the interest degree map for users who exhibit behavior deviating from the main tendencies of users among the users on one of the floors of the building 2 from the generation conditions of the interest degree map determined through operation at the operation display unit 28.

The visualization processing unit 27 reads the interest information and the behavior information including the information on the time point and the location stored in the interest information storage unit 21 and the behavior information storage unit 16 for all the users on the floor designated in the generation conditions. The visualization processing unit 27 extracts users who exhibit behavior deviating from the main tendencies of users on the basis of the read interest information. Extraction conditions may be designated in the generation conditions of the interest degree map. The extraction conditions are, for example, conditions based on distribution representing the main utilization tendencies of users. The distribution is, for example, hours during which the users utilize the building. A degree of matching to the distribution is, for example, judged on the basis of how much degree a utilization form of each user is separated from an average value of the distribution in units of standard deviation a. The visualization processing unit 27, for example, extracts users who utilize the building at a time point separate from an average time point of the distribution of the utilization hours of the users by equal to or greater than 3σ. In this event, the visualization processing unit 27, for example, extracts users in midnight hours. The users who exhibit behavior deviating from the main tendencies of users may be extracted using various statistical methods regardless of the average or the standard deviation indicated in this example.

In this example, two users of a user J and a user K are extracted. Each store in the building 2 is closed in midnight hours. The user J regularly behaves inside the building 2 with high frequency and does not exhibit a high degree interest biased to a specific area. The user J can be estimated as a security officer who goes around inside the building 2. The owner, or the like, of the building 2 can confirm whether or not the user J is a security officer through collation between a period during which the user J behaves and a duty status of the security officer. On the other hand, the user K utilizes the building 2 with low frequency and exhibits a degree of interest biased to a specific area. Further, a trajectory of the user K is irregular and exhibits suspicious behavior. In this event, there is a possibility that the user K is a suspicious person who breaks into the building 2. In this case, the owner, or the like, of the building 2 can grasp intrusion of a suspicious person. Note that the visualization processing unit 27 may detect a user who exhibits behavior deviating from the main tendencies of users as needed without operation by the owner, or the like, of the building 2. When the visualization processing unit 27 detects the user, the operation display unit 28 may notify the owner, or the like, of the building 2. This can prevent damage of theft, or the like, in the building 2 in advance.

Subsequently, an example of simulation of change of the interest information will be described using FIG. 15.

Figure 15A:
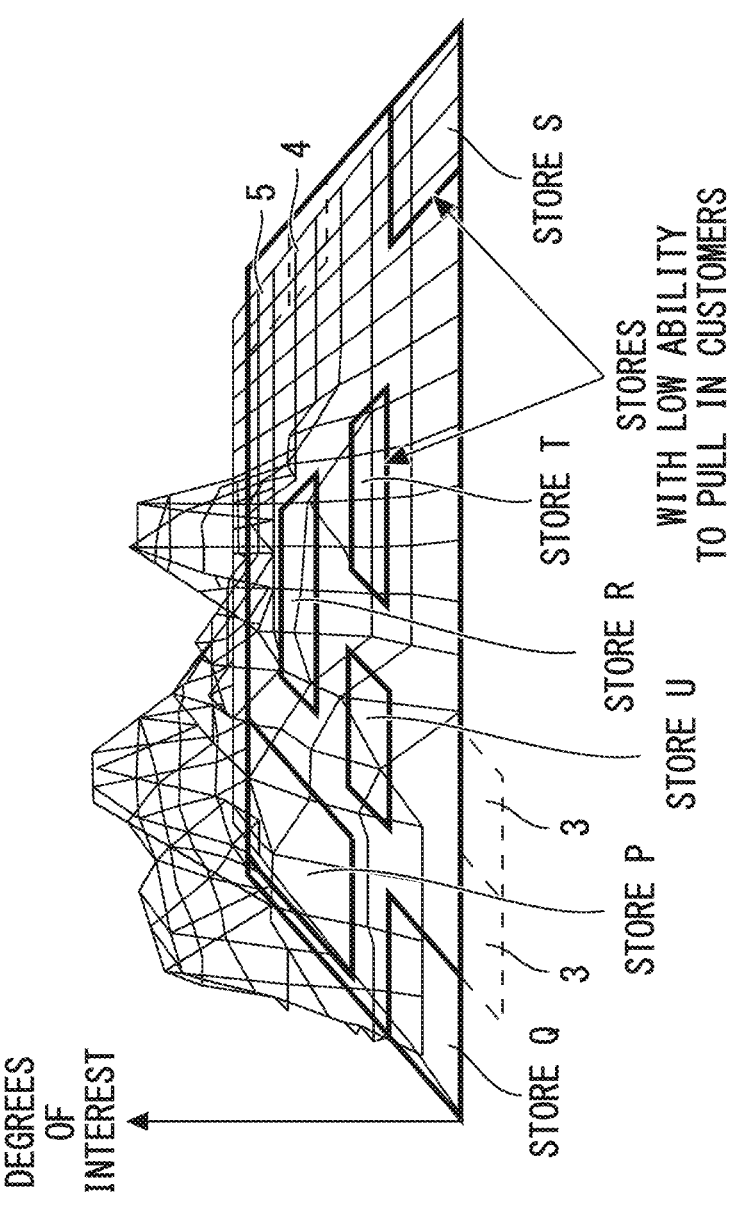
FIG. 15A is a view illustrating examples of the interest degree map by the interest degree measurement system according to Embodiment 1.
Figure 15B:
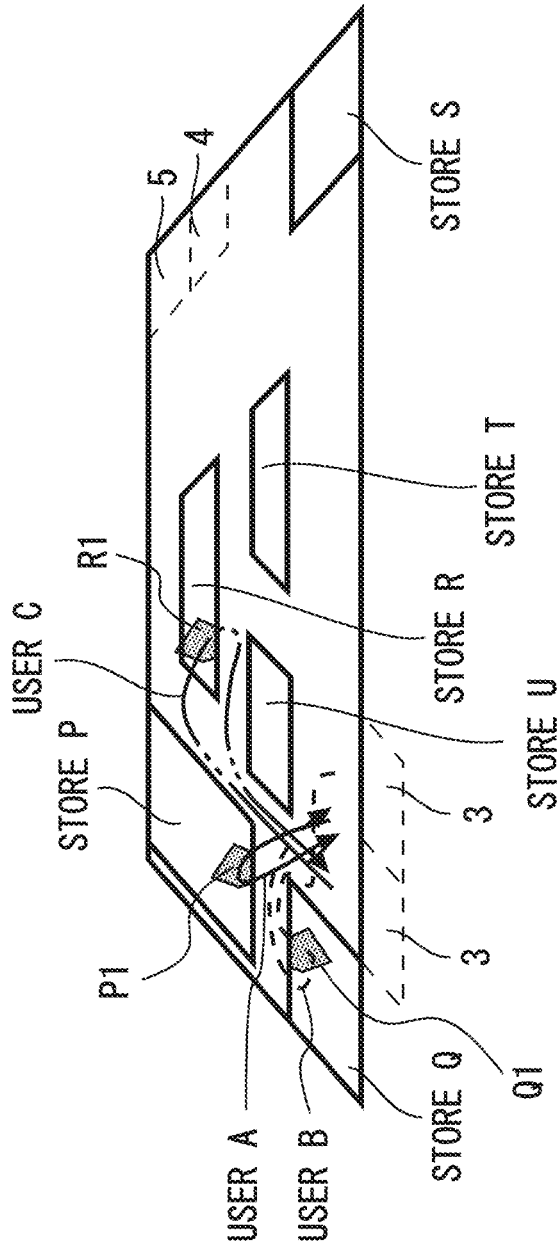
FIG. 15B is a view illustrating examples of the interest degree map by the interest degree measurement system according to Embodiment 1.

FIG. 15A and FIG. 15B are views illustrating examples of the interest degree map by the interest degree measurement system 1 according to Embodiment 1.

Figure 15C:
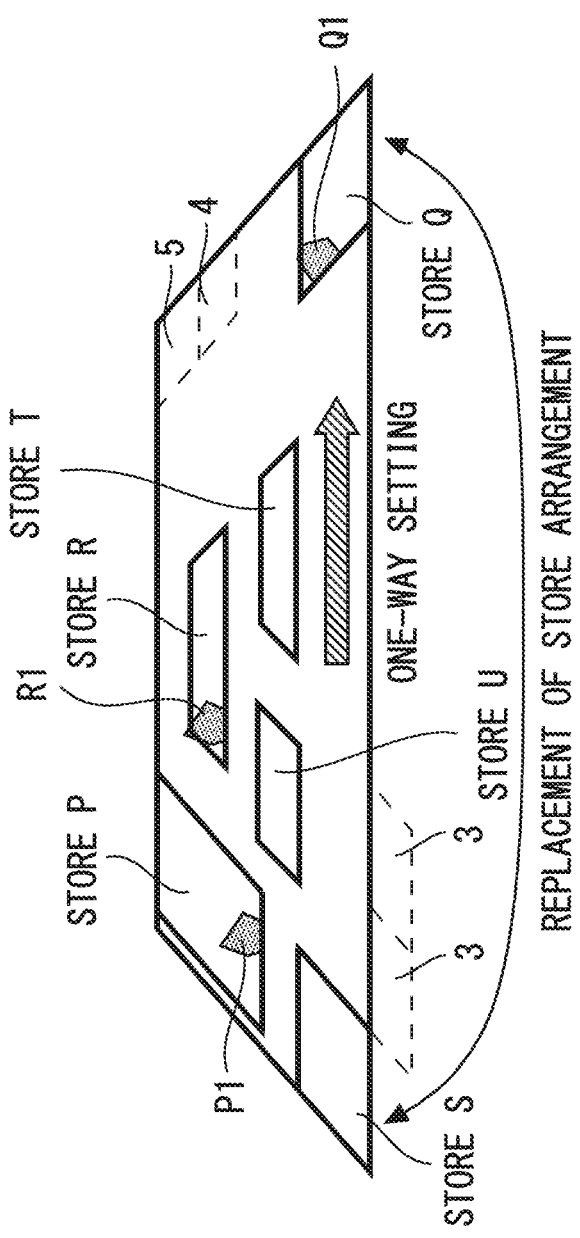
FIG. 15C is a view illustrating an example of setting of simulation conditions in the simulation system according to Embodiment 1.

FIG. 15C is a view illustrating an example of setting of simulation conditions in the simulation system 50 according to Embodiment 1.

Figure 15D:
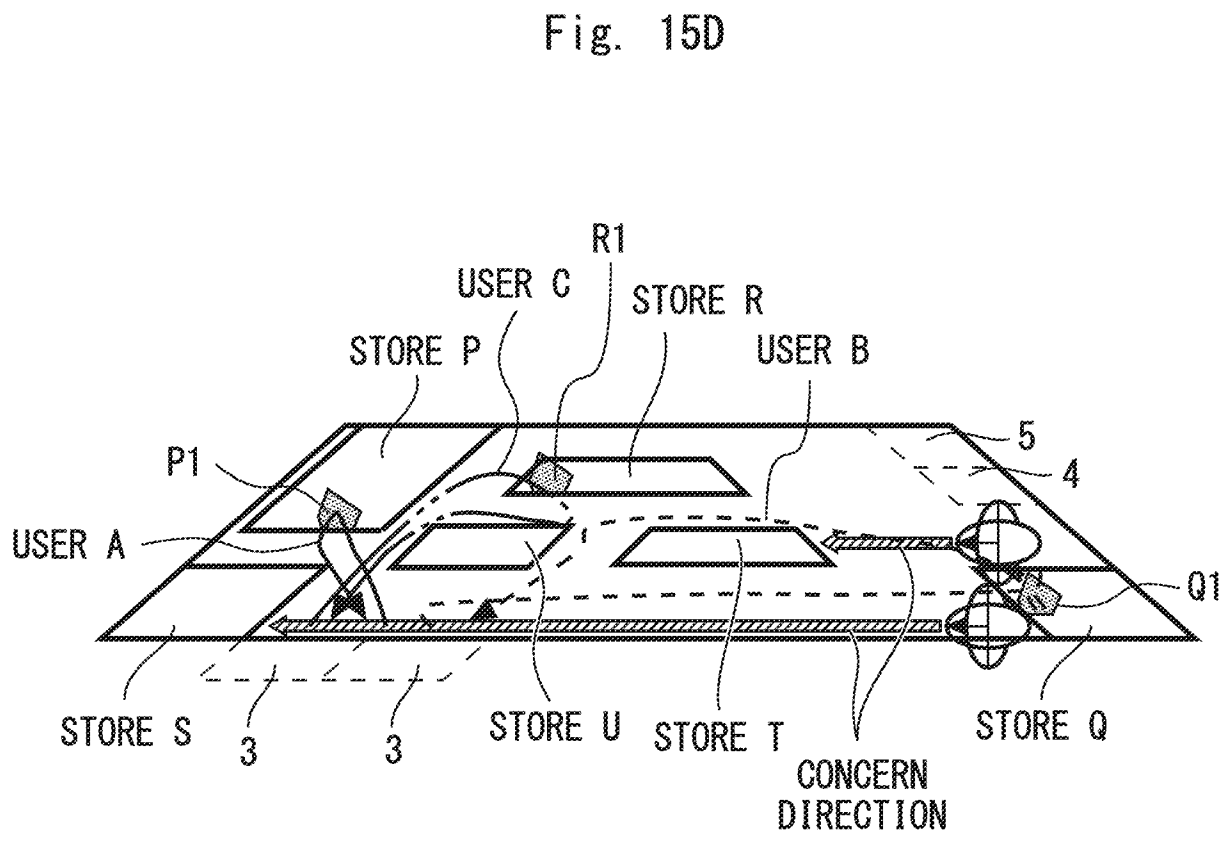
Figure 15E:
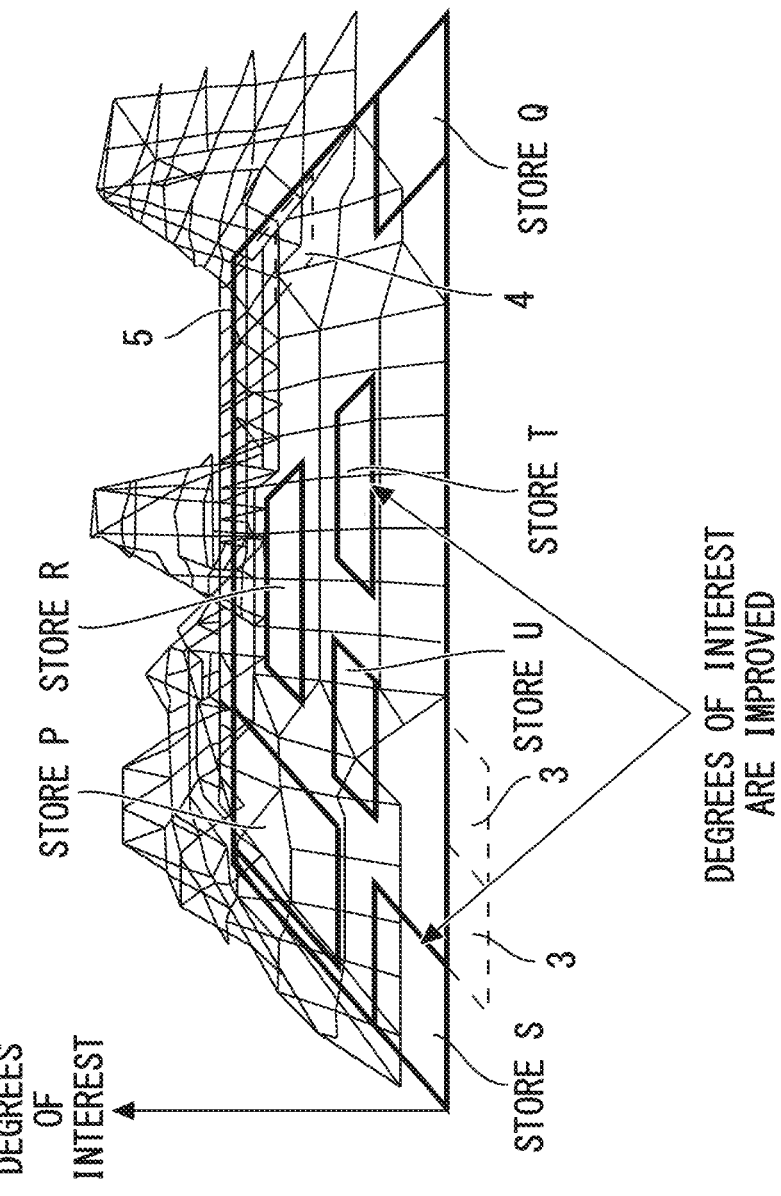
FIG. 15E is a view illustrating an example of a result of simulation by the simulation system according to Embodiment 1.

FIG. 15D and FIG. 15E are views illustrating an example of a result of simulation by the simulation system 50 according to Embodiment 1.

The owner, or the like, of the building 2 refers to the interest degree map generated by the visualization processing unit 27 as in, for example, FIG. 15A, through the operation display unit 28. In this example, the interest degree map is generated by integrating the interest information of all the users on a specific date designated by the owner, or the like, of the building 2. For example, the first time point is set at the opening time of the building 2 on the specific date, and the second time point is set at the closing time of the building 2 on the specific date. The interest degree map is generated for the second floor as a specific floor of the building 2.

On the second floor of the building 2, the store P dealing with the article P1 is open. Further, on the floor, a store Q dealing with an article Q1 and a store R dealing with a service R1 are open. Further, on the second floor of the building 2, a store S and a store T are open. According to the interest degree map, the degrees of interest with respect to the store S and the store T are low. In other words, the store S and the store T have low ability to pull in customers. In this case, if the degrees of interest with respect to the store S and the store T can be improved, there is a possibility that the value of the building 2 can be more improved.

For example, the owner, or the like, of the building 2 refers to trajectories of the users in the building 2 indicated by the interest degree map as in FIG. 15B. In this example, trajectories of the user A, the user B and the user C are visualized. Until this date, the interest degree measurement system 1 acquires the interest information of the user A, the user B and the user C. The interest information storage unit 21 stores the article P1 as an attribute with a high degree of interest for the user A. The interest information storage unit 21 stores the store Q as an attribute with a high degree of interest for the user B. The interest information storage unit 21 stores the service R1 as an attribute with a high degree of interest for the user C. On the date when the interest degree map is generated, the user A visits the store P dealing with the article P1. On this date, the user B visits the store Q and behaves around the article Q1. On this date, the user C visits the store R dealing with the service R1. The owner, or the like, of the building 2 considers layout that further improves the value of the building 2 on the basis of information on the degrees of interest and the trajectories of the users grasped by the interest degree map in this manner.

The owner, or the like, of the building 2 uses simulation by the simulation system 50 ton consider the layout. The owner, or the like, of the building 2 sets the simulation conditions through, for example, the operation display unit 28, or the like. The owner, or the like, of the building 2 edits the layout of the second floor of the building 2, for example, as illustrated in FIG. 15C as the simulation conditions. In the edited layout in this example, one-way is set on a passage adjacent to the store T. Further, in the edited layout, arrangement of the store Q and the store S is replaced. After the simulation conditions are set by editing the layout, the owner, or the like, of the building 2, for example, causes the simulation system 50 to start simulation through the operation display unit 28, or the like.

The simulation processing unit 29 performs simulation, for example, as follows.

The simulation processing unit 29 sets users who become targets of simulation. The simulation processing unit 29, for example, sets all or part of the users designated by the generation conditions of the interest degree map as the targets of the simulation. In this example, the simulation processing unit 29 sets the user A, the user B and the user C as the targets of the simulation. Note that the simulation processing unit 29 may, for example, add virtual users with high interest with respect to an attribute of a specific area to the targets of the simulation. The simulation processing unit 29 may add one or more virtual users to the targets of the simulation. In this event, for example, classification information such as age and gender may be provided to each of the virtual users. The virtual users to be added and the classification information and the interest information thereof are designated in, for example, the simulation conditions. Further, in the simulation conditions, conditions outside the building 2, for example, weather, or the like, may be designated. The conditions outside the building 2 are used to select users who become the targets of the simulation or add virtual users.

The simulation processing unit 29 sets a destination area of the building 2 for each of the users who become the targets of the simulation. For example, for a user who has actually behaved on the second floor in the building 2, the simulation processing unit 29 sets an area the user has actually visited on the second floor as the destination area. The area the user has visited has, for example, an attribute of a destination area for which the degree of interest of each user is high. The destination area may include an ascending/descending facility as a start point or an end point of the trajectory on the second floor. The destination area may include an invisible area such as a restroom. In a case where there are a plurality of destination areas of the user, the simulation processing unit 29 sets the order of the destination areas. The order may be, for example, set in descending order of the degree of interest or may be set so that a moving distance on the second floor becomes shorter.

The simulation processing unit 29 generates behavior information on the second floor in a simulated manner for each of the users who become the targets of the simulation. For example, in a case where there is no edited portion of the layout on the trajectory of a user for the user who has actually behaved on the second floor in the building 2, the simulation processing unit 29 generates behavior information in a simulated manner in a similar manner to the processing at the behavior information acquisition unit 15 on the basis of the actual trajectory on the second floor of the user. Alternatively, the simulation processing unit 29 sets the trajectories of the user in the order in which the destination areas are set for the respective users. In this event, the simulation processing unit 29, for example, sets the trajectories of the users assuming that the users move among one or more destination areas without taking the long way. The simulation processing unit 29 may disrupt the trajectories of the user with random numbers, or the like. The simulation processing unit 29 may set the trajectories of the users using, for example, a known technique such as people flow simulation. The simulation processing unit 29 generates the behavior information in a simulated manner in a similar manner to the processing at the behavior information acquisition unit 15 on the basis of the set trajectories. Here, the simulation processing unit 29 generates simulated behavior information in which interest direction information of the user is set on a front side regardless of right or left of the trajectory set for the user.

The simulation processing unit 29 generates the interest information in a simulated manner in a similar manner to the processing at the interest information acquisition unit 20 on the basis of the behavior information generated in a simulated manner for each of the users who become the targets of the simulation.

The simulation processing unit 29 generates a result of the simulation as the interest degree map in a similar manner to the processing at the visualization processing unit 27 on the basis of the behavior information and the interest information generated in a simulated manner.

The simulation processing unit 29 calculates a difference between the result of the simulation and the information stored in the interest information storage unit 21. The simulation processing unit 29 calculates a difference by calculating a difference in distribution of the degrees of interest between the result of the simulation and the actually acquired interest information.

FIG. 15D is a view illustrating an example of a trajectory for each user as the result of the simulation. In this example, there is no edited portion of layout on the trajectories of the user A and the user C, and thus, the trajectories of the user A and the user C on the simulation become similar to the actual trajectories. On the other hand, layout of the store Q the user B has visited is edited, and thus, the trajectory of the user B is set so as to reach the store Q through a passage adjacent to the store T. Here, one-way is set on the passage, and thus, the trajectory of the user B is set so as to pass through different passages between when the user B goes to the store Q and when the user B returns from the store Q. In this event, an interest direction of the user B who is moving on the second floor is directed to the store S and the store T. In this case, the degrees of interest with respect to the store S and the store T are improved.

FIG. 15E is a view illustrating distribution of degrees of interest on the second floor as the result of the simulation. In this manner, from the interest degree map that visualizes change of the interest information, the owner, or the like, of the building 2 can grasp influence on the degrees of interest by editing of the layout.

Note that the simulation system 50 may simulate change of the interest information of the user who moves across a plurality of floors over the plurality of floors. Another example of simulation of change of the interest information across a plurality of floors will be described using FIG. 16.

Figure 16A:
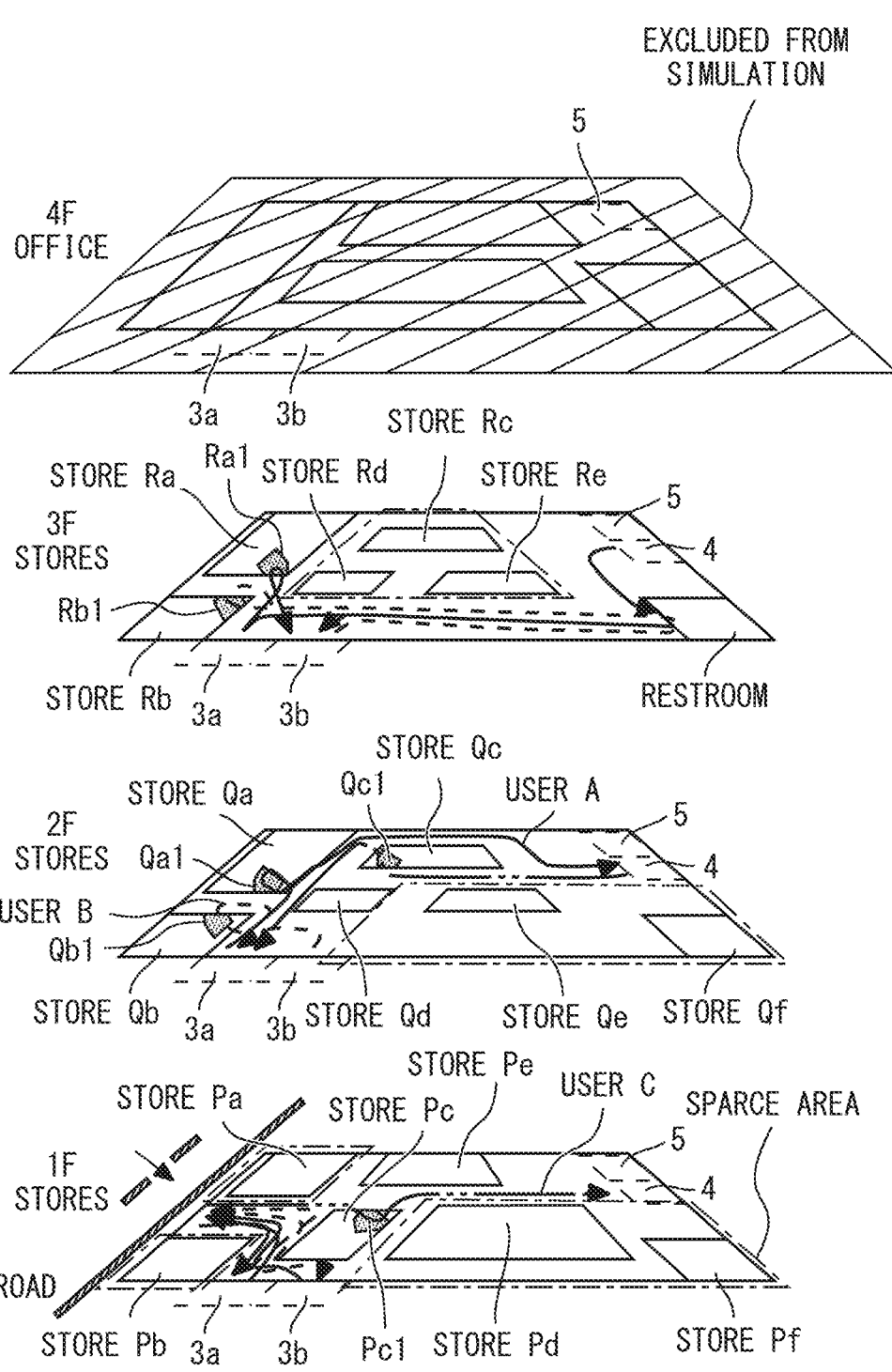
FIG. 16A is a view illustrating an example of the interest degree map by the interest degree measurement system according to Embodiment 1.

FIG. 16A is a view illustrating an example of the interest degree map by the interest degree measurement system 1 according to Embodiment 1.

Figure 16B:
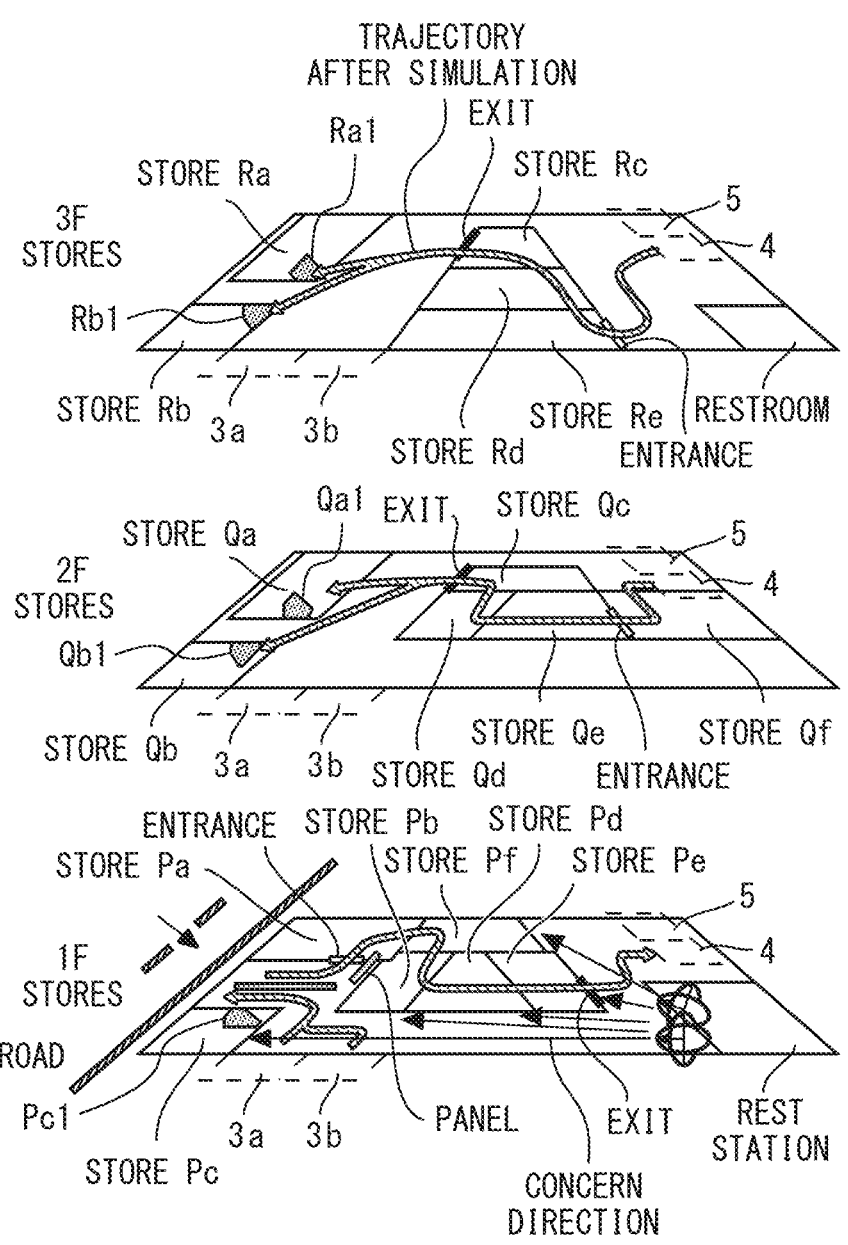
FIG. 16B is a view illustrating an example of the result of the simulation by the simulation system according to Embodiment 1.

FIG. 16B is a view illustrating an example of the result of the simulation by the simulation system 50 according to Embodiment 1.

As illustrated in FIG. 16A, in the building 2 in this example, a store Pa, a store Pb, a store Pc, a store Pd, a store Pe and a store Pf are open on the first floor. The store Pc deals with an article Pc1. Further, a store Qa, a store Qb, a store Qc, a store Qd, a store Qe, and a store Qf are open on the second floor. The store Qa deals with an article Qa1. The store Qb deals with an article Qb1. The store Qc deals with an article Qc1. Further, a store Ra, a store Rb, a store Rc, a store Rd, and a store Re are open on the third floor. The store Ra deals with an article Ra1. The store Rb deals with an article Rb1. In the building 2, a restroom is provided on the third floor. In the building 2, the fourth floor is an office floor. As ascending/descending facilities to be utilized by users of the building 2 to move among the floors from the first floor to the fourth floor, an elevator 3a, an elevator 3b and stairs 5 are provided. As ascending/descending facilities to be utilized by users of the building 2 to move among the floors from the first floor to the third floor, escalators 4 are provided.

Trajectories of the respective users including the user A, the user B and the user C are stored in the behavior information storage unit 16 as the behavior information.

According to the trajectory of the user A, the user A moves from the first floor to the second floor by utilizing the elevator 3a after entering the building 2 from an entrance/exit. Thereafter, the user A expresses interest in the article Qa1 at the store Qa on the second floor. Then, the user A moves from the second floor to the third floor by utilizing the escalator 4. Then, the user A drops into the restroom on the third floor. Thereafter, the user A expresses interest in the article Ra1 at the store Ra on the third floor. Then, the user A moves from the third floor to the first floor by utilizing the elevator 3b. Then, the user A exits the building 2 from the entrance/exit.

According to the trajectory of the user B, the user B moves from the first floor to the third floor by utilizing the elevator 3b after entering the building 2 from the entrance/exit. Thereafter, the user B drops into the restroom on the third floor. Then, the user B expresses interest in the article Rb1 at the store Rb on the third floor. Then, the user B moves from the third floor to the second floor by utilizing the elevator 3b. Thereafter, the user B expresses interest in the article Qb1 at the store Qb on the second floor. Then, the user B moves from the second floor to the first floor by utilizing the elevator 3b. Then, the user B exits the building 2 from the entrance/exit.

According to the trajectory of the user C, the user C expresses interest in the article Pc1 at the store Pc on the first floor after entering the building 2 from the entrance/exit. Thereafter, the user C moves from the first floor to the second floor by utilizing the escalator 4. Then, the user C expresses interest in the article Qc1 at the store Qc on the second floor. Then, the user C moves from the second floor to the first floor by utilizing the elevator 3a. Thereafter, the user C exits the building 2 from the entrance/exit.

By such trajectories of the users being superimposed on the bird's-eye maps of the respective floors, a sparse area with low density of the trajectories of the users is visualized. In FIG. 16A, the sparce area is indicated with a dash-dotted frame. According to FIG. 16A, it can be seen that in the building 2, there is room for improvement in a point that an area near the entrance/exit is crowded, a point that the escalator 4 is less utilized than the elevator 3, and a point that there are many sparse areas on each floor. The owner, or the like, of the building 2 considers layout of each floor of the building 2 so as to address these points.

The owner, or the like, of the building 2 uses simulation by the simulation system 50 to consider the layout. The owner, or the like, of the building 2 sets the simulation conditions through, for example, the operation display unit

28, or the like. The owner, or the like, of the building 2 edits the layout from the first floor to the third floor of the building 2 as illustrated in, for example, FIG. 16B as the simulation conditions. Note that in this example, the fourth floor that is an office floor and users of the fourth floor are excluded from the targets of the simulation.

In the edited layout of the first floor in this example, one-way is set for each of the entrance and the exit. In the edited layout, a panel, or the like, that guides users from the entrance to the store Pa located in the sparse area is provided. In the edited layout, the store Pe is arranged at a location adjacent to the store Pa located in the sparse area. In the edited layout, the store Pb, the store Pd and the store Pf located in the sparse area are arranged in a concentrated manner at a location adjacent to the store Pe. In the edited layout, a rest station is arranged at a location from which users can see the store Pb, the store Pd and the store Pf located in the sparse area. Further, in the edited layout in this example, operation of the escalator 4 is restricted to upward operation. In the edited layout, operation of the elevator 3a and the elevator 3b is restricted to downward operation. In the edited layout of the second floor in this example, the store Qc, the store Qd, the store Qe and the store Qf located in the sparse area are arranged in a concentrated manner at a location near the escalator 4. In the edited layout of the second floor in this example, an entrance, or the like, that guides users to the store Qf is provided, and an exit, or the like, that guides users to the store Qc is provided. These are setting of the entrance and the exit through which users pass in the layout of the second floor. In the edited layout of the third floor in this example, the store Rc, the store Rd and the store Re located in the sparse area are arranged in a concentrated manner. In the edited layout of the third floor in this example, an entrance, or the like, that guides users to the store Re is provided, and an exit, or the like, that guides users to the store Rc is provided. These are setting of the entrance and the exit through which users pass in the layout of the third floor. Note that in this example, operation of the elevator 3a and the elevator 3b is not restricted to downward operation for users of the fourth floor that is an office floor.

After the simulation conditions are set by editing the layout, the owner, or the like, of the building 2 causes the simulation system 50 to start simulation through, for example, the operation display unit 28, or the like.

The simulation processing unit 29 performs simulation across the plurality of floors in a similar manner to the simulation for a single floor. The simulation processing unit 29 sets users that become the targets of the simulation. For example, the simulation processing unit 29 sets a plurality of users including the user A, the user B and the user C and excluding users of the fourth floor as the targets of the simulation. The simulation processing unit 29 sets an attribute with a high degree of interest within the building 2 for each of the users who become the targets of the simulation. The simulation processing unit 29 generates the behavior information on the first floor, the second floor and the third floor in a simulated manner for each of the users who become the targets of the simulation. The simulation processing unit 29 generates the interest information in a simulated manner in a similar manner to the processing at the interest information acquisition unit 20 on the basis of the behavior information generated in a simulated manner for each of the users who become the targets of the simulation.

In this example, an effect of alleviation of congestion near the entrance/exit by setting one-way at the entrance/exit is simulated. Further, by arranging stores located in the sparce area in a concentrated manner, interest directions of the users can be easily directed to the respective stores. Still further, by guiding migration paths of users to stores located in the sparse area, interest directions of the users can be easily directed to the stores. Further, by arranging a rest station at a location from which users can see stores located in the sparse area, interest directions of the users can be easily directed to the respective stores. An effect of improving the degrees of interest with respect to the sparse area by such change is simulated by the simulation system 50. Further, an effect of leveling utilization rates of the respective ascending/descending facilities such as the elevator 3 and the escalator 4 by restriction of moving directions of users is simulated.

Further, the interest degree measurement system 1 may be used for management, or the like, of a work environment of persons who engage in operation in the building 2. The simulation system 50 may be used to improve the work environment of persons who engage in operation in the building 2. An example of acquisition of interest information and simulation of change of the interest information in which persons who engage in operation in the building 2 are set as users will be described using FIG. 17.

Figure 17A:
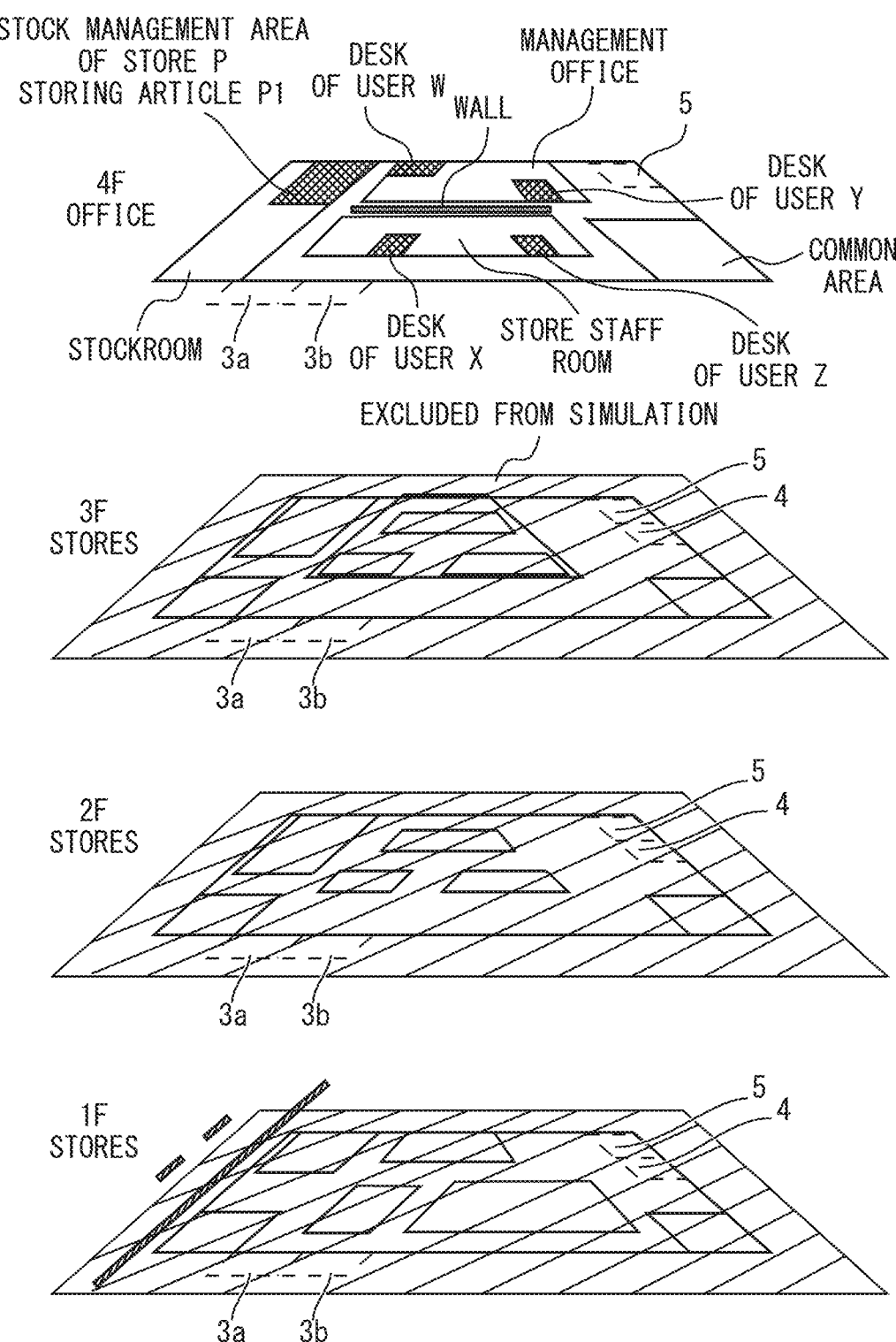
FIG. 17A is a view illustrating an example of layout of the building according to Embodiment 1.

FIG. 17A is a view illustrating an example of layout of the building 2 according to Embodiment 1.

Figure 17B:
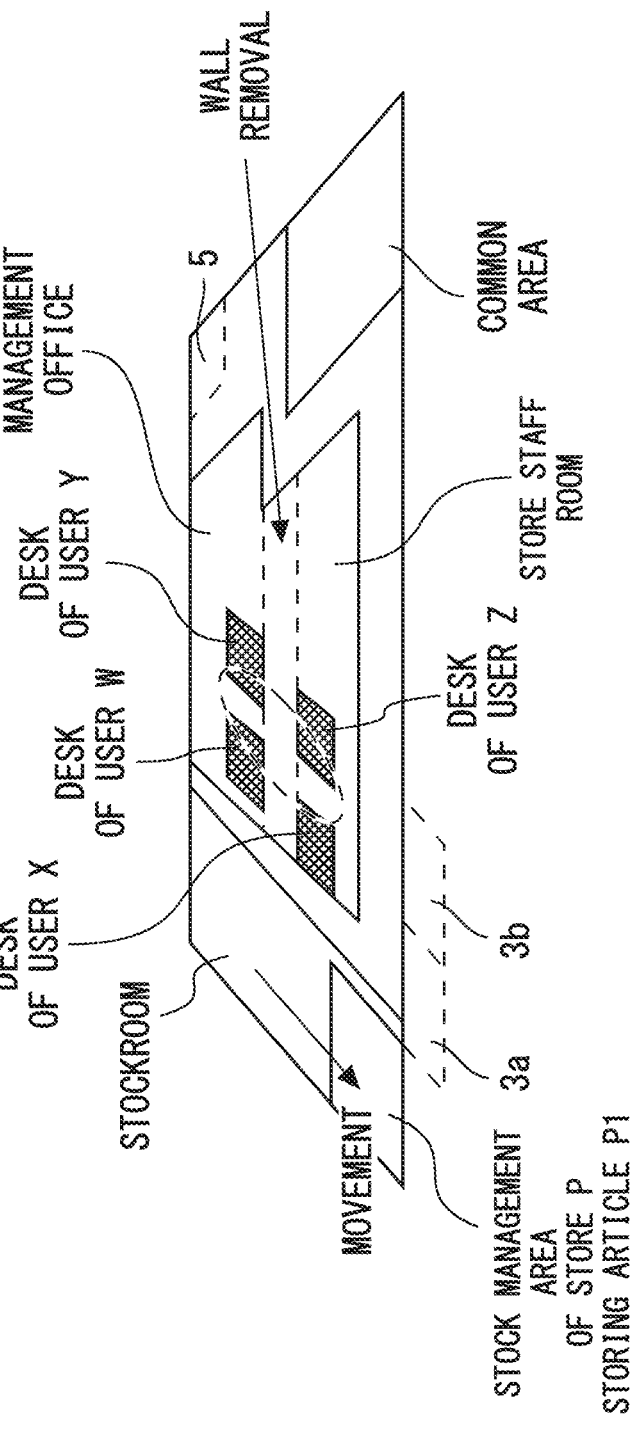
FIG. 17B is a view illustrating an example of a result of simulation by the simulation system according to Embodiment 1.

FIG. 17B is a view illustrating an example of a result of simulation by the simulation system 50 according to Embodiment 1.

As illustrated in FIG. 17A, in the building 2 in this example, the first floor, the second floor and the third floor are store floors. In the building 2, the fourth floor is an office floor where persons who engage in operation work. In the building 2, a management office, a store staff room, a stockroom, and a common area are provided on the fourth floor. In the building 2, a passage having walls is provided between the management office and the store staff room. In the management office, desks to be used by a user W and a user Y to perform clerical work are arranged. The user W and the user Y are persons who engage in management operation of the building 2. In the store staff room, desks to be used by a user X and a user Z to perform clerical work are arranged. The user X is a person who engages in operation of the store P open in the building 2. The user Z is a person who engages in operation of the store Q open in the building 2. In the stockroom, the article P1, and the like, are stored as stock in a stock management area of the store P. The common area is a place to be utilized regardless of affiliations of the users. The common area is, for example, a kitchenette, a break room, or the like.

The interest information acquisition unit 20 acquires the interest information of the users on the basis of the behavior information of the users. The interest information acquisition unit 20 acquires the interest information between the users, for example, on the basis of a contact period, or the like, in an area included in the common area.

In this example, the interest information storage unit 21 stores the user X and the user Y as targets with high degrees of interest for the user W. The interest information storage unit 21 stores the article P1 in the stock management area of the store P and the user Z as attributes with high degrees of interest for the user X. The interest information storage unit 21 stores the desk of the user Y in the management office and the user W as attributes with high degrees of interest for the user Y. The interest information storage unit 21 stores the desk of the user Z in the store staff room and the user X as attributes with high degrees of interest for the user Z.

The owner, or the like, of the building 2 grasps traffic lines of the persons who engage in operation, operating effectiveness of the persons who engage in operation, a situation of intercommunication between the persons who engage in operation, and the like, with reference to the interest degree map generated by the visualization processing unit 27 through the operation display unit 28. The owner, or the like, of the building 2 considers the layout that further improves the work environment of the persons who engage in operation on the basis of the situation grasped by the interest degree map in this manner.

The owner, or the like, of the building 2 uses simulation by the simulation system 50 to consider the layout. The owner, or the like, of the building 2 sets the simulation conditions through, for example, the operation display unit 28, or the like. The owner, or the like, of the building 2 edits the layout of the fourth floor of the building 2 as illustrated in, for example, FIG. 17B as the simulation conditions. Note that in this example, the first floor, the second floor and the third floor that are store floors are excluded from the targets of the simulation.

In the edited layout of the fourth floor in this example, the stock management area including the article P1 of the store P is arranged at a location on the store staff room side in the stockroom. In the edited layout, a wall of the passage is removed so as to enable comings and goings between the management office and the store staff room. In the edited layout, the desk of the user X is arranged so as to be closer to the stock management area including the article P1 of the store P for which the degree of interest is high. In the edited layout, the desk of the user W is arranged so as to be closer to the desk of the user X for which the degree of interest is high. In the edited layout, the desk of the user Y is arranged so as to be closer to the desk of the user W for which the degree of interest is high. In the edited layout, the desk of the user Z is arranged so as to be closer to the desk of the user X for which the degree of interest is high. Note that in the edited layout, an interval set in a range that allows dialogue between users with high degrees of interest with respect to each other is provided between the desks of the users. This can avoid congestion of users without inhibiting dialogue between the users.

The simulation processing unit 29 performs simulation across a plurality of floors in a similar manner to the simulation performed for users on the store floor. The simulation processing unit 29 sets users that become targets of the simulation. For example, the simulation processing unit 29 sets a plurality of users including the user W, the user X, the user Y and the user Z as the targets of the simulation. The simulation processing unit 29 sets an attribute with a high degree of interest within the building 2 for each of the users who are the targets of the simulation. The simulation processing unit 29 generates behavior information on the fourth floor in a simulated manner for each of the users who are the targets of the simulation. The simulation processing unit 29 simulates, for example, a period during which a user stays at each location such as a desk, and the like, in accordance with frequency distribution acquired on the basis of, for example, the behavior information of the user. The simulation processing unit 29 performs simulation, for example, so that in a case where an attribute for which the degree of interest of the user is high is another user, the user moves to a range where the user can have a dialogue with the other user. The simulation processing unit 29 generates interest information in a simulated manner in a similar manner to the processing in the interest information acquisition unit 20 for each of the users who are the targets of the simulation on the basis of the behavior information generated in a simulated manner.

In this example, a period for movement within the office floor can be reduced by arranging the stock management area where an article for which the degree of interest is high and a desk of a user who performs work there closer to each other. A period for movement for the purpose of dialogue can be reduced by arranging desks of users for whom the degrees of interest are high with respect to each other in a concentrated manner. A period for movement for the purpose of dialogue can be reduced by removing the wall of the passage. An effect that improves operation efficiency by these changes is simulated by the simulation system 50.

Note that the interest degree measurement system 1 may be used in attendance management, or the like, of persons who engage in operation in the building 2. In this event, the interest degree measurement system 1 includes an attendance management unit (not illustrated). For example, the attendance management unit of the interest degree measurement system 1 judges a date on which a user who is a person engaging in operation utilizes one of the ascending/descending facilities as a work day of the user. Further, the attendance management unit of the interest degree measurement system 1 judges a first time point at which the user arrives on the fourth floor by utilizing the ascending/descending facility on the work day as a start time point of the user on the work day. Further, the attendance management unit of the interest degree measurement system 1 judges the last time point at which the user departs from the fourth floor by utilizing the ascending/descending facility on the work day as a finish time point of the user on the work day. The attendance management unit of the interest degree measurement system 1 performs processing of these kinds of judgement on the basis of, for example, the behavior information stored in the behavior information storage unit 16.

Subsequently, an example of operation of the interest degree measurement system 1 will be described using FIG. 18 to FIG. 21.

FIG. 18, FIG. 19, FIG. 20A and FIG. 20B, and FIG. 21 are flowcharts indicating examples of operation of the interest degree measurement system 1 according to Embodiment 1.

Figure 18:
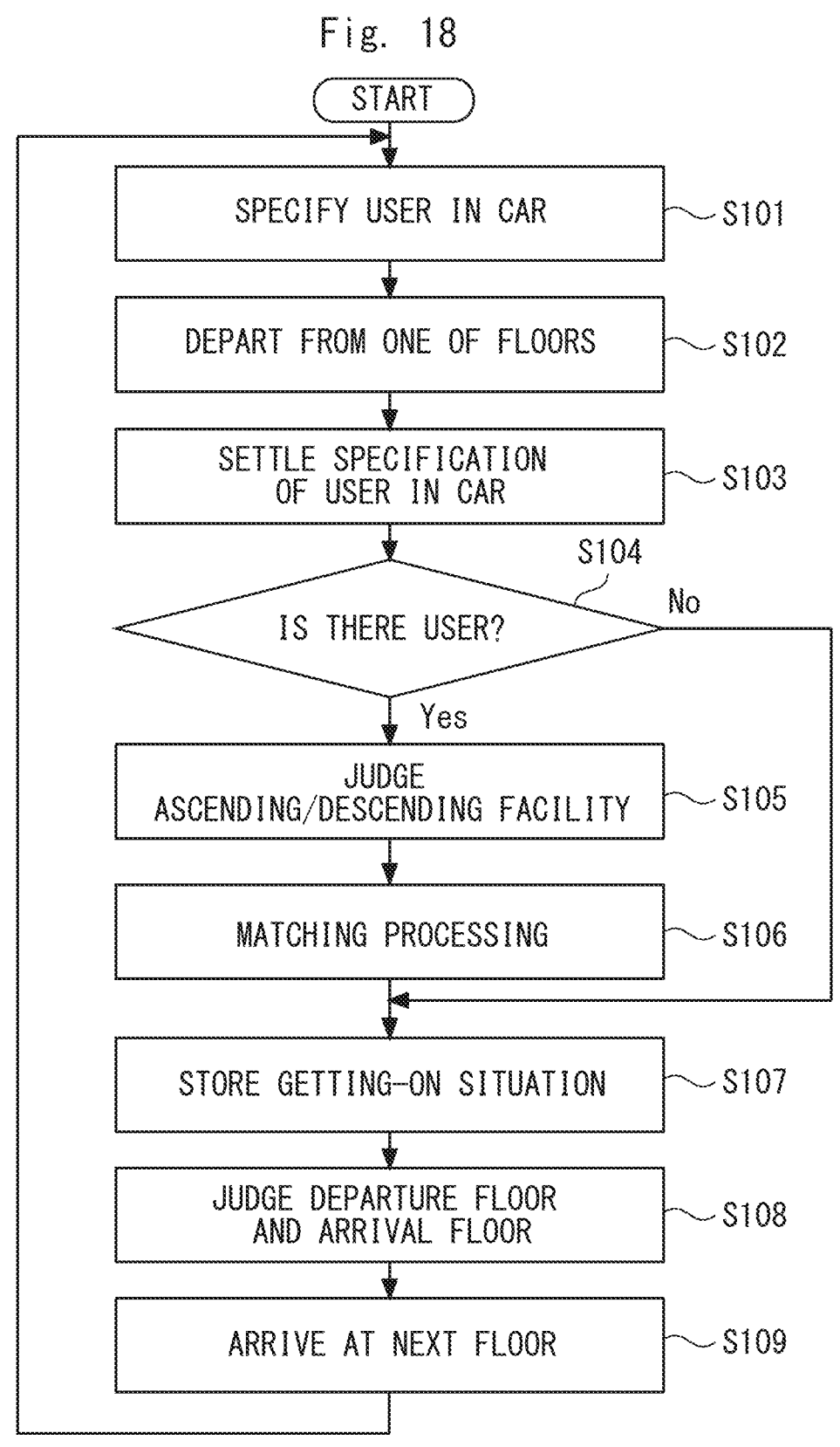
FIG. 18 is a flowchart indicating examples of operation of the interest degree measurement system according to Embodiment 1.

FIG. 18 illustrates an example of the operation of the interest degree measurement system 1 related to judgement of the arrival floor, and the like, when the user utilizes the elevator 3.

In step S101, the user specification unit 14 specifies the user who enters the car 7 when a door of the car 7 of the elevator 3 is open. Then, the operation of the interest degree measurement system 1 proceeds to step S102.

In step S102, when the car 7 of the elevator 3 departs from one of the floors, the processing of the interest degree measurement system 1 starts. Here, the car 7 departs from one of the floors, for example, when the door of the car 7 closes on the floor. Then, the operation of the interest degree measurement system 1 proceeds to step S103.

In step S103, the user specification unit 14 settles specification of the user who is inside the car 7 of the elevator 3. Then, the operation of the interest degree measurement system 1 proceeds to step S104.

In step S104, the user specification unit 14 judges whether or not there is a user who is inside the car 7. In a case where the judgement result is Yes, the operation of the interest degree measurement system 1 proceeds to step S105. In a case where the judgement result is No, the user specification unit 14 judges that no user is inside the car 7, and the operation of the interest degree measurement system 1 proceeds to step S107.

In step S105, the ascending/descending facility judgement unit 17 judges that the ascending/descending facility to be utilized is the elevator 3 for the user specified by the user specification unit 14 in the car 7 of the elevator 3. Then, the operation of the interest degree measurement system 1 proceeds to step S106.

In step S106, the matching processing unit 18 performs matching processing on the user specified by the user specification unit 14. Then, the operation of the interest degree measurement system 1 proceeds to step S107.

In step S107, the floor judgement unit 19 stores a passenger state of the car 7 of the elevator 3 on the basis of the result of specification by the user specification unit 14. The passenger state of the car 7 includes, for example, whether or not the user is in the car 7, information to identify the user in a case where the user is in the car 7, and the like. Then, the operation of the interest degree measurement system 1 proceeds to step S108.

In step S108, the floor judgement unit 19 judges the departure floor and the arrival floor of the user on the basis of the passenger state stored in step S107 and the passenger state stored at the last minute. Then, the operation of the interest degree measurement system 1 proceeds to step S109.

In step S109, after the car 7 of the elevator 3 stops on one of the floors, the operation of the interest degree measurement system 1 proceeds to step S101.

Figure 19:
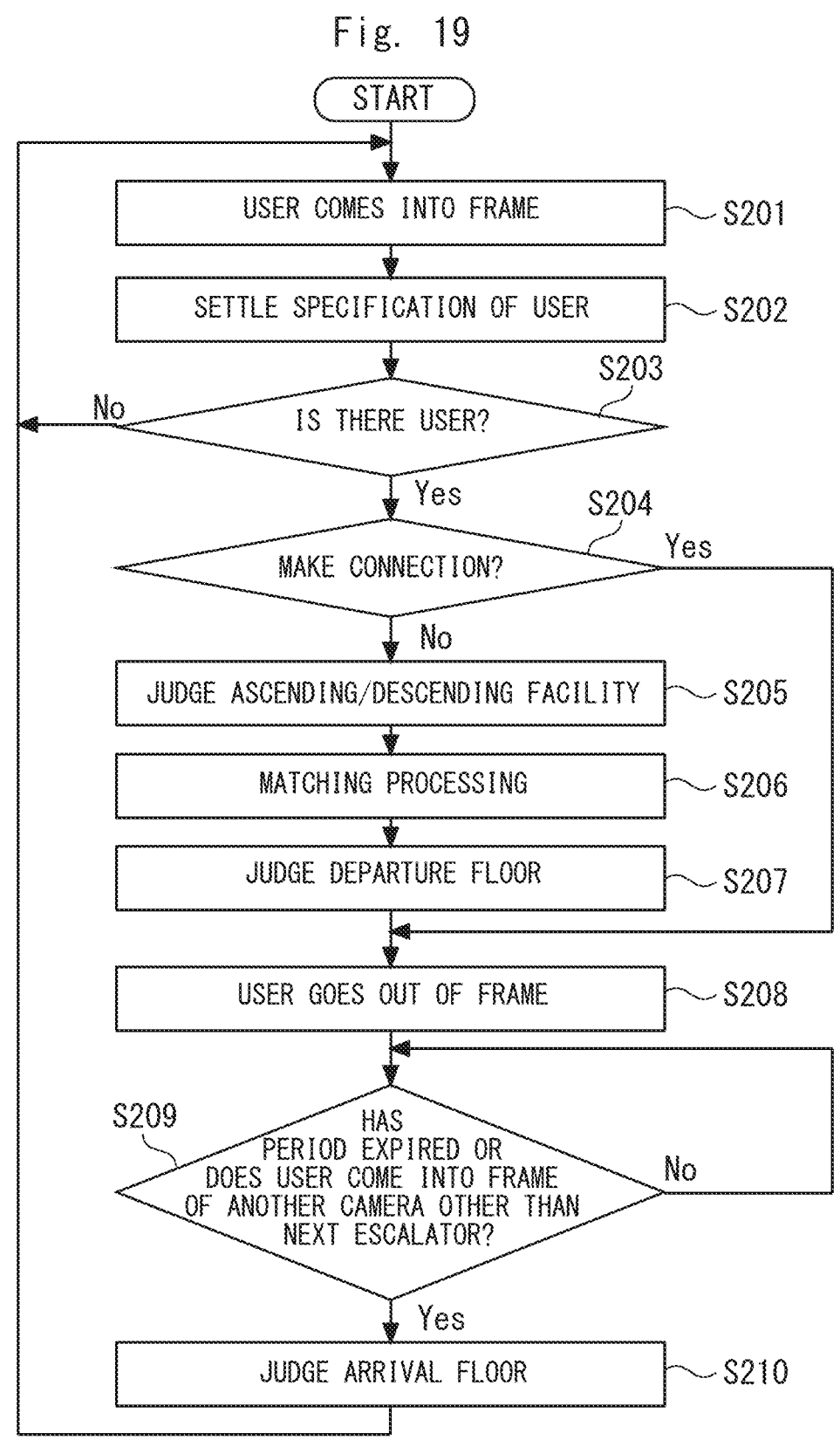
FIG. 19 is a flowchart indicating examples of operation of the interest degree measurement system according to Embodiment 1.

FIG. 19 illustrates an example of operation of the interest degree measurement system 1 related to judgement of the arrival floor, and the like, when the user utilizes the escalator 4.

In step S201, when the user comes into a frame of the camera 12 provided at the exit of one of the escalators 4, the processing of the interest degree measurement system 1 starts. Then, the operation of the interest degree measurement system 1 proceeds to step S202.

In step S202, the user specification unit 14 specifies a user who is on the escalator 4 and settles specification of the user. Then, the operation of the interest degree measurement system 1 proceeds to step S203.

In step S203, the user specification unit 14 judges whether there is a user who is on the escalator 4. In a case where the judgement result is Yes, the operation of the interest degree measurement system 1 proceeds to step S204. In a case where the judgement result is No, the operation of the interest degree measurement system 1 proceeds to step S201.

In step S204, the floor judgement unit 19 judges whether the specified user is a user who has transferred the escalator 4. In a case where a preset period has not elapsed since the user had gone out of the frame of the camera 12 provided at an exit of another elevator 3, the floor judgement unit 19 judges that the user is a user who has transferred the escalator 4. In a case where the judgement result is No, the operation of the interest degree measurement system 1 proceeds to step S205. In a case where the judgement result is Yes, the operation of the interest degree measurement system 1 proceeds to step S208.

In step S205, the ascending/descending facility judgement unit 17 judges that the ascending/descending facility to be utilized is the escalator 4 for the user specified at the escalator 4 by the user specification unit 14. Then, the operation of the interest degree measurement system 1 proceeds to step S206.

In step S206, the matching processing unit 18 performs matching processing on the user specified by the user specification unit 14. Then, the operation of the interest degree measurement system 1 proceeds to step S207.

In step S207, the floor judgement unit 19 judges the floor on which the entrance of the escalator 4 is provided as the departure floor of the user. Then, the operation of the interest degree measurement system 1 proceeds to step S208.

In step S208, when the user goes out of the frame of the camera 12 provided at the exit of the escalator 4, the floor judgement unit 19 starts counting of a period from when the user goes out of the frame. Then, the operation of the interest degree measurement system 1 proceeds to step S209.

In step S209, the floor judgement unit 19 judges whether a period has expired, that is, whether the user does not come into a frame of the camera 12 of the next escalator 4 after the user has gone out of the frame, and a preset period has elapsed. In a case where the judgement result is No, the operation of the interest degree measurement system 1 proceeds to step S209 again. On the other hand, in a case where the judgement result is Yes, the operation of the interest degree measurement system 1 proceeds to step S210. Note that in a case where the user comes into a frame of the camera 12 on other floors on which the user gets off the escalator 4 other than the next escalator 4 before the period has expired, the operation of the interest degree measurement system 1 may proceed to step S210.

In step S210, the floor judgement unit 19 judges the floor on which the exit of the escalator 4 is provided as the arrival floor of the user. Then, the operation of the interest degree measurement system 1 proceeds to step S201.

Note that also in a case where the user utilizes the stairs 5, the interest degree measurement system 1 judges the arrival floor, and the like, through similar processing.

FIG. 20 illustrate an example of the operation of the interest degree measurement system 1 related to acquisition, and the like, of the behavior information and the interest information on the arrival floor of the user.

Figure 20A:
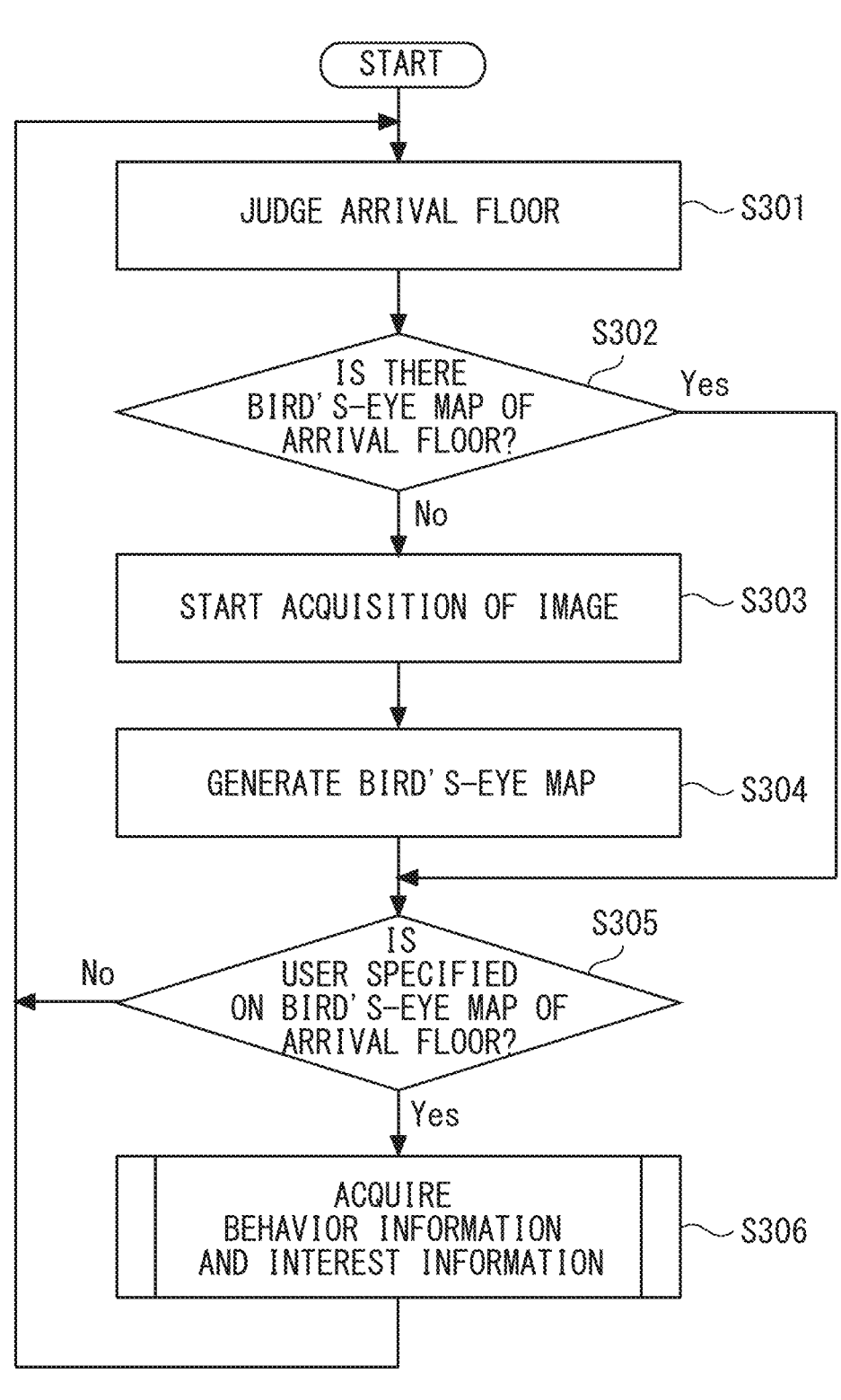
FIG. 20A is a flowchart indicating examples of operation of the interest degree measurement system according to Embodiment 1.

In step S301 in FIG. 20A, when the arrival floor of the user is judged, the processing of the interest degree measurement system 1 starts. Then, the operation of the interest degree measurement system 1 proceeds to step S302.

In step S302, the user specification unit 14 judges whether there is a bird's-eye map of the arrival floor. In a case where the judgement result is No, the operation of the interest degree measurement system 1 proceeds to step S303. In a case where the judgement result is Yes, the operation of the interest degree measurement system 1 proceeds to step S305.

In step S303, the behavior information acquisition unit 15 starts acquisition of images from the cameras 12 provided on the arrival floor. Then, the operation of the interest degree measurement system 1 proceeds to step S304.

In step S304, the behavior information acquisition unit 15 generates a bird's-eye map from the acquired images. Then, the operation of the interest degree measurement system 1 proceeds to step S305.

In step S305, the user specification unit 14 judges whether the user who has arrived on the arrival floor can be specified on the bird's-eye map. In a case where the judgement result is No, the operation of the interest degree measurement system 1 proceeds to step S301. In a case where the judgement result is Yes, the operation of the interest degree measurement system 1 proceeds to step S306.

In step S306, the interest degree measurement system 1 acquires the behavior information and the interest information for the user specified in step S305. Here, in a case where a plurality of users are specified in step S305, the interest degree measurement system 1 may acquire the behavior information and the interest information in parallel for the plurality of users. Then, the operation of the interest degree measurement system 1 proceeds to step S301.

Figure 20B:
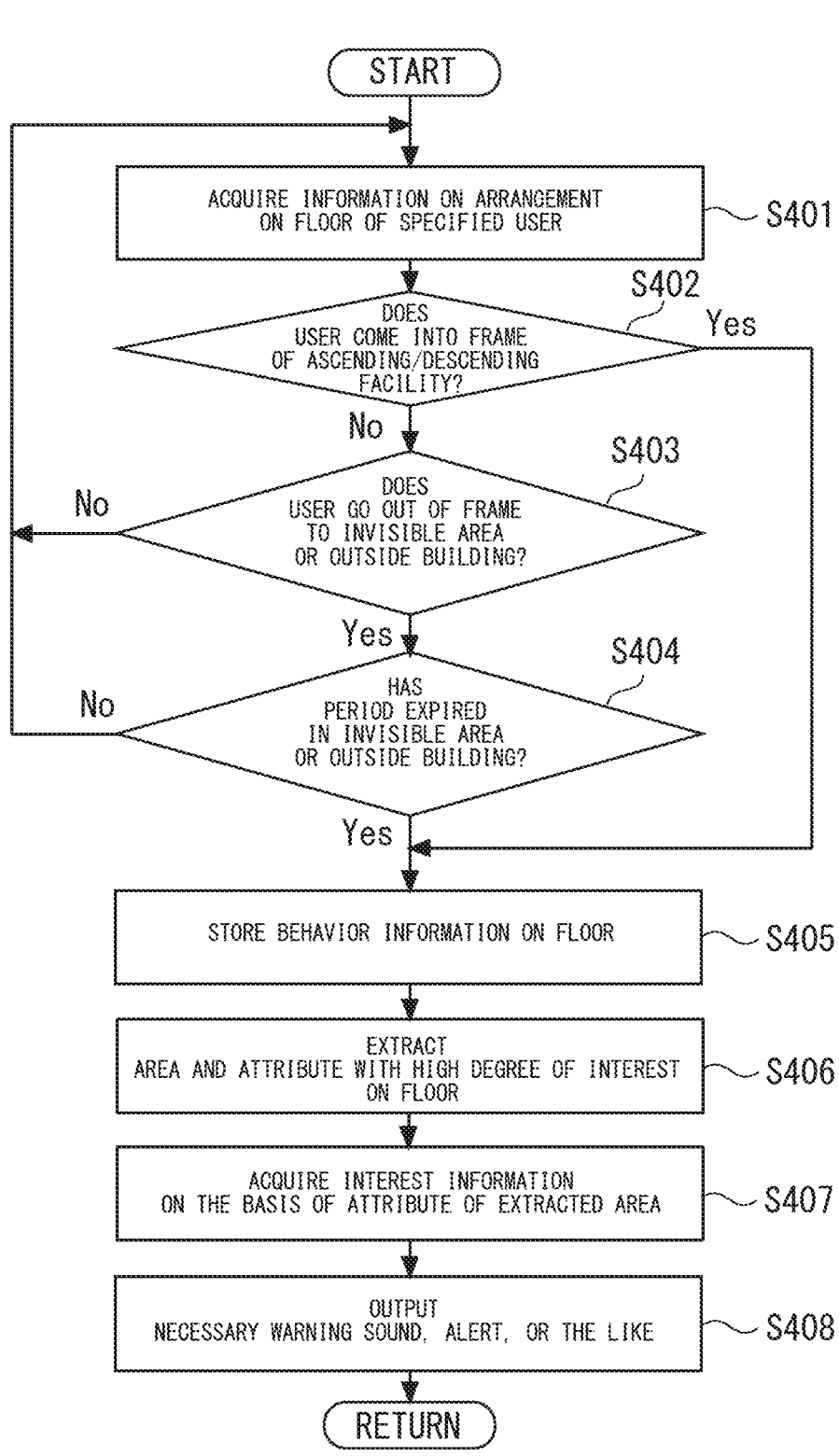
FIG. 20B is a flowchart indicating examples of operation of the interest degree measurement system according to Embodiment 1.

FIG. 20B illustrates an example of content of the processing in step S306 in FIG. 20A.

In step S401, the behavior information acquisition unit 15 acquires information on layout of the specified user position. In this example, the behavior information acquisition unit 15 acquires information on coordinates of three feature amounts of at least both shoulders and the nose of the user. The behavior information acquisition unit 15 may acquire information on coordinates of other feature amounts of the user. Then, the operation of the interest degree measurement system 1 proceeds to step S402.

In step S402, the behavior information acquisition unit 15 judges whether the user comes into the frame of the ascending/descending facility. Note that when the user comes into the frame of the ascending/descending facility, the user goes out of a frame on the floor on which the user is located. In a case where the judgement result is No, the operation of the interest degree measurement system 1 proceeds to step S403. In a case where the judgement result is Yes, the operation of the interest degree measurement system 1 proceeds to step S405.

In step S403, the behavior information acquisition unit 15 judges whether the user goes out of the frame to the invisible area or to outside from an entrance of the building 2. In a case where the judgement result is No, the operation of the interest degree measurement system 1 proceeds to step S401. In a case where the judgement result is Yes, the operation of the interest degree measurement system 1 proceeds to step S404.

In step S404, the behavior information acquisition unit 15 judges whether a period has expired, that is, whether a preset period has elapsed since the user had gone out of the frame to the invisible area or to outside from the entrance of the building 2. In a case where the judgement result is No, the operation of the interest degree measurement system 1 proceeds to step S401. In a case where the judgement result is Yes, the operation of the interest degree measurement system 1 proceeds to step S405.

In step S405, the behavior information acquisition unit 15 completes acquisition of the behavior information. The behavior information storage unit 16 stores the acquired behavior information for each user as time-series data. Then, the operation of the interest degree measurement system 1 proceeds to step S406.

In step S406, the interest information acquisition unit 20 extracts an area for which the user has a high degree of interest on the basis of the behavior information of the user. Then, the operation of the interest degree measurement system 1 proceeds to step S407.

In step S407, the interest information acquisition unit 20 refers to an attribute of the area for which the user has a high degree of interest from the attribute storage unit 13. The interest information acquisition unit 20 acquires the interest information on the basis of information on the degree of interest of the user and the referred attribute. The interest information storage unit 21 stores the acquired interest information for each user. In this event, the interest information storage unit 21 may update the interest information for each user with the acquired interest information. Then, the operation of the interest degree measurement system 1 proceeds to step S408.

In step S408, the interest degree measurement system 1 outputs warning sound, an alert, or the like, as necessary. The warning sound, alert, or the like, is output, for example, in a case where mismatch occurs between an event in which the user comes into a frame and an event in which the user goes out of a frame. A case where mismatch occurs between an event in which the user comes into a frame and an event in which the user goes out of a frame includes, for example, a case where the user who comes into a frame is not judged to go out of the frame, a case where the user who does not come into a frame is judged to go out of the frame, and the like. In a case where it is not necessary to output warning sound, an alert, or the like, the processing in step S408 may be skipped. Then, the operation of the interest degree measurement system 1 related to acquisition of the behavior information and the interest information for each user ends.

Figure 21:
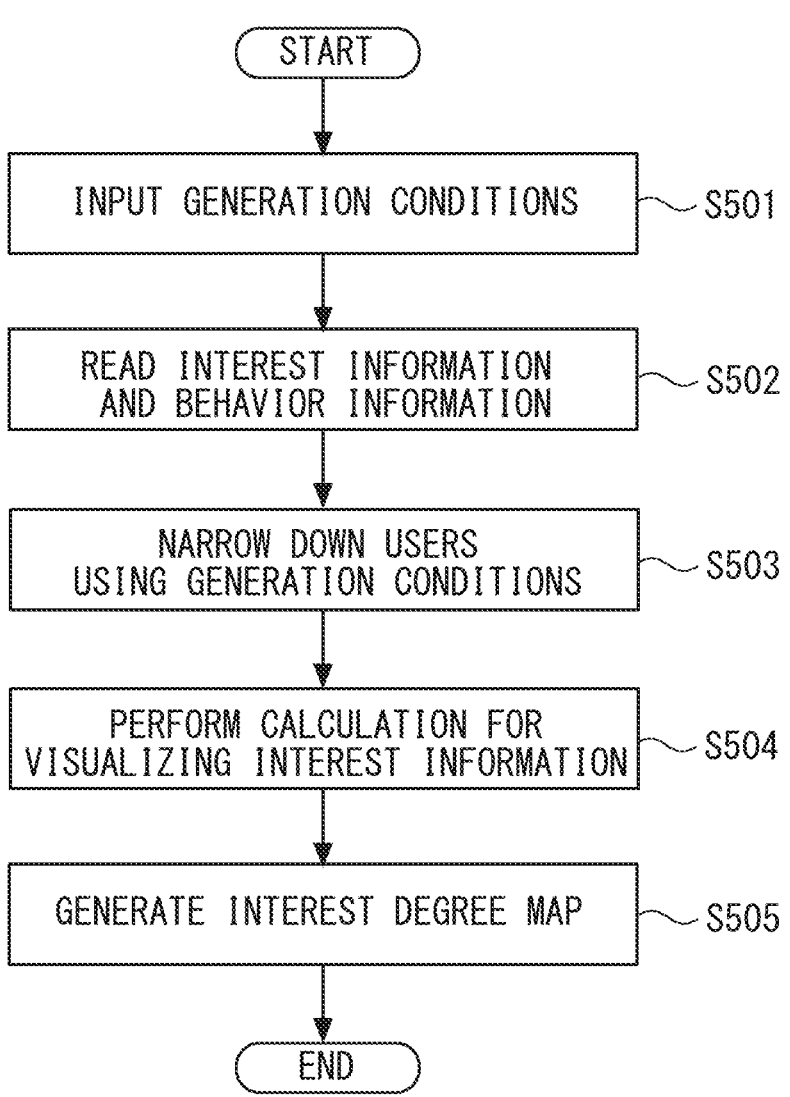
FIG. 21 is a flowchart indicating examples of operation of the interest degree measurement system according to Embodiment 1.

FIG. 21 indicates an example of operation of the interest degree measurement system 1 related to visualization of interest of the user, which has already been measured.

In step S501, the visualization processing unit 27 accepts input of generation conditions of the interest degree map, for example, through the operation display unit 28, or the like. Then, the operation of the interest degree measurement system 1 proceeds to step S502.

In step S502, the visualization processing unit 27 reads the interest information and the behavior information from the interest information storage unit 21 and the behavior information storage unit 16 for the users of the building 2 at a time point designated in the generation conditions. Then, the operation of the interest degree measurement system 1 proceeds to step S503.

In step S503, the visualization processing unit 27 narrows down the users for whom the interest information and the behavior information are read on the basis of conditions designated in the generation conditions. Then, the operation of the interest degree measurement system 1 proceeds to step S504.

In step S504, the visualization processing unit 27 performs calculation for visualizing the interest information on the basis of the interest information and the behavior information of the users narrowed down on the basis of the generation conditions. The calculation for visualization includes, for example, calculation for digitalization for visualizing the interest information with a graph, and the like. The calculation includes, for example, calculation of tallying up levels of interest for a plurality of users for each location, and the like. Then, the operation of the interest degree measurement system 1 proceeds to step S505.

In step S505, the visualization processing unit 27 generates the interest degree map using a result of the calculation for visualization. Processing of generating the interest degree map includes, for example, processing of superimposing a graph representing the interest information and the bird's-eye map, and the like. Then, the operation of the interest degree measurement system 1 ends.

Subsequently, an example of operation of the simulation system 50 related to simulation of behavior and interest of the users under conditions that are not existing conditions will be described using FIG. 22.

Figure 22:
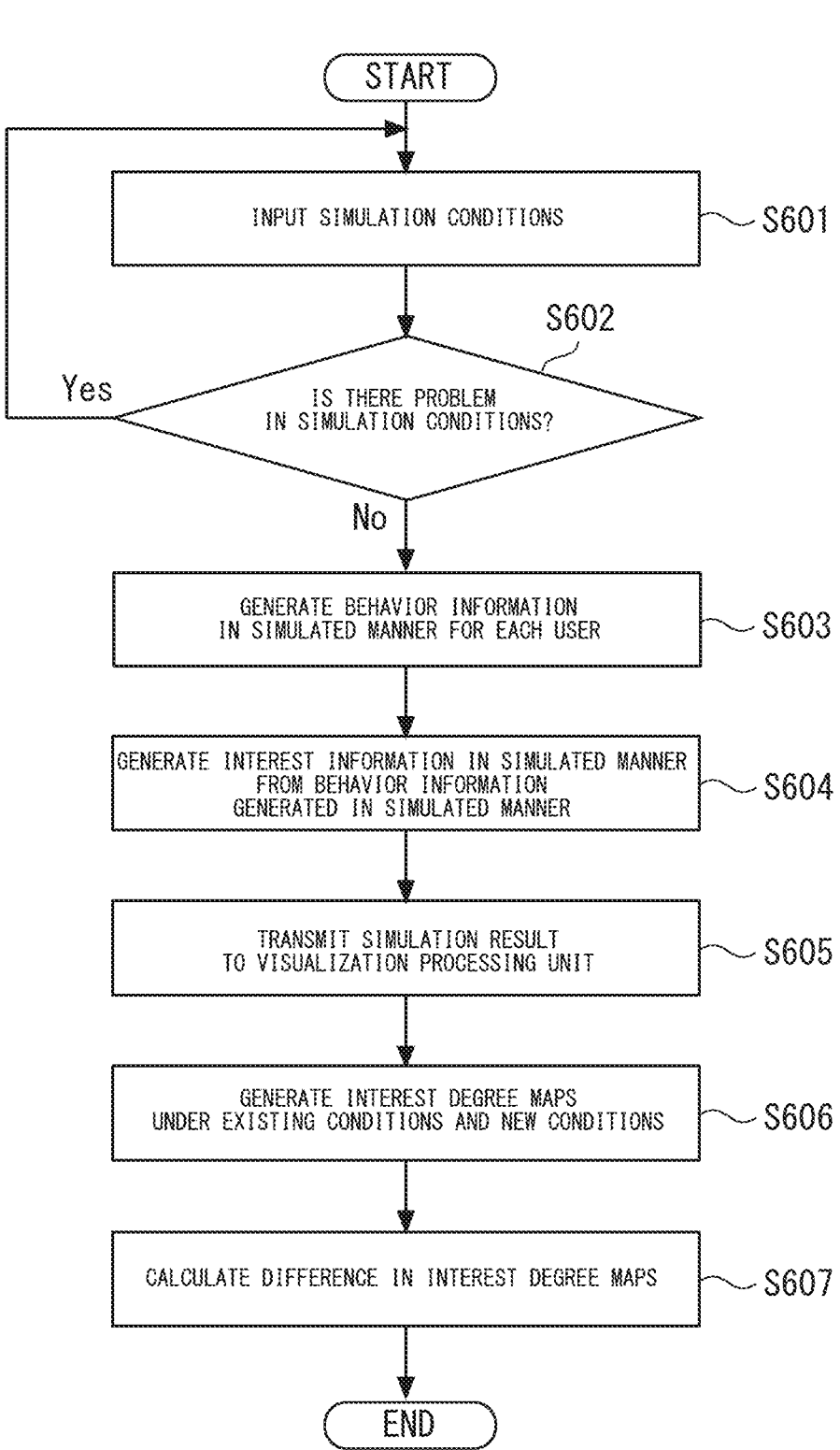
FIG. 22 is a flowchart indicating an example of the operation of the simulation system according to Embodiment 1.

FIG. 22 is a flowchart indicating an example of the operation of the simulation system 50 according to Embodiment 1. The processing in FIG. 22 is started, for example, after the processing in FIG. 21 is performed.

In step S601, the simulation processing unit 29 accepts input of simulation conditions, for example, through the operation display unit 28, or the like. In input of the simulation conditions, for example, existing conditions in FIG. 21 are used. Further, new conditions different from the conditions in FIG. 21 are input. By this means, a difference of the input of the simulation conditions becomes clear. Then, the operation of the simulation system 50 proceeds to step S602.

In step S602, the simulation processing unit 29 reads the interest information and the behavior information from the interest information storage unit 21 and the behavior information storage unit 16, for example, in a similar manner to the conditions in FIG. 21 in accordance with the input simulation conditions. Further, the new conditions different from the conditions in FIG. 21 include arrangement modification, change, addition, deletion, and the like, of panels, entrances/exits on the migration path, and the like, that guide, for example, a location of a destination, behavior, or the like. Further, the new conditions different from the conditions in FIG. 21 similarly include, for example, rearrangement of stores, inner walls, and the like. By the rearrangement, accompanying areas and attributes thereof also move together. In this event, the rearrangement is not limited to movement for each store and may be movement of an area of part of the store and an attribute thereof. For example, in a case where a virtual user is added, it is confirmed that one or more pieces of interest information of the user, attributes thereof, a time point at which the user enters the entrance, and the like, are designated. Users who become targets of simulation may be, for example, narrowed down to users who directly or indirectly satisfy certain conditions. Here, the simulation processing unit 29 judges that there is no problem in the conditions input in step S601 to perform simulation. In a case where there is a problem in the simulation conditions, the operation of the simulation system 50 proceeds to step S601 to reset the conditions. On the other hand, in a case where there is no problem in the simulation conditions, the simulation system 50 settles the input conditions, and the operation proceeds to step S603.

In step S603, the simulation processing unit 29 generates behavior information in the building 2 in a simulated manner for each of the users. Then, the operation of the simulation system 50 proceeds to step S604.

In step S604, the simulation processing unit 29 generates interest information in a simulated manner for each of the users for whom the behavior information is generated in a simulated manner. Then, the operation of the simulation system 50 proceeds to step S605.

In step S605, the simulation processing unit 29 transmits a result of simulation to the visualization processing unit 27 on the basis of the behavior information and the interest information generated in a simulated manner. Then, the operation of the simulation system 50 proceeds to step S606.

In step S606, the visualization processing unit 27 generates two interest degree maps under existing conditions and new conditions using a result of calculation using the existing conditions and a result of calculation using the new conditions different from the conditions in FIG. 21 by the simulation processing unit 29. The processing of generating the interest degree maps includes, for example, processing of superimposing a graph representing the interest information and the bird's-eye map, and the like. Then, the visualization processing unit 27 transmits the two interest degree maps under the existing conditions and the new conditions to the simulation processing unit 29. Then, the operation of the simulation system 50 proceeds to step S607.

In step S607, the simulation processing unit 29 calculates a difference between the two interest degree maps under the existing conditions and the new conditions and transmits the difference to the visualization processing unit 27 again. This visualizes a difference between part or all of the interest degree maps under the existing conditions and the new conditions. Thereafter, the operation of the simulation system 50 ends.

Note that while visualization of the two interest degree maps under the existing conditions and the new conditions and a difference thereof have been described so far as an example, the simulation processing unit 29 can calculate a plurality of interest degree maps and a difference thereof as well as the two interest degree maps and the difference thereof. Thus, optimal conditions can be derived by considering various new conditions.

Further, the simulation processing unit 29 automatically calculates a tenant fee in the new conditions in accordance with market price on the basis of the interest degree map that is a simulation result under the new conditions. Here, the tenant fee in the new conditions is a tenant fee, or the like, of each tenant existing in the new conditions. The calculated tenant fee is, for example, used to consider optimal conditions among various new conditions.

As described above, the interest degree measurement system 1 according to Embodiment 1 includes the attribute storage unit 13, the user specification unit 14, the floor judgement unit 19, the behavior information acquisition unit 15, the interest information acquisition unit 20, the interest information storage unit 21, and the visualization processing unit 27. The attribute storage unit 13 stores attributes for each area for each floor of the building 2. The user specification unit 14 specifies the user in the building 2 on the basis of the image or images captured by at least one of the cameras 12 provided in the building 2. When the specified user moves from the departure floor to the arrival floor by utilizing one of the ascending/descending facilities, the floor judgement unit 19 judges the arrival floor of the user on the basis of the image or images captured by one of the cameras 12 including at least the camera 12 inside the car 7 of the elevator 3, the camera 12 on the floor on which the user gets off the escalator 4, and the camera 12 on the floor on which the user finishes utilization of the stairs 5. The behavior information acquisition unit 15 acquires behavior information representing behavior of the user on the judged arrival floor for the specified user on the basis of the image or images captured by at least one of the cameras 12. The interest information acquisition unit 20 acquires interest information representing a degree of interest of the user for each attribute on the basis of a relationship between layout of areas and attributes of the areas on the judged arrival floor and the behavior information for the specified user. The interest information storage unit 21 stores the interest information acquired by the interest information acquisition unit 20 for each user, including information on a time point and a location. The visualization processing unit 27 generates the interest degree map by visualizing distribution of degrees of interest of the users of the building 2 on at least one of the floors using the information stored in the interest information storage unit 21.

According to such a configuration, specification of the user, judgement of the arrival floor and acquisition of the behavior information are performed on the basis of the images captured by the cameras 12 provided in the building 2, so that behavior information on the arrival floor is acquired also for users who do not operate equipment of the ascending/descending facilities. Further, the interest information is acquired on the basis of the behavior information of the user. Thus, even for a user of the building 2 who does not possess mobile equipment registered in advance, interest information is acquired as information on interest of the user. Further, even for a user who does not operate equipment of the ascending/descending facility, interest information is acquired in a similar manner. Further, in the building 2 in which the elevator 3, the escalator 4 and the stairs 5 coexist, the interest degree measurement system 1 manages history of getting on and getting off the ascending/descending facilities by integrating the elevator 3, the escalator 4 and the stairs 5 as the ascending/descending facilities, so that interest information of the users is more reliably acquired. Further, the interest degree measurement system 1 manages history of getting on and getting off the ascending/descending facilities, so that interest information can be acquired across a plurality of floors in the building 2. The interest information acquired in this manner is visualized by the interest degree map generated by the visualization processing unit 27, so that the owner, or the like, of the building 2 can obtain a judgement material for improving value of the building 2 or avoiding a risk that an unfavorable event occurs in the building 2.

Further, the visualization processing unit 27 may generate the interest degree map for each user of the building 2.

Still further, the visualization processing unit 27 may generate the interest degree map by integrating the interest information for each user of the building 2.

Yet further, the visualization processing unit 27 may generate the interest degree map including the behavior information for each user of the building 2.

According to such a configuration, the interest degree map is generated in a necessary degree of detail in accordance with the purpose of the owner, or the like, of the building 2. Thus, the owner, or the like, of the building 2 can more efficiently obtain a judgement material for improving value of the building 2 or avoiding a risk in the building 2.

Further, the interest degree measurement system 1 includes a destination presentation unit 22. The destination presentation unit 22 preferentially presents an area with an attribute with a higher degree of interest to the user as the destination when the user specification unit 14 specifies the user who starts utilization of one of the ascending/descending facilities. The destination is presented by the destination presentation unit on the basis of the interest information stored in the interest information storage unit 21 for the user and information on the attributes stored in the attribute storage unit 13. In this event, the visualization processing unit 27 may generate the interest degree map including information on the destination actually presented by the destination presentation unit 22. The information on the destination is displayed in a superimposed manner, for example, on information on trajectories of the users, and the like.

According to such a configuration, the owner, or the like, of the building 2 can grasp influence on interest of the users by the destination presented by the destination presentation unit 22. Thus, the owner, or the like, of the building 2 can more efficiently obtain a judgement material for improving value of the building 2 or avoiding a risk in the building 2.

Further, in a case where a plurality of ascending/descending facilities are provided in the building 2 as one or more ascending/descending facilities, the interest degree measurement system 1 includes an ascending/descending facility judgement unit 17 and a matching processing unit 18. The ascending/descending facility judgement unit 17 judges an ascending/descending facility to be utilized by the user on the basis of an image or images captured by at least one of the cameras 12 when the user specified by the user specification unit 14 starts utilization of one of the ascending/descending facilities. Here, there is a case where the ascending/descending facility judgement unit 17 judges two or more ascending/descending facilities at the same time as facilities to be utilized by the users specified as the same user by the user specification unit 14. In this case, the matching processing unit 18 causes the user specification unit 14 to specify the users who utilize the two or more ascending/descending facilities as users different from each other. When the user specification unit 14 specifies the users as users different from each other, the user specification unit 14 extracts a difference in a feature amount or feature amounts of the users from the acquired images, improves accuracy of specification of the users and resettles specification of the users different from each other.

According to such a configuration, accuracy of specification of the user becomes higher. Thus, guidance of the user is more reliably performed.

Further, the interest degree measurement system 1 includes the call registration unit 23. The call registration unit 23 registers call to the destination floor including the destination presented by the destination presentation unit 22 in the elevator 3 that is the ascending/descending facility.

According to such a configuration, the user can move to the destination without operating the ascending/descending facility. This further improves convenience of the user.

Further, the interest information acquisition unit 20 acquires interest information of the user every time the behavior information acquisition unit 15 completes acquisition of the behavior information of the user on the arrival floor.

According to such a configuration, behavior of the user on the arrival floor is reflected in the interest information in real time. Thus, the interest degree measurement system 1 can perform guidance while quickly reflecting interest of the user.

Note that the interest degree measurement system 1 includes the behavior information storage unit 16. The behavior information storage unit 16 stores the behavior information acquired by the behavior information acquisition unit 15 for each user. In this event, the interest information acquisition unit 20 may read the behavior information for each user from the behavior information storage unit 16 at a preset timing. The interest information acquisition unit 20 acquires interest information of the user on the basis of the read behavior information. Here, the preset timing is, for example, a time point set in advance in hours such as nighttime during which there are few users in the building 2, or the like. Processing of acquiring, or the like, the interest information is performed during hours in which there are few users, so that load of the processing in the interest degree measurement system 1 is temporally dispersed. Further, in a case where the interest information acquisition unit 20 or the interest information storage unit 21 is installed on equipment connected from equipment in the building 2 through a network, the behavior information, and the like, are transmitted to the interest information acquisition unit 20 or the interest information storage unit 21 during hours in which communication load on the network is light. Thus, even in a case where the network has few communication capacity, it is possible to reduce communication load on the network.

Further, in a case where the user possesses a portable information terminal, or the like, having a wireless communication function, or the like, the user specification unit 14 may accessorily utilize identification information, or the like, acquired from the information terminal through wireless communication. The information terminal possessed by the user may be, for example, a smartphone, or the like. For example, an electromagnetic wave from outside is shielded inside the car 7 of the elevator 3. In this event, an electromagnetic wave received inside the car 7 of the elevator 3 is highly likely to be an electromagnetic wave from the information terminal of the user who is inside the car 7. By accessorily utilizing such information, the user specification unit 14 can improve accuracy of specification of the user. In a case where the user possesses an information terminal, the destination presentation unit 22 may present the destination by transmitting information, or the like, to be displayed on the information terminal. In this event, the destination presentation unit 22 may issue information without specifying a receiver through broadcast communication, or the like, of a wireless beacon, for example, provided at the hall, or the like, of the elevator 3.

Further, the simulation system 50 according to Embodiment 1 includes the interest degree measurement system 1 and the simulation processing unit 29. The simulation processing unit 29 accepts input of existing conditions and new conditions and judges that there is no problem to perform simulation.

Further, the simulation processing unit 29 generates behavior information of the users in a simulated manner and also generates the interest information in a simulated manner.

Then, the simulation processing unit 29 transmits results of the behavior information and the interest information generated in a simulated manner to the visualization processing unit 27 and generates two interest degree maps under the existing conditions and the new conditions.

These interest degree maps are transmitted to the visualization processing unit 27. The simulation processing unit 29 calculates a difference and transmits a result of the calculation to the visualization processing unit 27.

In this manner, the two interest degree maps under the existing conditions and the new conditions and a difference thereof can be visualized.

According to such a configuration, even for a user of the building 2 who does not possess mobile equipment registered in advance, change of information on the interest of the user can be simulated by the simulation conditions. This enables the owner, or the like, of the building 2 to consider influence of measures for improving value of the building 2 or avoiding a risk in the building 2 in advance.

Subsequently, an example of a hardware configuration of the interest degree measurement system 1 and the simulation system 50 including the interest degree measurement system 1 will be described using FIG. 23.

Figure 23:
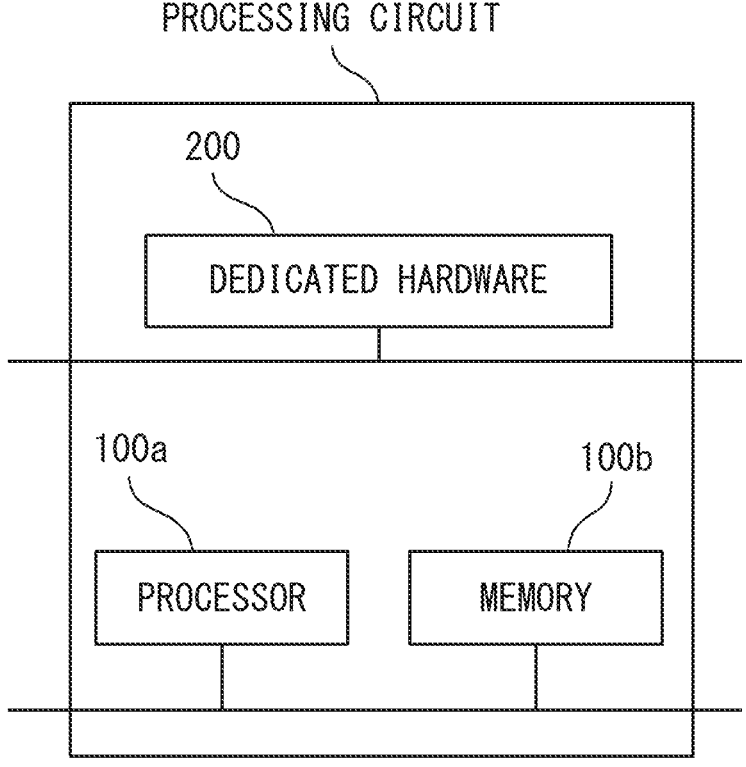
FIG. 23 is a hardware configuration diagram of main portions of the interest degree measurement system and the simulation system according to Embodiment 1.

FIG. 23 is a hardware configuration diagram of main portions of the interest degree measurement system 1 and the simulation system 50 according to Embodiment 1.

Each function of the interest degree measurement system 1 and the simulation system 50 can be implemented by a processing circuit. The processing circuit includes at least one processor 100*a* and at least one memory 100*b*. The processing circuit may include at least one piece of dedicated hardware 200 along with or as a substitute for the processor 100*a* and the memory 100*b*.

In a case where the processing circuit includes the processor 100*a* and the memory 100*b*, each function of the interest degree measurement system 1 and the simulation system 50 is implemented by software, firmware or a combination of the software and the firmware. At least one of the software or the firmware is described as a program. The program is stored in the memory 100*b*. The processor 100*a* implements each function of the interest degree measurement system 1 and the simulation system 50 by reading out and executing the program stored in the memory 100*b*.

The processor 100*a* will be also referred to as a central processing unit (CPU), a processing device, an arithmetic device, a microprocessor, a microcomputer or a DSP. The memory 100*b* is constituted with, for example, a non-volatile or volatile semiconductor memory such as a RAM, a ROM, a flash memory, an EPROM and an EEPROM. Here, the processor 100*a* and the memory 100*b* may be separated or does not have to be separated. For example, the processor 100*a* may include the memory 100*b*. Further, a device in which the processor 100*a* and the memory 100*b* are merged may be used.

In a case where the processing circuit includes the dedicated hardware 200, the processing circuit is implemented with, for example, a single circuit, a composite circuit, a programmed processor, a parallel programmed processor, an ASIC, an FPGA, a combination thereof or a circuit capable of performing processing equivalent to this.

Respective functions of the interest degree measurement system 1 and the simulation system 50 can be implemented by respective processing circuits. Alternatively, the respective functions of the interest degree measurement system 1 and the simulation system 50 can also be collectively implemented by processing circuits. Part of the respective functions of the interest degree measurement system 1 and the simulation system 50 may be implemented by dedicated hardware 200, and the other may be implemented by software or firmware. In this manner, the processing circuits implement the respective functions of the interest degree measurement system 1 and the simulation system 50 by the dedicated hardware 200, the software, the firmware or a combination thereof.

Differences from examples disclosed in other embodiments will be described particularly in detail for each of embodiments which will be described below. For characteristics that are not described in each of the following embodiments, any characteristic in the examples disclosed in other embodiments may be employed.

Embodiment 2

In the interest degree measurement system 1 in this example, guidance is performed in accordance with a level of interest included in the interest information. Information on the destination to be presented by the destination presentation unit 22 as guidance in this event may be included in the interest degree map generated by the visualization processing unit 27.

FIG. 24A to FIG. 24C, and FIG. 25A to FIG. 25B are views illustrating examples of presentation of the destination by the interest degree measurement system 1 according to Embodiment 2.

FIG. 24 illustrate an example of the building 2 to which the interest degree measurement system 1 is to be applied.

Figure 24A:
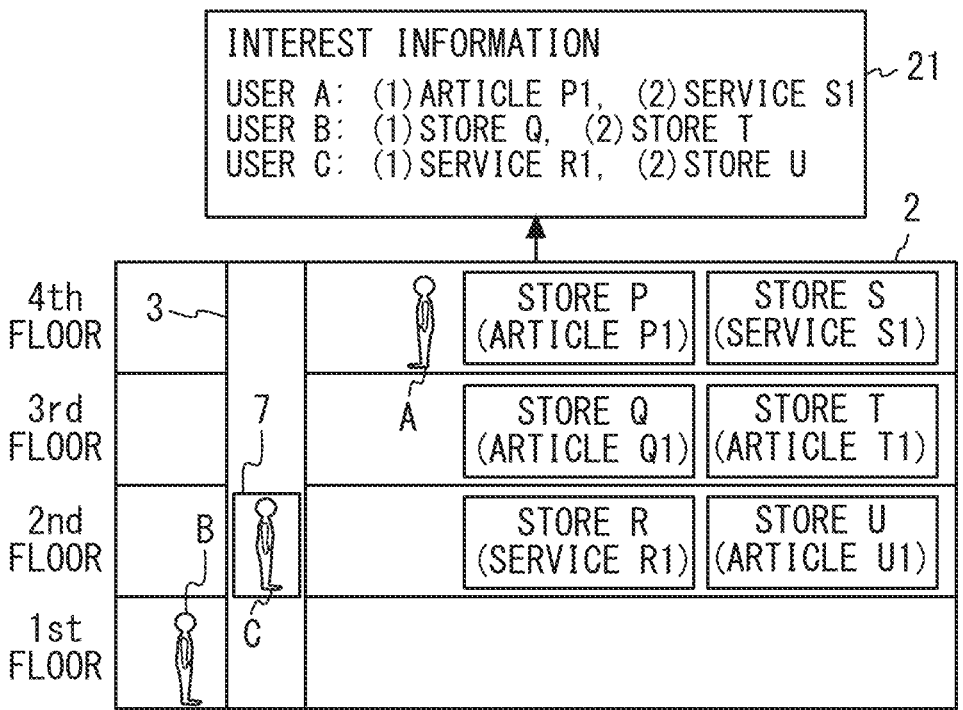
FIG. 24A is a view illustrating examples of presentation of the destination by the interest degree measurement system according to Embodiment 2.

FIG. 24A illustrates the building 2 at a certain date. In this building 2, a store P that deals with an article P1 and a store S that provides a service S1 are open in areas on the fourth floor. Further, a store Q that deals with an article Q1 and a store T that deals with an article T1 are open in areas on the third floor. Still further, a store R that provides a service R1 and a store U that deals with an article U1 are open in areas on the second floor.

Until this date, the interest degree measurement system 1 acquires interest information of the user A, the user B and the user C. The interest information storage unit 21 stores the article P1 as an attribute with the highest degree of interest, and the service S1 as an attribute with the second highest degree of interest for the user A. The interest information storage unit 21 stores the store Q as an attribute with the highest degree of interest and the store T as an attribute with the second highest degree of interest for the user B. The interest information storage unit 21 stores the service R1 as an attribute with the highest degree of interest and the store U as an attribute with the second highest degree of interest for the user C.

Figure 24B:
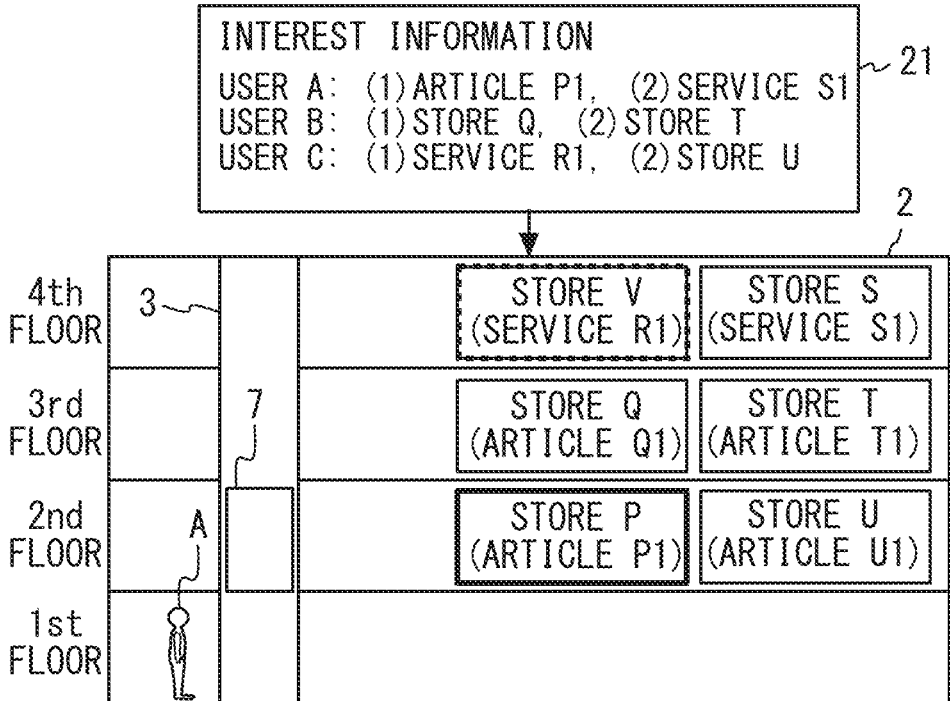
FIG. 24B is a view illustrating examples of presentation of the destination by the interest degree measurement system according to Embodiment 2.

FIG. 24B illustrates the same building 2 at a later date. By this date, the store P that deals with the article P1 has moved to an area on the second floor. Further, the store R has been closed. Still further, a store V that provides the service R1 has been open in an area on the fourth floor.

The user A who utilizes the building 2 again at this date is specified by the user specification unit 14 at the hall of the elevator 3 on the first floor. In this event, the destination presentation unit 22 reads the interest information for the user A from the interest information storage unit 21. The destination presentation unit 22 in this example preferentially presents an area with a higher degree of interest to the user as the destination. Thus, the destination presentation unit 22 acquires the article P1 as the attribute with the highest degree of interest and the service S1 as the attribute with the second highest degree of interest for the user A. The destination presentation unit 22 extracts an area having the article P1 as the attribute from the attribute storage unit 13. In this example, the destination presentation unit 22 extracts the area on the second floor in which the moved store P is open as the destination with the highest priority. Further, the destination presentation unit 22 extracts an area having the service S1 as the attribute from the attribute storage unit 13. In this example, the destination presentation unit 22 extracts the area on the fourth floor in which the store S is open as the destination with the second highest priority. The destination presentation unit 22 presents the extracted areas to the user A as the destination.

Figure 24C:
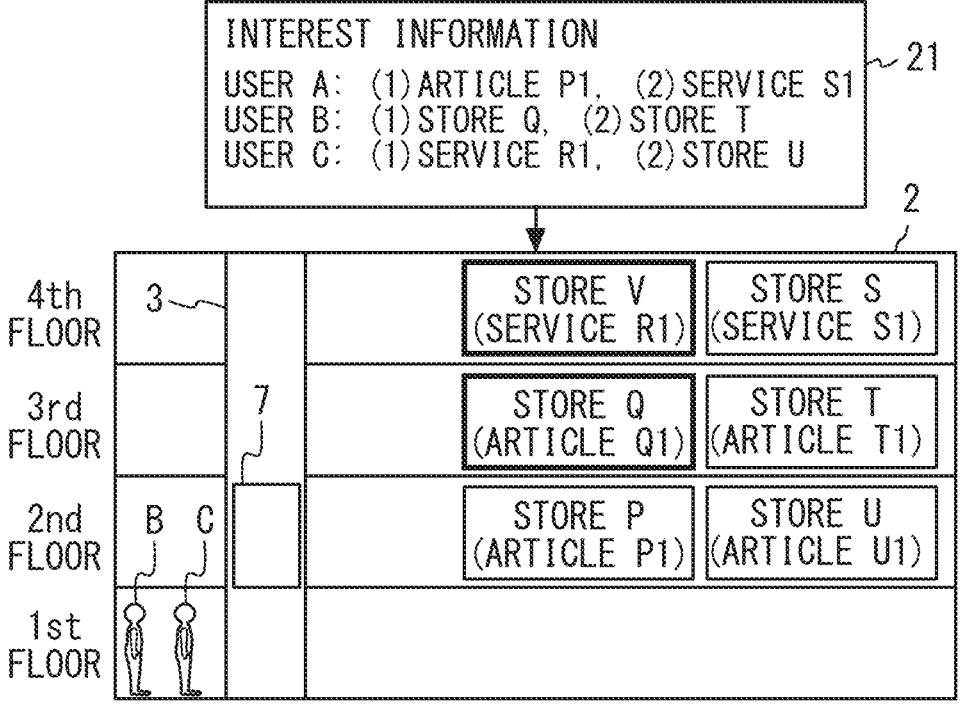
FIG. 24C is a view illustrating examples of presentation of the destination by the interest degree measurement system according to Embodiment 2.

As illustrated in FIG. 24C, the user B and the user C who utilize the building 2 again at the same date are specified by the user specification unit 14 at the hall of the elevator 3 on the first floor. In this event, the destination presentation unit 22 reads the interest information for each of the user B and the user C from the interest information storage unit 21. The destination presentation unit 22 in this example presents areas with the highest degrees of interest for the respective users as destinations when the destination presentation unit 22 presents the destinations to a plurality of users at the same time. Thus, the destination presentation unit 22 acquires the store Q as an attribute with the highest degree of interest for the user B. The destination presentation unit 22 extracts the area of the store Q as the attribute from the attribute storage unit 13. In this example, the destination presentation unit 22 extracts the area on the third floor in which the store Q is open as the destination to be presented to the user B. Further, the destination presentation unit 22 acquires the service R1 as an attribute with the highest degree of interest for the user C. The destination presentation unit 22 extracts the area of the store V that provides the service R1 as the attribute from the attribute storage unit 13. In this example, the destination presentation unit 22 extracts the area on the fourth floor in which the store V is open as the destination to be presented to the user C.

FIG. 25 illustrate an example of presentation of the destinations through the car operating panel 10. In this example, the third floor and the fourth floor are presented to the user B and the user C who get on the car 7 as the destination floors.

Figure 25A:
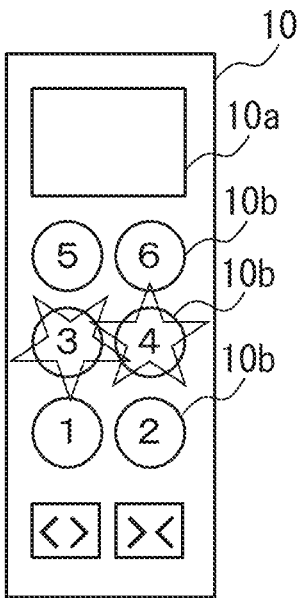
FIG. 25A is a view illustrating examples of presentation of the destination by the interest degree measurement system according to Embodiment 2.

As illustrated in FIG. 25A, the destination presentation unit 22 calls for attention to guidance before the third floor and the fourth floor are registered as the destination floors, to the user B and the user C by causing light emission equipment of the destination buttons 10b corresponding to the third floor and the fourth floor to blink. In this event, the destination presentation unit 22 may display a video such as "the store Q is on the third floor, and the store V that provides the service R1 is on the fourth floor" together on display equipment such as a display panel 10a. Further, the destination presentation unit 22 may cause a built-in speaker of the display equipment such as the display panel 10a to present guidance using a speech together. Here, for example, immediately after call is automatically registered after a preset period has elapsed since presentation by blinking of the light emission equipment had been started, the destination presentation unit 22 ends presentation of guidance of the destination floors by blinking of the light emission equipment of the destination buttons 10b corresponding to the third floor and the fourth floor. Further, for example, immediately after call is registered by the destination buttons 10b being operated, the destination presentation unit 22 ends presentation of guidance of the destination floors by blinking of the light emission equipment of the destination buttons 10b corresponding to the third floor and the fourth floor.

Figure 25B:
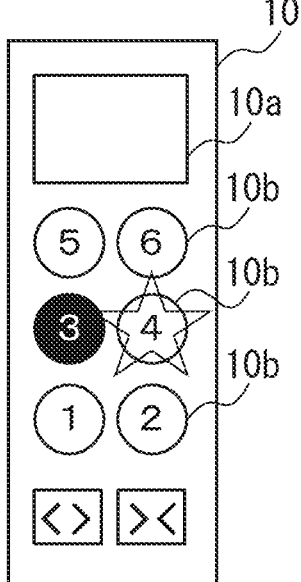
FIG. 25B is a view illustrating examples of presentation of the destination by the interest degree measurement system according to Embodiment 2.

For example, in a case where call is registered by the destination button 10b corresponding to the third floor being operated by the user B, as illustrated in FIG. 25B, the light emission equipment of the destination button 10b corresponding to the floor designated as the destination floor is lighted. Here, for example, in a case where the destination button 10b corresponding to the fourth floor that is the presented destination floor is not operated, the destination presentation unit 22 may continue to present the destination floor by blinking of the light emission equipment of the destination button 10b corresponding to the fourth floor. In this event, after a preset period has elapsed since presentation by blinking of the light emission equipment had been started, the call registration unit 23 automatically registers call in which the fourth floor is set as the destination floor, in the elevator 3 on which the user C gets. Immediately after the call in which the fourth floor is set as the destination floor is automatically registered, the light emission equipment of the destination button 10b corresponding to the fourth floor is lighted.

Here, if the floor to which the user B or the user C desires to go is not the automatically registered destination floor, the user B or the user C can cancel the destination button 10b of the automatically registered destination floor and can register other destination floors. For example, if the destination button 10b corresponding to the third floor is cancelled, the user B and the user C get off the elevator 3 on the fourth floor that is the remaining destination floor. By this means, the user B or the user C can change the floor on which the user B or the user C is to get off the elevator 3 regardless of the degree of interest. In this event, the floors on which the user B and the user C get off the elevator 3 are judged. This enables acquisition of the behavior information and the interest information on the floors on which the user B and the user C get off the elevator 3 for the user B and the user C.

Note that in a case where the destination presentation unit 22 presents a plurality of destinations to the user A, or the like, the destination presentation unit 22 may present destination floors by causing a plurality of destination buttons 10b respectively corresponding to the destination floors such as the second floor and the fourth floor to blink. In this event, the destination presentation unit 22 may cause the destination buttons 10b to adjust blinking, color tone or brightness of the light emission equipment, speed of change thereof, or the like, in accordance with priority of the destinations.

Here, for example, in a case where no destination floor is designated until a preset period has elapsed since presentation by blinking of the light emission equipment had been started, the call registration unit 23 automatically registers the call in which the second floor presented as the destination floor with the highest priority is set as the destination floor, in the elevator 3. If the floor to which the user A desires to go is not the automatically registered destination floor, the user A may cancel the destination button 10b of the automatically registered destination floor and may register other destination floors.

Embodiment 3

In the interest degree measurement system 1 in this example, acquisition of information on the degrees of interest and guidance to the users are performed across a plurality of buildings 2.

Figure 26:
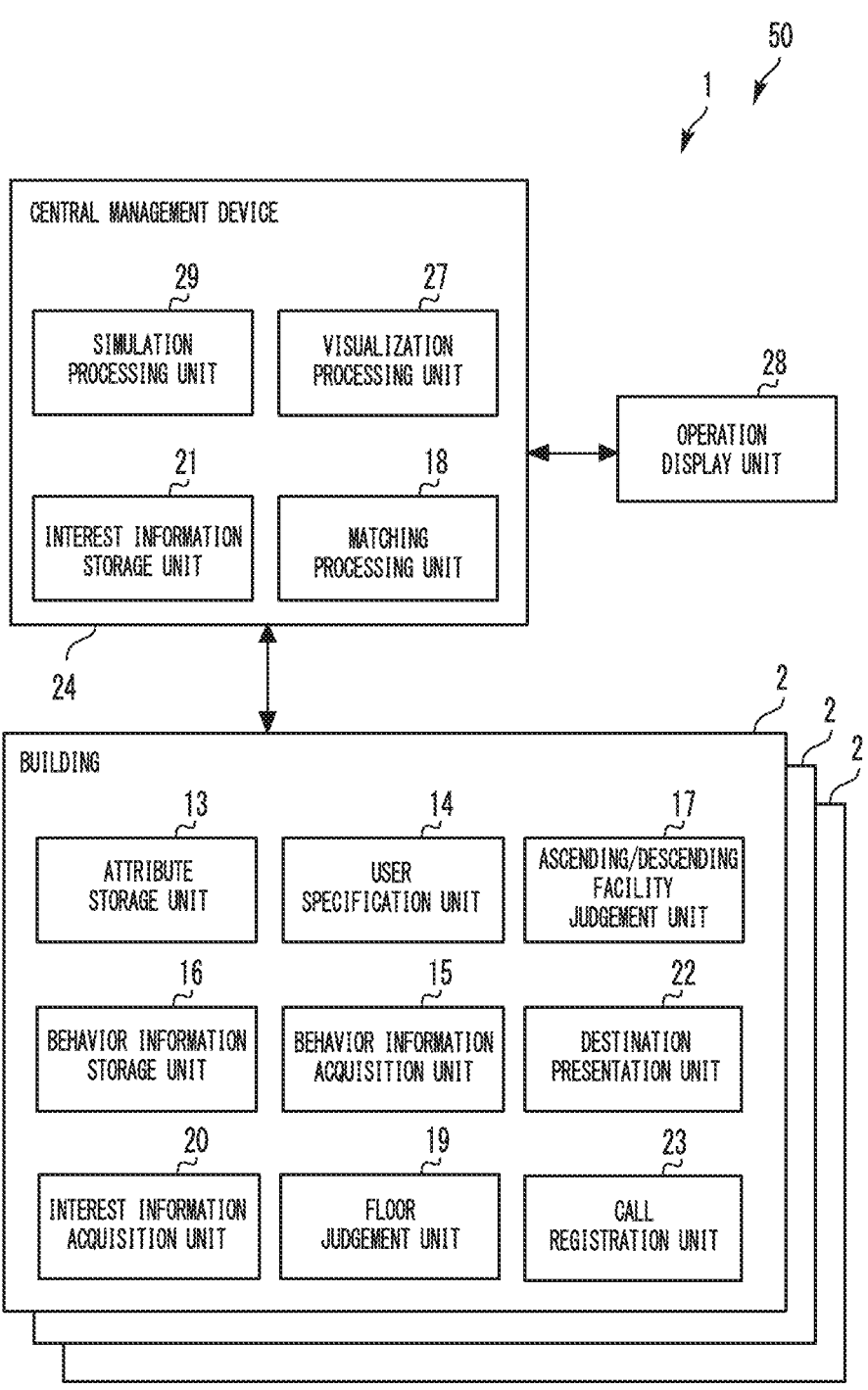
FIG. 26 is a configuration diagram of the interest degree measurement system according to Embodiment 3.

FIG. 26 is a configuration diagram of the interest degree measurement system 1 according to Embodiment 3.

In the interest degree measurement system 1, the attribute storage unit 13, the user specification unit 14, the behavior information acquisition unit 15, the behavior information storage unit 16, the ascending/descending facility judgement unit 17, the floor judgement unit 19, the interest information acquisition unit 20, the destination presentation unit 22, and the call registration unit 23 are applied to each building 2 as parts that perform data processing. These portions perform operation such as specification of the user, acquisition of behavior information and interest information, presentation of the destination and registration of call in each building 2.

The interest degree measurement system 1 includes a central management device 24. The central management device 24 is a device that integrates and manages information such as interest information acquired in the plurality of buildings 2. The central management device 24 is, for example, one or more server devices. Part or all of the central management device 24 may be installed on virtual machine, or the like, on a cloud service. The central management device 24 includes the matching processing unit 18, the interest information storage unit 21 and the visualization processing unit 27. In this example, the operation display unit 28 is an information processing terminal, or the like, that can perform communication with the central management device 24.

In this example, the simulation processing unit 29 of the simulation system 50 is mounted on the central management device 24. Note that the simulation processing unit 29 may be one or more server devices that can perform communication with the central management device 24. Alternatively, part or all of the simulation processing unit 29 may be virtual machine, or the like, on a cloud service.

The matching processing unit 18 has a function of achieving matching in specification of users by the user specification units 14 applied to the respective buildings 2. Processing of achieving matching is, for example, performed as follows. There is a possibility that the user specification units 14 applied to the respective buildings 2 erroneously specify different users as the same user. There is a possibility that the user specification units 14 applied to different buildings 2 specify the same user at the same time. The same person cannot redundantly exist in two or more buildings 2 at the same time, and thus, the matching processing unit 18 requests the user specification units 14 applied to the respective buildings 2 to modify specification of the users. In this event, the user specification units 14 applied to the respective buildings 2 specify the users erroneously specified as the same user, as users different from each other. When the user specification units 14 specify the users as users different from each other, the user specification units 14 extract a difference in a feature amount or feature amounts of the users from the acquired images, improve accuracy of specification of users, and resettle specification of the users different from each other. Note that the matching processing unit 18 may also perform processing of achieving matching between specification of the user by the user specification unit 14 and judgement of the ascending/descending facility to be utilized by the user by the ascending/descending facility judgement unit 17 for each building 2.

The interest information storage unit 21 integrates the interest information acquired in the respective buildings 2 and stores the integrated interest information for each user. The interest information storage unit 21 stores, for example, identification information unique to the user, interest information of the user and information on a time point and a location at which the interest information is acquired in association with one another.

The visualization processing unit 27 has a function of generating an interest degree map for each of the buildings 2. The visualization processing unit 27 generates the interest degree map using information stored in the interest information storage unit 21. For example, in a case where the interest information storage unit 21 stores the interest information of the user acquired for one of the buildings 2, the visualization processing unit 27 may generate an interest degree map for other buildings 2 that have not been utilized by the user. In this event, for example, a level of interest is acquired for each attribute as the interest information of the user. The visualization processing unit 27, for example, allocates the level of interest for each attribute of the user for each area of a floor for which the interest degree map is to be generated in accordance with an attribute of the area of the floor. Note that the visualization processing unit 27 may generate an interest degree map for the building 2 that have been utilized by the user. The visualization processing unit 27 may generate an interest degree map for one of the buildings 2 using the interest information acquired in the plurality of buildings 2. The visualization processing unit 27 may generate an interest degree map including information stored in the behavior information storage unit 16 of each of the buildings 2. The visualization processing unit 27 may generate an interest degree map including information on the destination actually presented to the user by the destination presentation unit 22 of each of the buildings 2. The visualization processing unit 27 may generate an interest degree map including classification information such as gender or age of the user or both of them or other information.

The simulation processing unit 29 has a function of setting simulation conditions and simulating change of the interest information acquired by the interest information acquisition unit 20 in each of the buildings 2. The simulation processing unit 29 performs simulation using the information stored in the interest information storage unit 21. For example, in a case where the interest information storage unit 21 stores interest information of the user acquired in one of the buildings 2, the simulation processing unit 29 may perform simulation for other buildings 2 that have not been utilized by the user. The simulation processing unit 29 sets users within the building 2 that become targets of simulation and, for example, users of another building 2 on the basis of the simulation conditions. The simulation processing unit 29 acquires information with high interest with respect to an attribute of a specific area from the interest information storage unit 21 for each of the users of the other building 2 that become the targets of the simulation and sets an entrance and a start time point. The simulation processing unit 29 generates behavior information in the building 2 in a simulated manner for each of the users. The simulation processing unit 29 generates interest information in a simulated manner for each of the users for whom the behavior information is generated in a simulated manner. The simulation processing unit 29 generates a result of the simulation as the interest degree map for the building 2 on the basis of the behavior information and the interest information generated in a simulated manner. The simulation processing unit 29 may perform simulation for one of the buildings 2 or for a plurality of buildings 2 at the same time using the interest information acquired in the plurality of buildings 2.

Subsequently, an example of presentation of the destination to the user will be described using FIG. 27.

Figure 27:
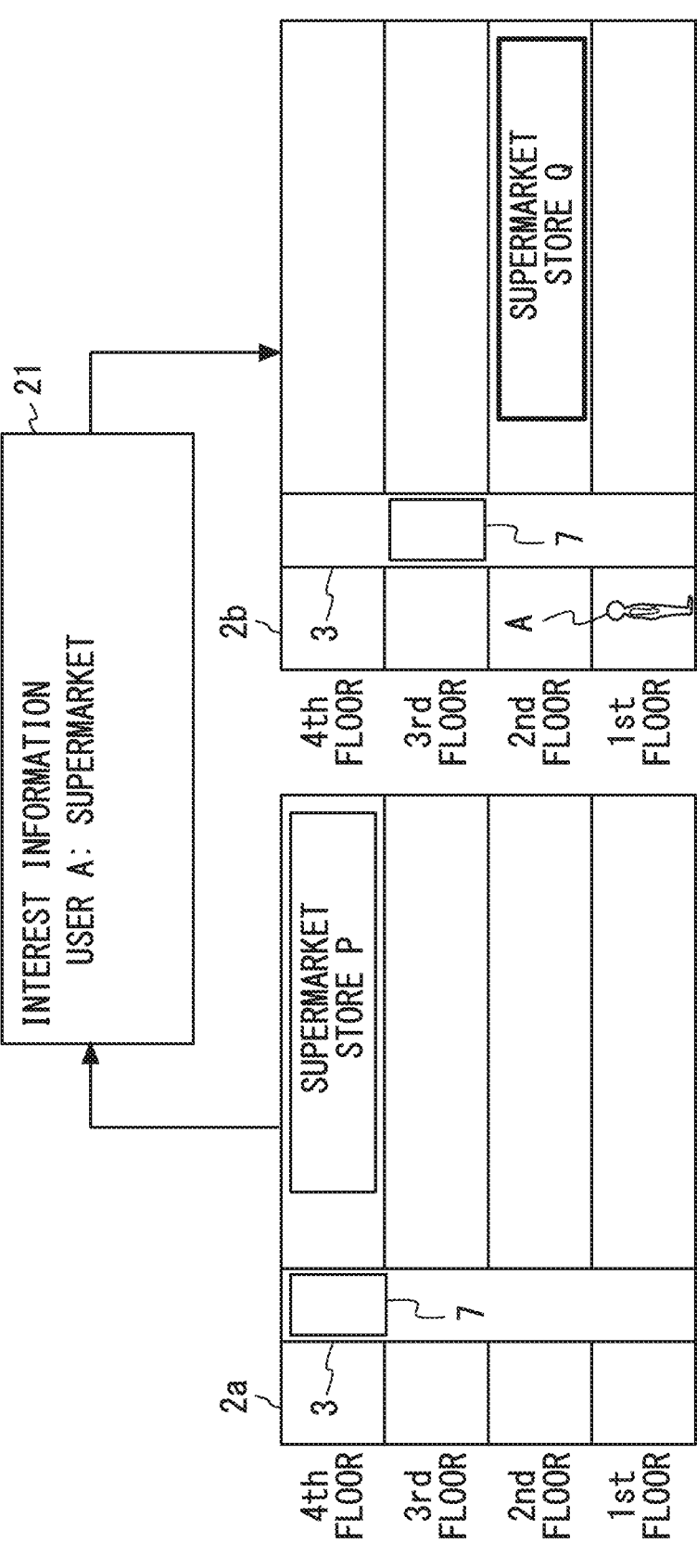
FIG. 27 is a view illustrating an example of presentation of the destination by the interest degree measurement system according to Embodiment 3.

FIG. 27 is a view illustrating an example of presentation of the destination by the interest degree measurement system 1 according to Embodiment 3.

FIG. 27 illustrates an example of a plurality of buildings 2 to which the interest degree measurement system 1 is to be applied.

In this example, a plurality of buildings 2 on a certain date are illustrated. The user A has utilized one building 2*a* a plurality of times until this date. The user A utilizes the other building 2*b* for the first time on this date. In the building 2*a*, the store P that is a supermarket is open on the fourth floor. In the building 2*b*, the store Q that is a supermarket is open on the second floor.

Until this date, the interest degree measurement system 1 acquires interest information of the user A who has utilized the building 2*a*. Here, the building 2*a* in which the interest information, and the like, of the user is acquired is an example of a first building. A first camera is the camera 12 provided in the first building. A first attribute storage unit is the attribute storage unit 13 applied to the first building. A first user specification unit is the user specification unit 14 applied to the first building. The interest information acquisition unit 20 of the building 2*a* transmits the acquired interest information to the interest information storage unit 21 of the central management device 24. The interest information storage unit 21 integrates the interest information received from the interest information acquisition unit 20 of the building 2*a* and stores the integrated interest information for each user. The interest information storage unit 21 may integrate and store interest information received from the interest information acquisition units 20 applied to the buildings 2 other than the building 2*a* and the building 2*b*. The interest information storage unit 21 stores a supermarket as an attribute with the highest degree of interest for the user A who has utilized the building 2*a*, and the like.

The user A who utilizes the building 2*b* for the first time at this date is specified by the user specification unit 14 of the building 2*b* at the hall of the elevator 3 on the first floor. In this event, the destination presentation unit 22 of the building 2*b* reads the interest information for the user A from the interest information storage unit 21. The destination presentation unit 22 in this example presents an area with the attribute with the highest degree of interest to the user as the destination. Thus, the destination presentation unit 22 acquires a supermarket as the attribute with the highest degree of interest of the user A. The destination presentation unit 22 extracts an area having a supermarket as the attribute from the attribute storage unit 13 of the building 2b. In this example, the destination presentation unit 22 extracts an area on the second floor in which the store Q is open in the building 2b. The destination presentation unit 22 presents the extracted area to the user A as the destination. The call registration unit 23 of the building 2b registers call to the destination floor in the elevator 3, for example, in a case where the user who gets on the car 7 of the elevator 3 of the building 2b does not operate the car operating panel 10, or the like. Here, the building 2b in which presentation, and the like, of the destination to the user is performed is an example of a second building. A second camera is the camera 12 provided in the second building. A second user specification unit is the user specification unit 14 applied to the second building. A second attribute storage unit is the attribute storage unit 13 applied to the second building. Note that the second building does not have to be a building utilized by the user A for the first time. In the second building, interest information, and the like, of the user may be acquired in the past.

As described above, the interest degree measurement system 1 according to Embodiment 3 includes the attribute storage units 13, the user specification units 14, the floor judgement units 19, the behavior information acquisition units 15, the interest information acquisition units 20, the interest information storage units 21, the destination presentation units 22 and the visualization processing unit 27 corresponding to the respective buildings 2. Each attribute storage unit 13 stores attributes for each area for each floor of the corresponding building 2. Each user specification unit 14 specifies the user in the building 2 on the basis of the image or images captured by at least one of the cameras 12 provided in the corresponding building 2. The floor judgement unit 19 judges the arrival floor of the user on the basis of the image or images captured by at least one of the cameras 12 when the user specified in one of the buildings 2 moves from the departure floor to the arrival floor by utilizing the ascending/descending facility of the building 2. The behavior information acquisition unit 15 acquires behavior information representing behavior of the user on the judged arrival floor on the basis of the image or images captured by at least one of the cameras 12 for the user specified in one of the buildings 2. The interest information acquisition unit 20 acquires interest information representing a degree of interest of the user for each attribute on the basis of a relationship between layout of areas on the judged arrival floor and attributes of the areas, and the behavior information for the user specified in one of the buildings 2. The interest information storage unit 21 stores the interest information acquired by the interest information acquisition unit 20 for each user, including information on a time point and a location. The visualization processing unit 27 generates an interest degree map using information on the attributes stored in the attribute storage unit 13 corresponding to one of the buildings 2 and information stored in the interest information storage unit 21. The interest degree map generated here is obtained by visualizing distribution of the degrees of interest of the users of the building 2 on at least one floor in the building 2.

According to such a configuration, specification of the user, judgement of an arrival floor and acquisition of behavior information are performed on the basis of an image or images captured by the camera 12 provided at each of the buildings 2, and thus, behavior information on the arrival floor is acquired even for a user who does not operate equipment of the ascending/descending facility. Further, the interest information is acquired on the basis of the behavior information of the user. Thus, the interest information is acquired as information on interest of a user even for the user of the building 2 who does not possess mobile equipment registered in advance. Further, the interest information is acquired even for a user who does not operate equipment of the ascending/descending facility. Further, even in the building 2 in which the elevator 3, the escalator 4 and the stairs 5 coexist, the interest degree measurement system 1 manages history of getting on and getting off the ascending/descending facilities by integrating the elevator 3, the escalator 4 and the stairs 5 as the ascending/descending facilities, so that the interest information of the users is more reliably acquired. The interest information acquired in this manner is visualized by the interest degree map generated by the visualization processing unit 27, so that the owner, or the like, of the building 2 can obtain a judgement material for improving value of the building 2 or avoiding a risk that an unfavorable event occurs in the building 2. Further, the interest information of the user is shared among the plurality of buildings 2, so that the interest degree measurement system 1 can generate an interest degree map for the building 2 that has not been utilized by the user.

In this example, the attribute storage unit 13 is provided for each of the buildings 2. On the other hand, in a case where the attribute storage unit 13 is installed on a server device or a cloud service, the attribute storage units 13 that store information on respective buildings 2 may be integrated into a single attribute storage unit 13 or attribute storage units 13 of the number less than the number of the buildings 2.

Further, in this example, the user specification unit 14 is provided for each of the buildings 2. On the other hand, in a case where the user specification unit 14 is installed on a server device or a cloud service, the user specification units 14 that store information on the respective buildings 2 may be integrated into a single user specification unit 14 or user specification units 14 of the number less than the number of the buildings 2.

Further, in a similar manner, in a case where part or all of functional units such as the floor judgement unit 19, the behavior information acquisition unit 15, the behavior information storage unit 16, the interest information acquisition unit 20, the interest information storage unit 21 and the visualization processing unit 27 are installed on a server device or a cloud service, the functional units for the respective buildings 2 may be integrated into a single functional unit or functional units of the number less than the number of the buildings 2.

Embodiment 4

In the interest degree measurement system 1 in this example, coordination with an external system 99 is performed. For example, in a case where an owner, or the like, of a first building to which the interest degree measurement system 1 is applied is different from an owner, or the like, of another third building to which the external system 99 is applied, and a contract that discloses interest degree maps or simulation results is made between these owners, or the like, an interest degree map of the third building by the interest degree measurement system 1 of the first building or a simulation result of change of the interest information of the third building can be disclosed to the owner, or the like, of the third building.

Figure 28:
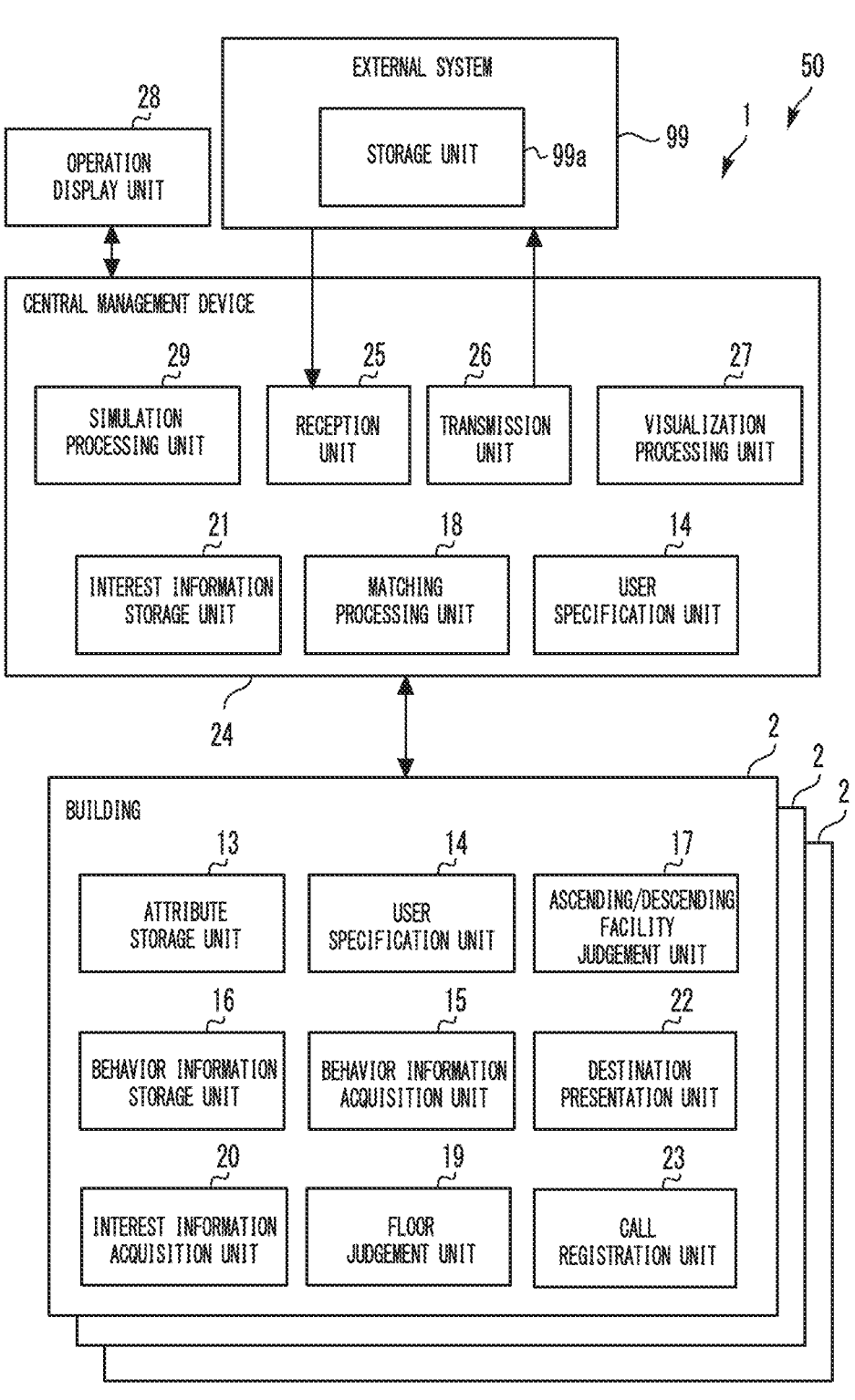
FIG. 28 is a configuration diagram of the interest degree measurement system according to Embodiment 4.

FIG. 28 is a configuration diagram of the interest degree measurement system 1 according to Embodiment 4.

The external system 99 is an external system of the interest degree measurement system 1. The external system 99 is applied to the building 2 to which the interest degree measurement system 1 is not applied. In the building 2 to which the external system 99 is applied, a plurality of cameras 12 that capture images of the user are provided. The external system 99 includes a storage unit 99*a*. The storage unit 99*a* daily stores images of each area of the building 2 to which the external system 99 is applied and performs updating. The external system 99 transmits an image or images with no person, for example, an updated image of each area on each floor acquired at midnight to the interest degree measurement system 1. Further, the external system 99 continuously transmits images captured by respective cameras 12 of the building 2 to which the external system 99 is applied to the interest degree measurement system 1, for example, from morning until night. The images to be transmitted here do not have to be particularly processed. The external system 99 receives information on guidance for candidates, or the like, of the destination without the user being specified, from the interest degree measurement system 1 that receives transmission of the images and specifies the user. The external system 99 performs processing of guidance such as presentation of the destination on the basis of the information received from the interest degree measurement system 1.

The central management device 24 includes a reception unit 25, a transmission unit 26, the user specification unit 14, the matching processing unit 18, the interest information storage unit 21 and the visualization processing unit 27. The reception unit 25 and the transmission unit 26 are parts that perform communication with the external system 99. By this means, the central management device 24 provides an interface to the external system 99. In this example, the operation display unit 28 is an information processing terminal that can perform communication with the central management device 24.

In this example, the simulation processing unit 29 of the simulation system 50 is mounted on the central management device 24. Note that the simulation processing unit 29 may be one or more server devices that can perform communication with the central management device 24. Alternatively, part or all of the simulation processing unit 29 may be virtual machine, or the like, on a cloud service.

Subsequently, an example of provision of the interest information to the external system 99 will be described using FIG. 29.

Figure 29:
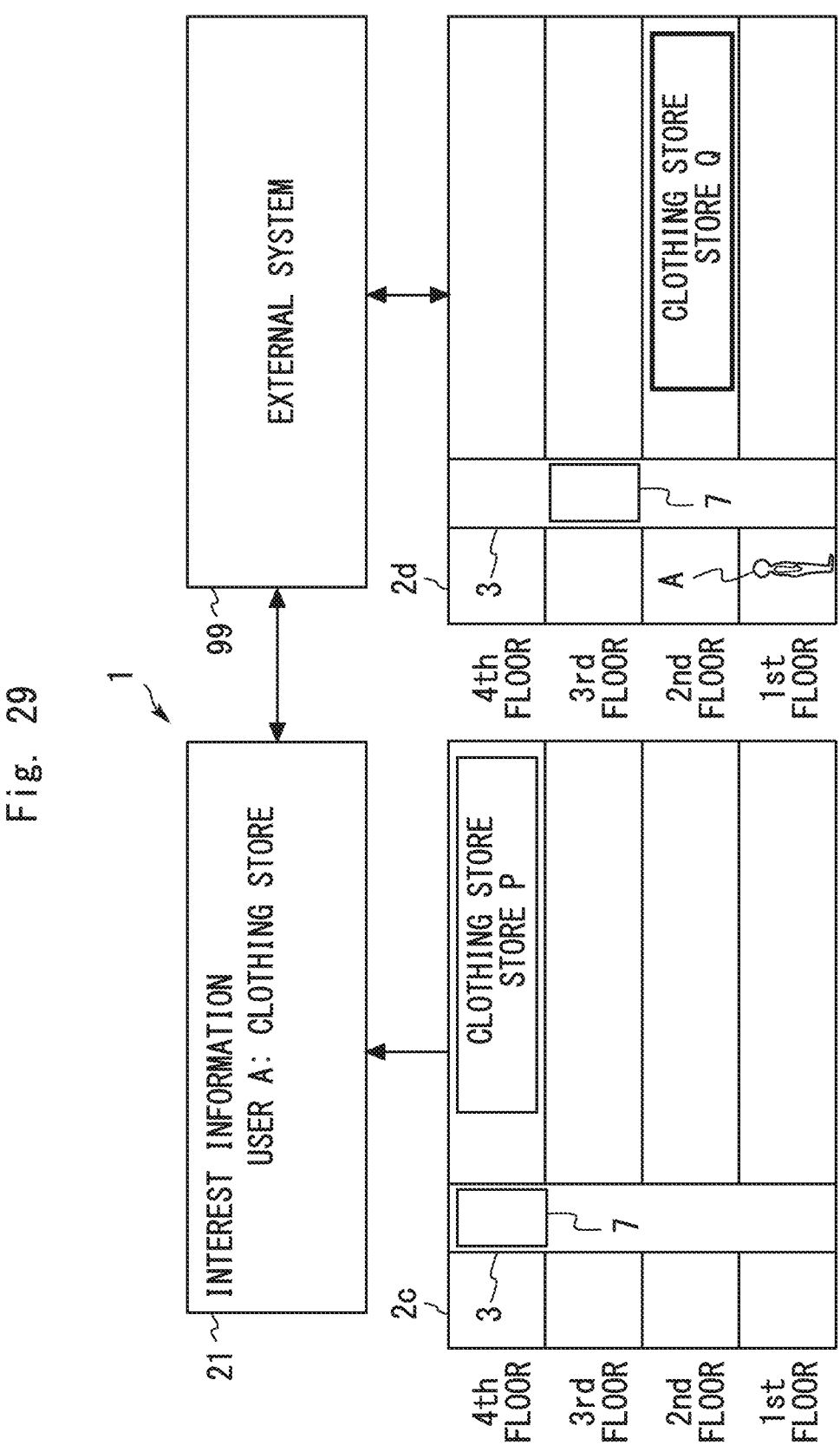
FIG. 29 is a view illustrating an example of disclosure of the interest degree map by the interest degree measurement system or a simulation result of change of the interest information according to Embodiment 4.

FIG. 29 is a view illustrating an example of disclosure of the interest degree map by the interest degree measurement system 1 or a simulation result of change of the interest information according to Embodiment 4.

FIG. 29 illustrates an example of a building 2*c* to which the interest degree measurement system 1 is applied and a building 2*d* to which the external system 99 is applied. The building 2*d* to which the external system 99 is applied is an example of the third building. Information on guidance such as candidates for the destination from the interest degree measurement system 1 to the external system 99 is transmitted to the building 2*d*.

In this example, the building 2*c* and the building 2*d* on a certain date are illustrated. The user A has utilized the building 2*c* a plurality of times until this date. The user A utilizes the building 2*d* for the first time on this date. In the building 2*c*, a store P which is a clothing store is open on the fourth floor. A store Q which is a clothing store is open on the second floor in the building 2*d*.

Until this date, the interest degree measurement system 1 acquires interest information of the user A who has utilized the building 2*c*, and the like. Here, the building 2*c* in which the interest information, and the like, of the user are acquired is an example of the first building. The interest information storage unit 21 stores a clothing store as an attribute with the highest degree of interest for the user A who has utilized the building 2*c*, and the like.

For example, in the early hours of this date, the external system 99 transmits in advance images of each area on each floor of the building 2*d* to the interest degree measurement system 1. The interest degree measurement system 1 that receives the images generates in advance a bird's-eye map of the building 2*d* in a similar manner to that illustrated in FIG. 8.

Images of the user A who utilizes the building 2*d* for the first time at this date are captured by the cameras 12 provided in the building 2*d*. The cameras 12 are, for example, provided at the hall of the elevator 3, and the like. The external system 99 transmits the images of the user A to the central management device 24.

The reception unit 25 of the central management device 24 receives the images of the user A from the external system 99. The user specification unit 14 of the central management device 24 specifies the user A on the basis of the images received from the external system 99. The user specification unit 14 of the central management device 24 that specifies the user on the basis of the images received from the external system 99 is an example of a third user specification unit. The user specification unit 14 of the central management device 24 determines a coordinate of the user A on the bird's-eye map of the building 2*d* after specifying the user A. Further, the transmission unit 26 reads the interest information of the specified user A from the interest information storage unit 21, specifies an attribute with the highest degree of interest corresponding to each area on each floor on the bird's-eye map of the building 2*d* as interest information, and transmits candidates for the destination in the building 2*d* to the external system 99. The transmission unit 26 transmits information indicating that the attribute with the highest degree of interest of the user A who is the user specified by the images is a clothing store, to the external system 99.

The external system 99 receives the candidates for the destination in the building 2*d* from the central management device 24. In this example, the external system 99 receives information indicating that the attribute with the highest degree of interest of the user A among the areas and the attributes thereof in the building 2*d* is a clothing store. Thus, the external system 99 presents the store Q which is a clothing store to the user A who utilizes the building 2*d* as the destination. Note that the building 2*d* to which the external system 99 is applied does not have to be a building utilized by the user A for the first time.

In the interest degree measurement system 1 in this example, the interest information acquisition unit 20 judges an attribute of an area such as, for example, a clothing store for an area on the bird's-eye map on the basis of an image, images, or the like, received by the reception unit 25 from the external system 99. In this event, the interest information acquisition unit 20 acquires the interest information of the user of the building 2*d* on the basis of correspondence between the area judged in this manner and the attribute. The visualization processing unit 27 generates an interest degree map for one or more floors in the building 2*d* on the basis of the correspondence between the area judged in this manner and the attribute and the interest information of the user. Further, the simulation processing unit 29 simulates change of the interest information in the building 2d on the basis of the correspondence between the area judged in this manner and the attribute and the interest information of the user. Information such as the interest degree map and the simulation result is disclosed in a form of information that cannot be processed regardless of a medium and a communication method on the basis of a contract with the owner, or the like, of the third building.

As described above, the interest degree measurement system 1 according to Embodiment 4 includes the attribute storage unit 13, the user specification unit 14 corresponding to the building 2 to which the interest degree measurement system 1 is applied, the floor judgement unit 19, the behavior information acquisition unit 15, the interest information acquisition unit 20, and the interest information storage unit 21, and the user specification unit 14 of the central management device 24, the reception unit 25, the transmission unit 26, and the visualization processing unit 27. The attribute storage unit 13 stores attributes for each area for each floor of the corresponding building 2. The user specification unit 14 specifies the user in the building 2 on the basis of the image or images captured by at least one of the cameras 12 provided in the corresponding building 2. The floor judgement unit 19 judges the arrival floor of the user on the basis of the image or images captured by at least one of the cameras 12 when the specified user moves from the departure floor to the arrival floor by utilizing one of the ascending/descending facilities. The behavior information acquisition unit 15 acquires behavior information representing behavior of the user on the judged arrival floor on the basis of the image or images captured by at least one of the cameras 12 for the specified user. The interest information acquisition unit 20 acquires interest information representing a degree of interest of the user for each attribute on the basis of a relationship between layout of areas on the judged arrival floor and the attributes of the areas, and the behavior information for the specified user. The interest information storage unit 21 stores the interest information acquired by the interest information acquisition unit 20 for each user, including information on a time point and a location. The reception unit 25 sequentially receives images necessary for generating a bird's-eye map of each area on each floor in the building 2d to which the external system 99 is applied, and images of the user who starts utilization of the ascending/descending facility from the external system 99. The user specification unit 14 of the central management device 24 specifies the user on the basis of the images received by the reception unit 25. The visualization processing unit 27 generates an interest degree map of the building 2d using information stored in the interest information storage unit 21 as the interest information for the user specified by the user specification unit 14 of the central management device 24, and information on an attribute for each area of at least one of a plurality of floors of the building 2d judged on the basis of the image or images received by the reception unit 25. The interest degree map generated here is obtained by visualizing distribution of degrees of interest of users of the building 2d on the floor for which information on the attribute is judged among the plurality of floors of the building 2d. The transmission unit 26 transmits guidance information such as candidates for the destination for the user specified by the user specification unit 14 of the central management device 24 to the external system 99. An effect of guidance can be confirmed from the images sequentially transmitted to the reception unit 25. The interest degree map of the building 2d or a simulation result of the change can be disclosed by a contract with the owner, or the like, of the third building. For example, by disclosing the interest degree map obtained by measuring movement to and from adjacent buildings at the same time, it becomes possible to more efficiently consider flow of people. Further, by simulating change for each of the adjacent buildings, even if the owner, or the like, of the first building is different from the owner, or the like, of the third building, it is possible to consider flow of people that provides benefit to the both. Still further, when a suspicious person is found, an alert can be easily issued by collectively confirming complicated routes and suspicious behavior across the adjacent buildings, and thus, the owner, or the like, can prevent crimes. Here, the first building and the third building may be adjacent to each other or do not have to be adjacent to each other.

According to such a configuration, specification of the user, judgement of the arrival floor and acquisition of the behavior information are performed on the basis of the images captured by the cameras 12 provided in the building 2, so that behavior information on the arrival floor is acquired also for users who do not operate equipment of the ascending/descending facilities. Further, the interest information is acquired on the basis of the behavior information of the user. Thus, the interest information is acquired also for users who do not operate equipment of the ascending/descending facilities. Thus, interest information is acquired even for a user of the building 2 who does not possess mobile equipment registered in advance as interest information that is information of interest of the user. Further, the interest degree measurement system 1 does not request other identification information, or the like, of images of the users to the external system 99. Thus, the interest degree measurement system 1 can perform guidance to an area with the highest interest in the building 2d for each user without providing personal information such as name that identifies the user to the external system 99.

In the interest degree measurement system 1 and the external system 99 in this example, the attribute storage unit 13 is provided for each of the buildings 2. On the other hand, in a case where the attribute storage unit 13 is installed on a server device or a cloud service, the attribute storage units 13 that store information for the respective buildings 2 may be integrated into a single attribute storage unit 13 or attribute storage units 13 of the number less than the number of the buildings 2.

Further, in the interest degree measurement system 1 and the external system 99 in this example, the user specification unit 14 is provided for each of the buildings 2. On the other hand, in a case where the user specification unit 14 is installed on a server device or a cloud service, the user specification units 14 that store information for the respective buildings 2 may be integrated into a single user specification unit 14 or user specification units 14 of the number less than the number of the buildings.

Further, in a case where part or all of functional units such as the floor judgement unit 19, the behavior information acquisition unit 15, the behavior information storage unit 16, the interest information acquisition unit 20, the interest information storage unit 21 and the visualization processing unit 27 is installed on a server device or a cloud service, the functional units for the respective buildings 2 may be integrated into a single functional unit or functional units of the number less than the number of the buildings 2.

INDUSTRIAL APPLICABILITY

The interest degree measurement system and the simulation system according to the present disclosure can be applied to a building including a plurality of floors.

REFERENCE SIGNS LIST

1 Interest degree measurement system. 2, 2a, 2b, 2c, 2d Building, 3, 3a, 3b Elevator, 4 Escalator, 5 Stairs, 6 Hoistway, 7 Car, 8 Control panel, 9 Hall operating panel, 10 Car operating panel, 10a Display panel, 10b Destination button, 11 Group management device, 12 Camera, 13 Attribute storage unit, 14 User specification unit, 15 Behavior information acquisition unit, 16 Behavior information storage unit, 17 Ascending/descending facility judgement unit, 18 Matching processing unit, 19 Floor judgement unit, 20 Interest information acquisition unit, 21 Interest information storage unit, 22 Destination presentation unit, 23 Call registration unit, 24 Central management device, 25 Reception unit, 26 Transmission unit, 27 Visualization processing unit, 28 Operation display unit, 29 Simulation processing unit, 50 Simulation system. 99 External system, 99a Storage unit, 100a Processor, 100b Memory, 200 Dedicated hardware

The invention claimed is:

1. An interest degree measurement system comprising: processing circuitry to store attributes for each area for each of a plurality of floors of a building;

to specify a user in the building on a basis of an image or images captured by at least one of a plurality of cameras provided in the building;

to, when the user specified by the processing circuitry moves from a departure floor to an arrival floor among the plurality of floors by utilizing one of one or more ascending/descending facilities provided in the building, judge the arrival floor of the user on the basis of the image or images captured by at least one of the plurality of cameras;

to acquire behavior information representing behavior of the user on the arrival floor judged by the processing circuitry on the basis of the image or images captured by at least one of the plurality of cameras for the user specified by the processing circuitry;

to acquire interest information representing a degree of interest of the user for each attribute on a basis of a relationship between layout and attributes of areas on the arrival floor judged by the processing circuitry and the behavior information acquired by the processing circuitry for the user specified by the processing circuitry;

to store the interest information acquired by the processing circuitry for each user, including information on a time point and a location; and to generate an interest degree map by visualizing distribution of degrees of interest of users of the building on at least one of the plurality of floors using the information stored in the processing circuitry.

2. The interest degree measurement system according to claim 1, wherein a tenant fee in the building is automatically calculated on a basis of the interest degree map.

3. The interest degree measurement system according to claim 1, wherein the processing circuitry generates the interest degree map for each of the users of the building.

4. The interest degree measurement system according to claim 1, wherein the processing circuitry stores pieces of classification information regarding the users of the building, the classification information includes one or more of a gender of the user, an age of the user, an age group of the user, a utilization frequency by the user of the building, utilization hours of the building by the user, utilization days of the building by the user, weather upon utilization of the building by the user, and the processing circuitry generates the interest degree map for each piece of classification information of the users of the building.

5. The interest degree measurement system according to claim 1, wherein the processing circuitry generates the interest degree map by integrating interest information for each of the users of the building.

6. The interest degree measurement system according to claim 1, wherein the processing circuitry generates the interest degree map including behavior information for each of the users of the building.

7. The interest degree measurement system according to claim 1, wherein, when the processing circuitry specifies the user who starts utilization of one of the one or more ascending/descending facilities, the processing circuitry presents an area having an attribute with the highest degree of interest for the user from among the areas for each of the plurality of floors of the building to the user as a destination on a basis of the interest information stored in the processing circuitry for the user and information on the attributes stored in the processing circuitry; and the processing circuitry generates the interest degree map including information of the destination actually presented by the processing circuitry.

8. The interest degree measurement system according to claim 1, wherein, in a case where the one or more ascending/descending facilities include a plurality of ascending/descending facilities, when the user specified by the processing circuitry starts utilization of one of the plurality of ascending/descending facilities, the processing circuitry judges an ascending/descending facility to be utilized by the user on the basis of the image or images captured by at least one of the plurality of cameras; and in a case where the processing circuitry judges two or more ascending/descending facilities as facilities to be utilized by the user specified by the processing circuitry as the same user, the processing circuitry specifies the user who utilizes the two or more ascending/descending facilities as users different from each other after extracting a difference in a feature amount or feature amounts.

9. The interest degree measurement system according to claim 1, wherein, in a case where a user of the building is a person who engages in working on a working floor that is one of the plurality of floors, the processing circuitry performs attendance management of the person who engages in working on a basis of the behavior information; and the processing circuitry judges a date on which the person who engages in working utilizes one of the at least one or more ascending/descending facilities as a work day of the person who engages in working, judges a first time point at which the person who engages in working arrives at the working floor on the work day as a start time point of the person who engages in working, and judges a last time point at which the person who engages in working departs from the working floor on the work day as a finish time point of the person who engages in working.

10. The interest degree measurement system according to claim 1, wherein the processing circuitry acquires interest information of the user every time the processing circuitry completes acquisition of the behavior information on the arrival floor of the user.

11. The interest degree measurement system according to claim 1, wherein the processing circuitry learns a model that derives behavior information from the image or images of captured by at least one of the plurality of cameras using a machine learning method and acquires behavior information of the user from the image or images on a basis of the learned model.

12. A simulation system comprising:

the interest degree measurement system according to claim 1, wherein the processing circuitry sets simulation conditions on a basis of existing conditions stored in the processing circuitry and simulates change of the interest information using new conditions obtained by changing the existing conditions acquired by the processing circuitry.

13. The simulation system according to claim 12, wherein a tenant fee in the new conditions is automatically calculated on a basis of a result of the simulation under the new conditions.

14. A simulation system comprising:

the interest degree measurement system according to claim 1, wherein the processing circuitry sets simulation conditions on a basis of existing conditions stored in the processing circuitry and simulates change of interest information under new conditions obtained by changing the existing conditions acquired by the processing circuitry:

the processing circuitry calculates a difference between behavior information and interest information under the existing conditions stored in the processing circuitry and behavior information and interest information simulated under the new conditions; and the processing circuitry visualizes a result of the difference of the simulation in a superimposed manner on at least one of an interest degree map under the existing conditions or an interest degree map under the new conditions.

15. An interest degree measurement system comprising:

first processing circuitry to store attributes for each area for each of a plurality of floors of a first building, to specify a user in the first building on a basis of an image or images captured by at least one of a plurality of first cameras provided in the first building, to, when the user specified by the first processing circuitry moves from a departure floor to an arrival floor among the plurality of floors of the first building by utilizing one of one or more ascending/descending facilities provided in the first building, judge the arrival floor of the user on the basis of the image or images captured by at least one of the plurality of first cameras, to acquire behavior information representing behavior of the user on the arrival floor judged by the first processing circuitry on the basis of the image or images captured by at least one of the plurality of first cameras for the user specified by the first processing circuitry, and to acquire interest information representing a degree of interest of the user for each attribute on a basis of a relationship between arrangement and attributes of areas on the arrival floor judged by the first processing circuitry and the behavior information acquired by the first processing circuitry for the user specified by the first processing circuitry;

second processing circuitry to store attributes for each area for each of a plurality of floors of a second building; and central management processing circuitry.

16. The interest degree measurement system according to claim 15, wherein the central management processing circuitry uses both of the interest information acquired in the first building and the interest information acquired in the second building to generate the interest degree map in the second building.

17. The interest degree measurement system according to claim 15, wherein the central management processing circuitry generates the interest degree map for each of the users of the second building.

18. The interest degree measurement system according to claim 15, wherein the second processing circuitry specifies a user in the second building on a basis of an image or images captured by at least one of a plurality of second cameras provided in the second building;

when the second processing circuitry specifies a user who starts utilization of one of one or more ascending/ descending facilities provided in the second building, the second processing circuitry presents an area having an attribute with the highest degree of interest for the user from among the areas for each of the plurality of floors of the building to the user as a destination by utilizing one or both of the interest information acquired in the first building and the interest information acquired in the second building, on a basis of the interest information stored in the central management processing circuitry for the user and information on the attributes stored in the second processing circuitry; and the central management processing circuitry generates the interest degree map in the second building, including information on the destination actually presented by the second processing circuitry.

19. The interest degree measurement system according to claim 15, wherein the second processing circuitry configured to specify a user in the second building on the basis of the image or images captured by at least one of a plurality of second cameras provided in the second building; and in a case where the user specified by the first processing circuitry and the user specified by the second processing circuitry are the same, the central management processing circuitry causes the first processing circuitry and the second processing circuitry to specify the specified users as users different from each other after extracting a difference in feature amounts.

20. An interest degree measurement system comprising: first processing circuitry to store attributes for each area for each of a plurality of floors of a first building, to specify a user in the first building on a basis of an image or images captured by at least one of a plurality of cameras provided in the first building, to, when the user specified by the first processing circuitry moves from a departure floor to an arrival floor among the plurality of floors of the first building by utilizing one of one or more ascending/descending facilities provided in the first building, judge the arrival floor of the user on the basis of the image or images captured by at least one of the plurality of cameras, to acquire behavior information representing behavior of the user on the arrival floor judged by the first processing circuitry on the basis of the image or images captured by at least one of the plurality of cameras for the user specified by the first processing circuitry, and to acquire interest information representing a degree of interest of the user for each attribute on a basis of a relationship between arrangement and attributes of areas on the arrival floor judged by the first processing circuitry and the behavior information acquired by the first processing circuitry for the user specified by the first processing circuitry; and central management processing circuitry to store the interest information acquired by the first processing circuitry for each user, including information on a time point and a location, to receive an image or images of users of a third building from an external system applied to the third building, to specify a user on the basis of the image or images received by the central management processing circuitry, and to generate an interest degree map by visualizing distribution of degrees of interest of the users of the third building on a floor for which information on attributes is judged among a plurality of floors of the third building using the information stored in the central management processing circuitry as interest information for the user specified by the central management processing circuitry, and information on attributes for each area of at least one of the plurality of floors of the third building judged on the basis of the image or images received by the central management processing circuitry.

21. An interest degree measurement system comprising: first processing circuitry to store attributes for each area for each of a plurality of floors of a first building, to specify a user in the first building on a basis of an image or images captured by at least one of a plurality of cameras provided in the first building, to, when the user specified by the first processing circuitry moves from a departure floor to an arrival floor among the plurality of floors of the first building by utilizing one of one or more ascending/descending facilities provided in the first building, judge the arrival floor of the user on the basis of the image or images captured by at least one of the plurality of cameras, to acquire behavior information representing behavior of the user on the arrival floor judged by the first processing circuitry on the basis of the image or images captured by at least one of the plurality of cameras for the user specified by the first processing circuitry, and to acquire interest information representing a degree of interest of the user for each attribute on a basis of a relationship between arrangement and attributes of areas on the arrival floor judged by the first processing circuitry and the behavior information acquired by the first processing circuitry; and central management processing circuitry to store the interest information acquired by the first processing circuitry for each user, including information on a time point and a location, to receive, from an external system, an image or images of a user who starts utilization of one or more ascending/descending facilities provided in a third building, to specify a user on the basis of the image or images received by the central management processing circuitry, and to transmit, to the external system, information on candidates for a destination with a high degree of interest of the user stored in the central management processing circuitry for the user specified by the central management processing circuitry.

* * * * *